(12) United States Patent
Yasui

(10) Patent No.: US 7,647,157 B2
(45) Date of Patent: *Jan. 12, 2010

(54) CONTROL DEVICE, CONTROL METHOD, CONTROL UNIT, AND ENGINE CONTROL UNIT

(75) Inventor: Yuji Yasui, Saitama-ken (JP)

(73) Assignee: Honda Giken Kogyo Kabushiki Kaisha, Minato-Ku, Tokyo (JP)

( * ) Notice: Subject to any disclaimer, the term of this patent is extended or adjusted under 35 U.S.C. 154(b) by 365 days.

This patent is subject to a terminal disclaimer.

(21) Appl. No.: 11/503,950

(22) Filed: Aug. 15, 2006

(65) Prior Publication Data

US 2006/0282211 A1    Dec. 14, 2006

Related U.S. Application Data

(62) Division of application No. 10/366,670, filed on Feb. 14, 2003, now Pat. No. 7,124,013.

(30) Foreign Application Priority Data

Feb. 15, 2002   (JP)   ............................. 2002/039094

(51) Int. Cl.
  *B60T 7/12*   (2006.01)
(52) U.S. Cl. .......................... 701/103; 701/101; 700/90
(58) Field of Classification Search ............... 700/90, 700/282; 701/103, 109, 115, 101; 123/672–679; 60/270–279; 703/7–8
  See application file for complete search history.

(56) References Cited

U.S. PATENT DOCUMENTS

| 4,934,328 | A | * | 6/1990 | Ishii et al. ................. 123/673 |
| 5,070,846 | A | | 12/1991 | Dudek et al. |
| 5,266,907 | A | | 11/1993 | Dacus |
| 5,438,827 | A | * | 8/1995 | Ohuchi et al. ................. 60/276 |
| 5,467,185 | A | | 11/1995 | Engeler et al. |
| 5,577,486 | A | * | 11/1996 | Harima et al. ............... 123/674 |
| 5,623,432 | A | | 4/1997 | Degrauwe |
| 5,752,492 | A | * | 5/1998 | Kato et al. ................... 123/674 |
| 5,857,443 | A | | 1/1999 | Kono et al. |

(Continued)

FOREIGN PATENT DOCUMENTS

JP   2000-043609   2/2000

(Continued)

*Primary Examiner*—Paul L Rodriguez
*Assistant Examiner*—Sheela Rao
(74) *Attorney, Agent, or Firm*—Squire, Sanders & Dempsey, L.L.P.

(57) ABSTRACT

There are provided a control device, a control method, a control unit, and an engine control unit, which are capable of controlling a controlled object with relatively large phase delay and dead time, while attaining elimination of lag in control timing between the input and output of the controlled object and improvement of control accuracy at the same time. A state predictor calculates a deviation (output deviation) between an output from an oxygen concentration sensor and a predetermined target value at a predetermined deviation calculation period. Then, a DSM controller calculates a target air-fuel ratio for converging the output from the oxygen concentration sensor to the predetermined target value, according to the calculated deviation, based on any one of a $\Delta$ modulation algorithm, a $\Delta\Sigma$ modulation algorithm, and a $\Sigma\Delta$ modulation algorithm at a predetermined calculation period shorter than the predetermined deviation calculation period.

69 Claims, 41 Drawing Sheets

U.S. PATENT DOCUMENTS

| | | | |
|---|---|---|---|
| 5,875,628 A * | 3/1999 | Mitsutani | 60/276 |
| 5,992,383 A | 11/1999 | Scholten et al. | |
| 6,188,953 B1 | 2/2001 | Yasui et al. | |
| 6,266,957 B1 * | 7/2001 | Nozawa et al. | 60/284 |
| 6,282,889 B1 * | 9/2001 | Kakuyama et al. | 60/285 |
| 6,289,673 B1 * | 9/2001 | Tayama et al. | 60/285 |
| 6,351,943 B1 * | 3/2002 | Tagami et al. | 60/285 |
| 6,481,201 B2 | 11/2002 | Kako et al. | |
| 6,535,153 B1 | 3/2003 | Zierhofer | |
| 6,633,793 B2 | 10/2003 | Wu et al. | |
| 6,856,891 B2 * | 2/2005 | Yasui | 701/109 |
| 6,925,372 B2 | 8/2005 | Yasui | |
| 6,985,809 B2 | 1/2006 | Yasui | |
| 7,124,013 B2 * | 10/2006 | Yasui | 701/103 |
| 2002/0026930 A1 * | 3/2002 | Ueno et al. | 123/679 |

FOREIGN PATENT DOCUMENTS

| | | |
|---|---|---|
| JP | 2000-332611 | 11/2000 |
| JP | 2001-107781 | 4/2001 |
| JP | 2001-154704 | 6/2001 |

* cited by examiner

FIG. 5A r(k)
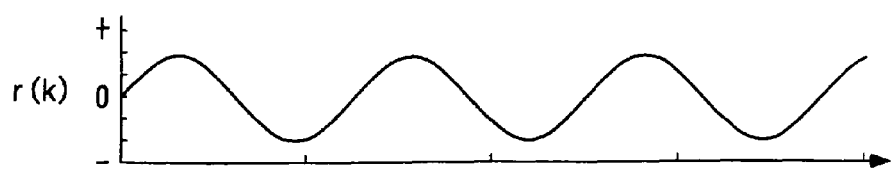
FIG. 5B δ(k)
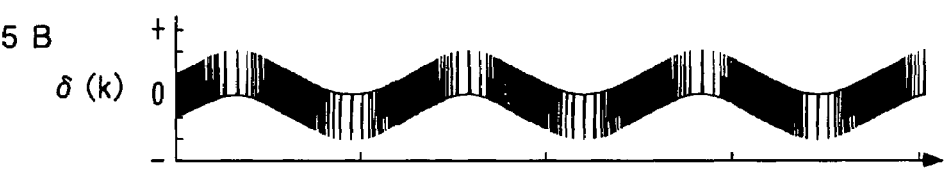
FIG. 5C σ_d(k)
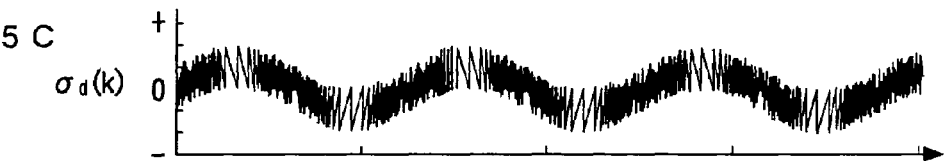
FIG. 5D u(k)
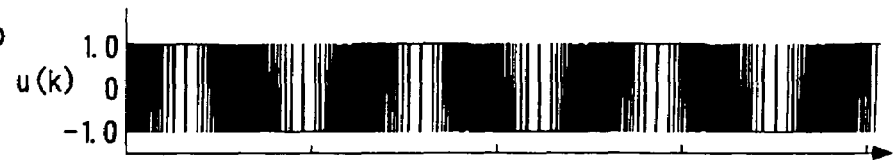
FIG. 5E y(k)
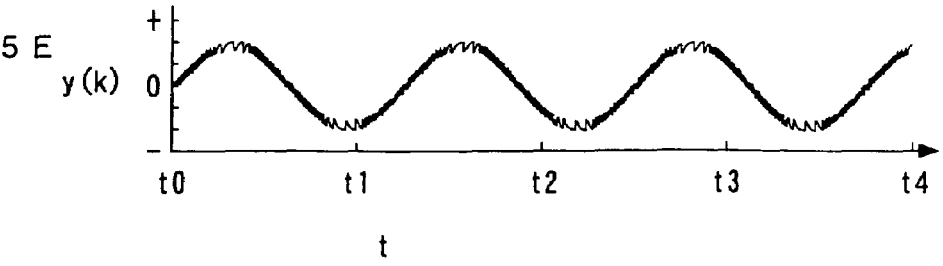

F I G. 2 2
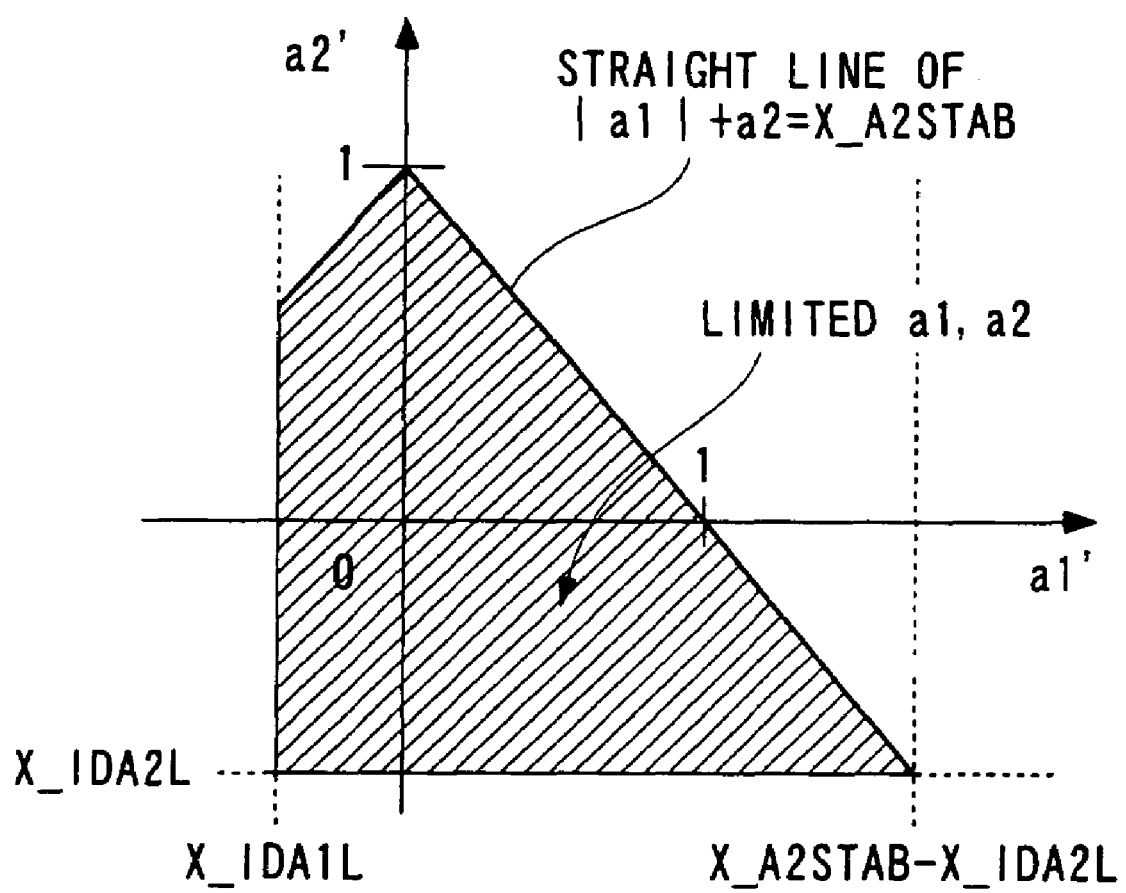

F I G. 2 4
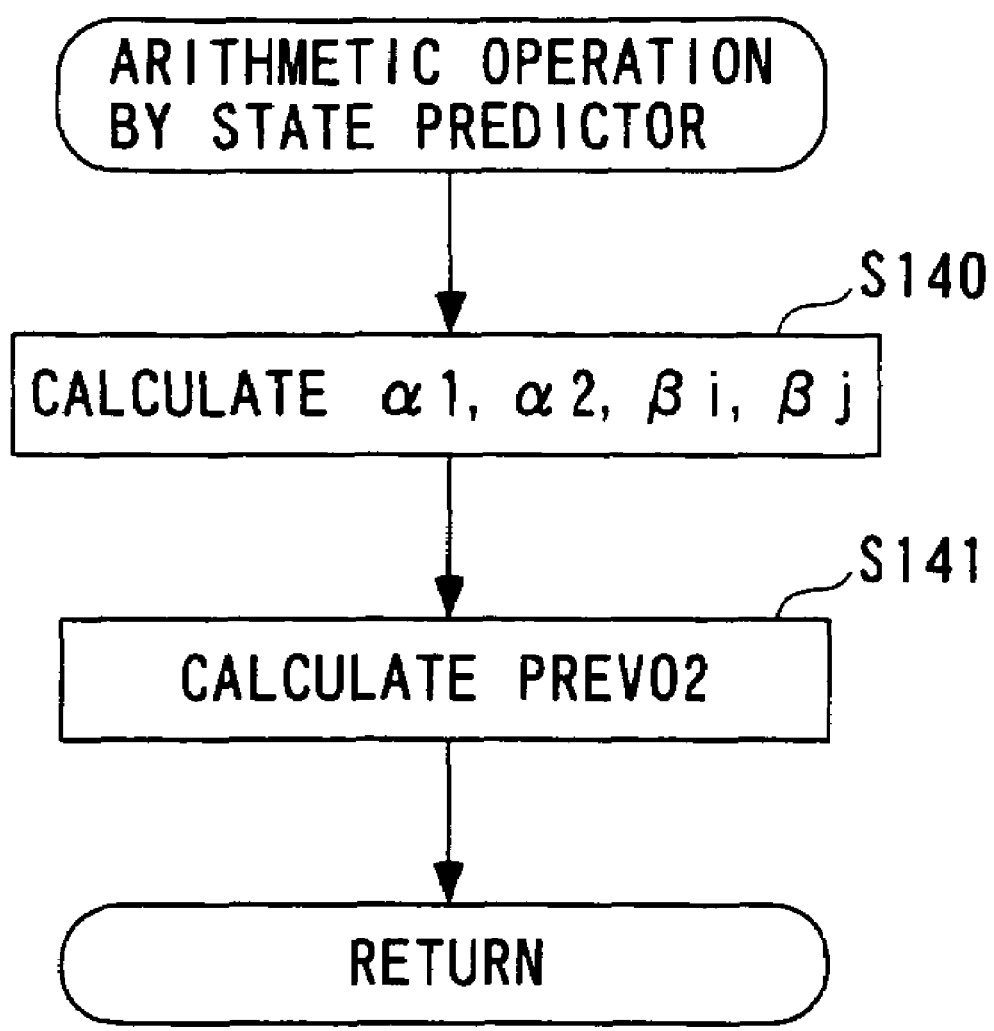

F I G. 2 6
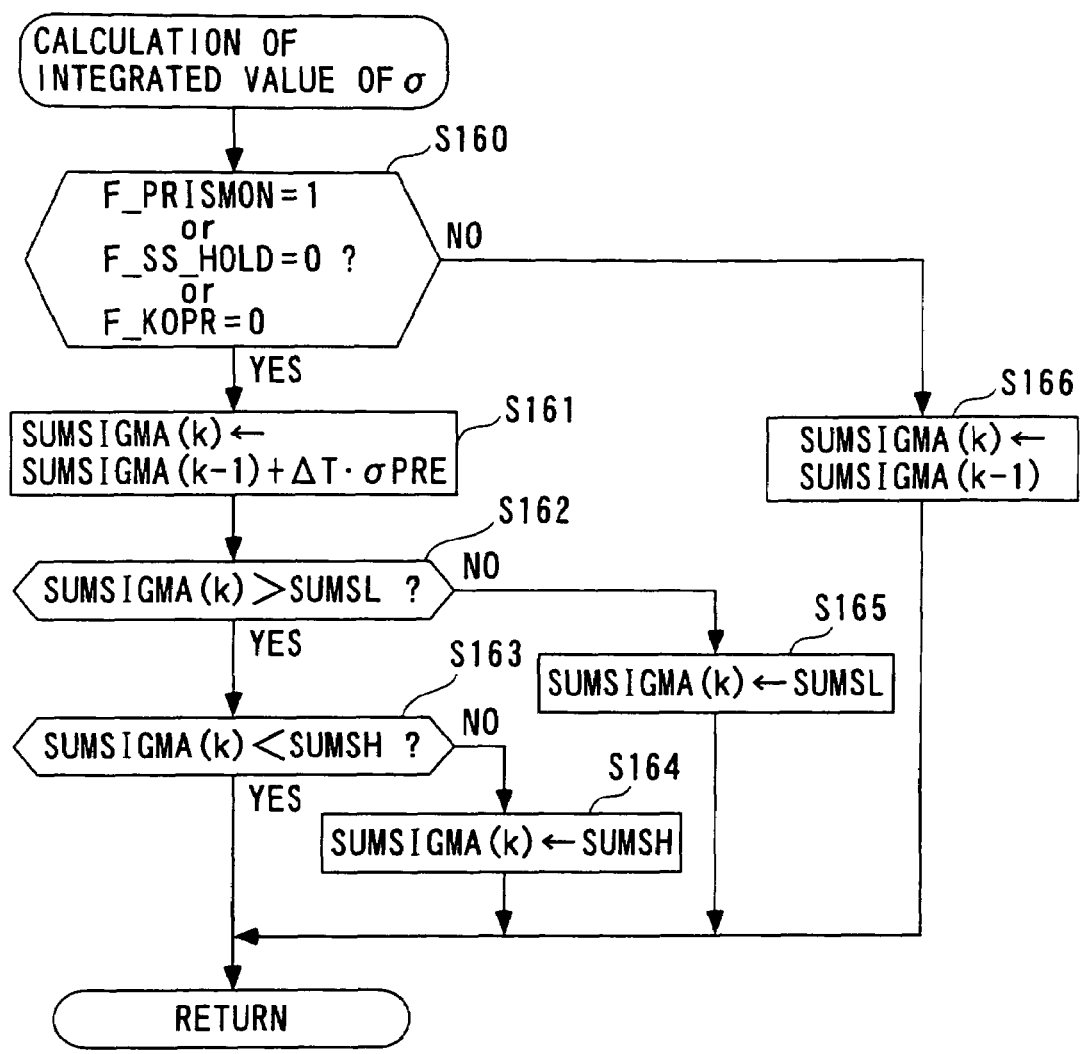

F I G. 3 0
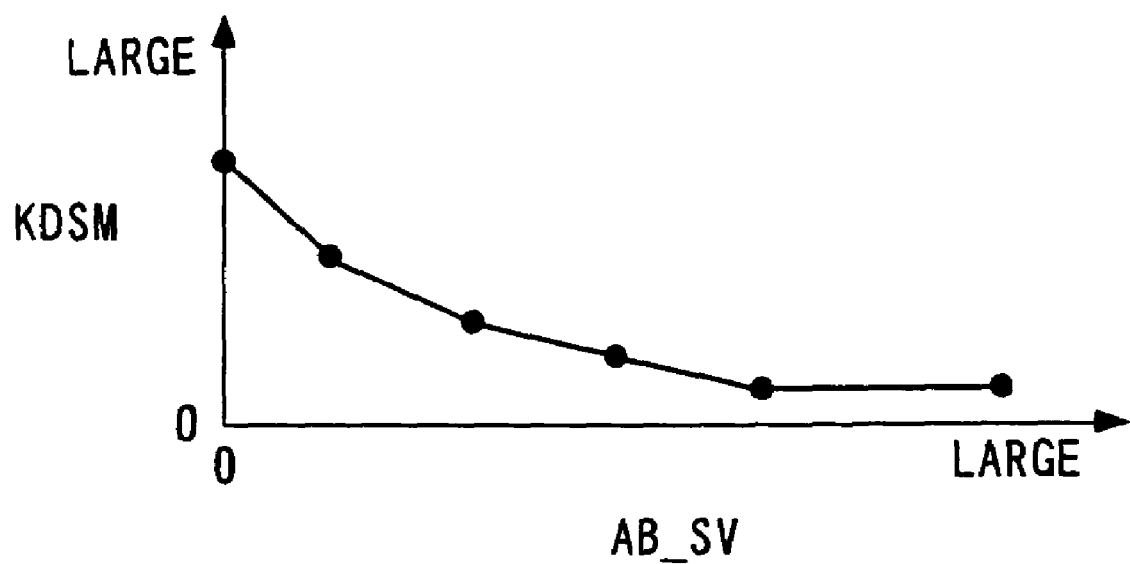

US 7,647,157 B2

CONTROL DEVICE, CONTROL METHOD, CONTROL UNIT, AND ENGINE CONTROL UNIT

REFERENCE TO RELATED APPLICATIONS

This is a Division of application Ser. No. 10/366,670, filed Feb. 14, 2003. The disclosure of the prior application is hereby incorporated by reference herein in its entirety.

BACKGROUND OF THE INVENTION

1. Field of the Invention

This invention relates to a control device, a control method, a control unit, and an engine control unit, for calculating a control input to a controlled object e.g. based on a $\Delta\Sigma$ modulation algorithm so as to control an output from the controlled object.

2. Description of the Prior Art

Conventionally, a control device of the above-mentioned kind has been disclosed e.g. in Japanese Laid-Open Patent Publication (Kokai) No. 2001-154704. The control device includes detection means that detects an output from a controlled object (i.e. controlled system) and then outputs a detection signal of an analog quantity indicative of the sensed output, deviation-calculating means that calculates a deviation between a target value of an analog quantity inputted from a host system and the detection signal, conversion means that converts the calculated deviation to a 1-bit digital signal, and compensation means that performs compensation for the 1-bit digital signal delivered from the conversion means and then inputs the same into the controlled object as an input signal (see FIG. 6 of the publication).

In this control device, the deviation (analog quantity) between the detection signal and the target value is calculated by the deviation-calculating means, the calculated deviation is converted to the 1-bit digital signal through $\Delta\Sigma$ modulation by the conversion means, and then the 1-bit digital signal is compensated for by the compensation means, followed by being inputted into the controlled object as the input signal. In the above process, an operation amount having an opposite phase to the deviation is generated so as to cancel out the deviation between the output from the controlled object and the target value, and inputted into the controlled object. As a result, the output from the controlled object is feedback-controlled to converge to the target value.

According to the above conventional control device, if the dynamic characteristics of the controlled object include relatively large phase delay or dead time, it takes time before an output signal reflecting the input signal is outputted from the controlled object after input of the input signal into the controlled object, which causes lag in control timing between the input and output of the controlled object. As a result, the controllability of the controlled object is degraded, which makes the control system unstable. For instance, when the fuel injection amount of an internal combustion engine is used as an input for controlling the air-fuel ratio of exhaust gases from the engine, it takes time before the air-fuel ratio of the exhaust gases actually changes after execution of fuel injection, which causes degradation of stability and controllability in control of the air-fuel ratio, thereby making unstable the characteristics of exhaust gases purified by a catalyst.

A control technique for compensating for the above-mentioned lag in control timing in a controlled object with significant phase delay or dead time has been disclosed e.g. in Japanese Laid-Open Patent Publication (Kokai) No. 2000-179385. In this control technique, a predicted value of an output from a controlled object, in which response delay due to phase delay or dead time in the controlled object is taken into account, is calculated by an identifier and a state predictor. More specifically, the controlled object having a target air-fuel ratio as an input thereof and an output from an air-fuel ratio sensor as an output thereof is modeled as a discrete-time system model in which the response delay is taken into account. Model parameters of the discrete-time system model are calculated by the identifier, and a predicted value of a deviation between the output from the air-fuel ratio sensor and the predetermined target value is calculated by the state predictor.

However, when the control technique described above is applied to the aforementioned conventional control device, there occurs the following problem: The conventional control device executes control by using a $\Delta\Sigma$ modulation algorithm, and therefore, as a control period (repetition period of control) is shorter, the control become more accurate. In other words, as the control period is set longer, the control accuracy is degraded. However, in the above control technique using the identifier and the state predictor, to set a calculation period of the identifier and the state predictor to be short does not necessarily lead to improvement of accuracy in the calculation of identified values of model parameters and the predicted value, but degrades the calculation accuracy in some cases. For instance, in a situation where changes in the input and output of the controlled object or the target value of the output from the controlled object are small, if the calculation period of the identifier and the state predictor is set short, the values calculated by the identifier and the state predictor cannot appropriately reflect the frequency characteristics of the controlled object, which results in degradation of the calculation accuracy all the worse.

SUMMARY OF THE INVENTION

It is an object of the invention to provide a control device, a control method, a control unit, and an engine control unit, which are capable of controlling a controlled object with relatively large phase delay and dead time, while attaining elimination of lag in control timing between the input and output of the controlled object and improvement of control accuracy at the same time.

To attain the above object, according to a first aspect of the invention, there is provided a control device comprising:

deviation-calculating means for calculating a deviation between an output from a controlled object and a predetermined target value at a predetermined deviation calculation period; and control input-calculating means for calculating a control input to the controlled object so as to converge the output from the controlled object to the target value, according to the calculated deviation, based on one of a $\Delta$ modulation algorithm, a $\Delta\Sigma$ modulation algorithm, and a $\Sigma\Delta$ modulation algorithm at a predetermined control input calculation period shorter than the predetermined deviation calculation period.

According to this control device, a deviation between an output from a controlled object and a predetermined target value is calculated by the deviation-calculating means at a predetermined deviation calculation period, and a control input to the controlled object to converge the output from the controlled object to the target value is calculated by the control input-calculating means, according to the calculated deviation, based on any one of the $\Delta$ modulation algorithm, the $\Delta\Sigma$ modulation algorithm, and the $\Sigma\Delta$ modulation algorithm at a predetermined control input calculation period shorter than the predetermined deviation calculation period. The deviation between the output from the controlled object and the predetermined target value is calculated at the predetermined deviation calculation period longer than the predetermined input calculation period as described above. For this reason, even when response delay (phase delay or dead time) in the controlled object is large or when a fluctuating frequency of the target value of the output from the controlled object is low, accuracy in the calculation of the control input can be improved by setting the predetermined input calculation period as short as possible. Further, for the same reason, even when high frequency noise mixes into the output from the controlled object due to the short control input calculation period, it is possible to avoid mixing of the high frequency noise into the calculated value of the deviation, so that accuracy in the calculation of the deviation can be ensured. Thus, the control device of the first aspect of the invention is capable of improving the controllability of the controlled object.

Preferably, the control input-calculating means calculates a first intermediate value according to the deviation, based on the one of the modulation algorithms, and calculates the control input based on a value obtained by multiplying the calculated first intermediate value by a predetermined gain.

In general, all of the $\Delta$ modulation algorithm, the $\Delta\Sigma$ modulation algorithm, and the $\Sigma\Delta$ modulation algorithm, determine a control input, assuming that the gain of a controlled object is equal to 1, and hence if the actual gain of the controlled object is not equal to 1, the control input cannot be calculated as an appropriate value, which results in degraded controllability. For instance, when the actual gain of the controlled object is larger than 1, the control input is calculated as a value larger than required, so that the controlled object can be placed in an over-gain condition. According to the above preferred embodiment, however, since the control input is calculated based on the value obtained by multiplying the calculated first intermediate value by the predetermined gain, excellent controllability can be attained by setting the predetermined gain properly.

Preferably, the control input-calculating means calculates a second intermediate value according to the deviation, based on the one of the modulation algorithms, and calculates the control input by adding a predetermined value to the calculated second intermediate value.

In general, all of the $\Delta$ modulation algorithm, the $\Delta\Sigma$ modulation algorithm and the $\Sigma\Delta$ modulation algorithm are capable of only calculating a control input that is repeatedly reversed in sign with respect to a value of 0. According to this preferred embodiment, however, since the control input-calculating means calculates the control input by adding the predetermined value to the second intermediate value calculated based on one of the modulation algorithms, it is possible to calculate the control input not only as a value that is repeatedly reversed in sign with respect to a value of 0, but also as a value repeatedly increased and decreased within a predetermined range with respect to the predetermined value, which contributes to enhancement of the degree of freedom in control.

To attain the above object, according to a second aspect of the invention, there is provided a control device comprising:

predicted value-calculating means for calculating a predicted value of a value indicative of an output from a controlled object, based on a predictive algorithm at a predetermined predicted value calculation period; and control input-calculating means for calculating a control input to the controlled object so as to control the output from the controlled object according to the calculated predicted value, based on one of a $\Delta$ modulation algorithm, a $\Delta\Sigma$ modulation algorithm, and a $\Sigma\Delta$ modulation algorithm at a predetermined control input calculation period shorter than the predetermined predicted value calculation period.

According to this control device, the predicted value of the value indicative of the output from the controlled object is calculated by the predicted value-calculating means, based on the predictive algorithm at the predetermined predicted value calculation period, and then the control input to the controlled object to control the output from the controlled object is calculated by the control input-calculating means, according to the calculated predicted value, based on any one of the $\Delta$ modulation algorithm, the $\Delta\Sigma$ modulation algorithm, and the $\Sigma\Delta$ modulation algorithm at the predetermined control input calculation period each of which is shorter than the predetermined predicted value calculation period. As described hereinabove, in a situation where changes in the input/output of the controlled object are small, if the calculation period of the state predictor is set short, the frequency characteristics of the controlled object cannot be appropriately reflected in the predicted value, which results in degradation of accuracy in the calculation of the predicted value all the worse.

However, in the control system according to the second aspect of the invention, since the predetermined predicted value calculation period is set longer than the predetermined input calculation period, in the case of controlling a controlled object with large phase delay and dead time, by setting the predetermined predicted value calculation period to a time period larger than the predetermined input calculation period and dependent on the frequency characteristics, it is possible to accurately calculate the predicted value as an appropriate value reflecting the dynamic characteristics, such as response delay and dead time, of the controlled object. This makes it possible to appropriately eliminate lag in control timing between the input and output of the controlled object by calculating the control input based on the accurate predicted value. For the same reason, when the predicted value-calculating means and the control input-calculating means are implemented by an arithmetic operation unit such as a microcomputer, arithmetic operations required for calculating the predicted value can be reduced compared with a case in which the predetermined predicted value calculation period is set equal to the control input calculation, which contributes to reduction of operation load on the arithmetic operation unit. As a result, the predetermined input calculation period can be set shorter, which makes it possible to enhance accuracy in the calculation of the control input. Thus, the control device according to the second aspect of the invention is capable of improving the controllability of the controlled object.

Preferably, the control input-calculating means calculates a first intermediate value according to the predicted value, based on the one of the modulation algorithms, and calculates the control input based on a value obtained by multiplying the calculated first intermediate value by a predetermined gain.

Also preferably, the control input-calculating means calculates a second intermediate value according to the predicted value, based on the one of the modulation algorithms, and calculates the control input by adding a predetermined value to the calculated second intermediate value.

According to these preferred embodiment, the same advantageous effects as provided by the corresponding preferred embodiments of the first aspect of the invention can be obtained.

Preferably, the control device further comprises output sampling means for sampling the value indicative of the output from the controlled object as discrete data at a predetermined output sampling period longer than the predetermined input calculation period, and the predictive algorithm is an algorithm for calculating the predicted value according to the sampled discrete data of the value indicative of the output from the controlled object.

According to this preferred embodiment, the discrete data of the value indicative of the output from the controlled object is sampled by the output sampling means, and the predicted value is calculated by the predicted value-calculating means, based on the predictive algorithm according to the sampled discrete data of the value indicative of the output from the controlled object. Therefore, by setting the output sampling period to an appropriate time period according to a frequency range where exists the power spectrum of the value indicative of the output from the controlled object, it is possible to adjust the frequency characteristics of the predictive value of the value indicative of the output from the controlled object to those of the controlled object, thereby further improving the controllability of the controlled object.

More preferably, the control device further comprises input sampling means for sampling at least one of a value indicative of the control input and a value reflecting the control input inputted into the controlled object as discrete data at a first predetermined input sampling period longer than the predetermined input calculation period, and the predictive algorithm is an algorithm for calculating the predicted value further according to at least one of the sampled discrete data of the value indicative of the control input and the sampled discrete data of the value reflecting the control input inputted into the controlled object.

According to this preferred embodiment, the sampled discrete data of the value indicative of the control input and/or the sampled discrete data of the value reflecting the control input inputted into the controlled object are sampled by the input sampling means at the first predetermined input sampling period longer than the predetermined input calculation period, and the predicted value is calculated by the predicted value-calculating means based on the predictive algorithm according to the sampled discrete data. Thus, the predicted value indicative of the output from the controlled object is calculated further according to the discrete data of the value indicative of the control input and/or the discrete data of the value reflecting the control input inputted into the controlled object, and hence even in the case of controlling a controlled object with large phase delay and dead time, it is possible to accurately calculate the predicted value as an appropriate value reflecting the dynamic characteristics, such as phase delay and dead time, of the controlled object, while avoiding mixing of high frequency noise due to the short control input calculation period into the calculated predicted value, and eliminate lag in control timing between the input and output of the controlled object with high accuracy. This makes it possible to further improve the controllability of the controlled object.

Further preferably, the input sampling means samples the at least one of the discrete data of the value indicative of the control input and the discrete data of the value reflecting the control input inputted into the controlled object at the first predetermined input sampling period, by performing decimation on values thereof sampled at a second predetermined input sampling period shorter than the first predetermined input sampling period.

According to this preferred embodiment, the discrete data of the value indicative of the control input and/or the discrete data of the value reflecting the control input inputted into the controlled object are sampled at the first predetermined input sampling period by performing decimation on values thereof sampled at the second predetermined input sampling period shorter than the first predetermined input sampling period, whereby in the calculation of the predicted value of the value indicative of the output from the controlled object, it is possible to reliably avoid mixing of high frequency noise due to the short control input calculation period into the calculated predicted value. Further, when the second input sampling period is set to the same time period to the predetermined input calculation period, it is possible to reduce arithmetic operation load.

Preferably, the predictive algorithm is an algorithm for calculating the predicted value based on a controlled object model using one of the value indicative of the control input and the value reflecting the control input inputted into the controlled object and the value indicative of the output from the controlled object as variables.

According to this preferred embodiment, the predicted value is calculated based on the controlled object model using one of the value indicative of the control input and the value reflecting the control input inputted into the controlled object, and the value indicative of the output from the controlled object as variables. Therefore, by defining the controlled object model such that the dynamic characteristics, such as phase delay and dead time, of the controlled object are reflected therein, it is possible to calculate the predicted value as a value appropriately reflecting the dynamic characteristics of the controlled object. As a result, the control stability can be attained, and the controllability can be enhanced.

More preferably, the control device further comprises sampling means for sampling at least one of the value indicative of the control input and the value reflecting the control input inputted into the controlled object and the value indicative of the output from the controlled object, as discrete data, at a first predetermined sampling period longer than the predetermined input calculation period, and the controlled object model is a discrete-time system model using one of the sampled discrete data of the value indicative of the control input and the sampled discrete data of the value reflecting the control input inputted into the controlled object and the sampled discrete data of the value indicative of the output from the controlled object as variables.

According to this preferred embodiment, the controlled object model is a discrete-time system model using discrete data of the value indicative of the control input or discrete data of the value reflecting the control input inputted into the controlled object and discrete data of the value indicative of the output from the controlled object, both of which are sampled at the first predetermined sampling period, as variables. Therefore, by properly setting the first predetermined sampling period, it is possible to cause the discrete-time system model to appropriately reflect the frequency characteristics of the controlled object, which contributes to enhancement of accuracy in the calculation of the predicted value. Further, since the discrete-time system model is used as a controlled object model, it is possible to identify model parameters more easily by using a general identification algorithm, such as a least-squares method, compared with a case where a continuous-time system model is employed.

Further preferably, the sampling means samples the at least one of the discrete data of the value indicative of the control input and the discrete data of the value reflecting the control input inputted into the controlled object at the first predetermined sampling period, by performing decimation on values thereof sampled at a second predetermined sampling period shorter than the first predetermined sampling period.

According to this preferred embodiment, the same advantageous effect as provided by the above preferred embodiment related to the input sampling means can be obtained.

Further preferably, the control device further comprises identification means for identifying model parameters of the discrete-time system model according to the discrete data of the value indicative of the output from the controlled object.

According to this preferred embodiment, the model parameters of the discrete-time system model are identified by the identification means, according to the discrete data of the value indicative of the output from the controlled object. Therefore, even when the dynamic characteristics of the controlled object change with the lapse of time or vary among individual controlled objects, it is possible to properly identify the model parameters in a manner coping therewith, which enables the dynamic characteristics of the controlled object model to be adapted to the real dynamic characteristics of the controlled object. This contributes to improvement of the controllability and control stability. In addition, the use of the discrete-time system model facilitates identification of the model parameters by the identification means.

Still more preferably, the identification means identifies the model parameters further according to the at least one of the discrete data of the value indicative of the control input and the discrete data of the value reflecting the control input inputted into the controlled object.

According to this preferred embodiment, since the model parameters are identified by the identification means, not only according to the discrete data of the value indicative of the output from the controlled object, but also according to the discrete data of the value indicative of the control input or the discrete data of the value reflecting the control input inputted into the controlled object, it is possible to identify the model parameters while observing the correlation between the input and output of the controlled object, thereby enhancing accuracy in the identification. This enables further improvement of the controllability and control stability.

Still more preferably, an identification period at which the model parameters are identified by the identification means is set to a longer time period than the predetermined input calculation period.

In general, in an arithmetic operation unit, excessive operation load caused by arithmetic operation carried out by identification means, such as an identifier, for identification of model parameters sometimes necessitates an increase in length of the predetermined input calculation period, which can degrade the controllability. According to this preferred embodiment, however, since the identification period is set to a longer time period than the predetermined input calculation period, the operation load applied to the arithmetic operation unit can be reduced, which makes it possible to shorten the predetermined input calculation period, thereby further enhancing the controllability of the controlled object.

To attain the above object, according to a third aspect of the invention, there is provided a control device for an internal combustion engine having a catalyst arranged in an exhaust passage thereof, the control device comprising:

a downstream air-fuel ratio sensor for outputting a detection signal indicative of an air-fuel ratio of exhaust gases on a downstream side of the catalyst arranged in the exhaust passage;

deviation-calculating means for calculating a deviation between an output from the downstream air-fuel ratio sensor and a predetermined target value at a predetermined deviation calculation period;

air-fuel ratio-calculating means for calculating a target air-fuel ratio of a mixture to be supplied to the engine so as to converge the output from the downstream air-fuel ratio sensor to the predetermined target value, according to the calculated deviation, based on any one of a $\Delta$ modulation algorithm, a $\Delta\Sigma$ modulation algorithm, and a $\Sigma\Delta$ modulation algorithm, at a predetermined air-fuel ratio calculation period shorter than the predetermined deviation calculation period; and air-fuel ratio control means for controlling an air-fuel ratio of the mixture to be supplied to the engine, according to the calculated target air-fuel ratio.

According to this control device, the deviation between the output from the downstream air-fuel ratio sensor, which is outputted as the detection signal indicative of the air-fuel ratio of exhaust gases on the downstream side of the catalyst, and the predetermined target value is calculated by the deviation-calculating means at the predetermined deviation calculation period, and the target air-fuel ratio of the mixture to be supplied to the internal combustion engine to converge the output from the downstream air-fuel ratio sensor to the target value is calculated by the air-fuel ratio-calculating means, based on any one of the $\Delta$ modulation algorithm, the $\Delta\Sigma$ modulation algorithm, and the $\Sigma\Delta$ modulation algorithm, according to the calculated deviation, at the predetermined air-fuel ratio calculation period shorter than the predetermined deviation calculation period. As described above, the deviation between the output from the downstream air-fuel ratio sensor and the target value is calculated at the predetermined deviation calculation period longer than the target air-fuel ratio calculation period, and hence even in the case of an air-fuel ratio control process in which delay (phase delay or dead time) in response of the output from the downstream air-fuel ratio sensor to supply of the mixture having the target air-fuel ratio to the engine is large, or in the case of the fluctuating frequency of the target value being low, accuracy in the calculation of the target air-fuel ratio can be enhanced by setting the target air-fuel ratio calculation period as short as possible. For the same reason, even when high frequency noise mixes into the output from the downstream air-fuel ratio sensor due to the short target air-fuel ratio calculation period, it is possible to avoid mixing of the high frequency noise into the calculated value of the deviation, whereby accuracy in the calculation of the deviation can be ensured. Thus, the target air-fuel ratio can be calculated as a value capable of accurately converging the output from the downstream air-fuel ratio sensor to the target value, which contributes to enhancement of controllability of the air-fuel ratio. Therefore, by setting the target value to an appropriate value, it is possible to enhance the rate of exhaust gas purification by the catalyst.

Preferably, the air-fuel ratio-calculating means calculates a first intermediate value according to the deviation, based on the one of the modulation algorithms, and calculates the target air-fuel ratio based on a value obtained by multiplying the calculated first intermediate value by a predetermined gain.

In general, all of the $\Delta$ modulation algorithm, the $\Delta\Sigma$ modulation algorithm, and the $\Sigma\Delta$ modulation algorithm, determine a control input, i.e. a target air-fuel ratio, assuming that the gain of a controlled object is equal to 1, and hence if the actual gain of the controlled object is not equal to 1, the target air-fuel ratio cannot be calculated as an appropriate value, which results in degraded controllability of the target air-fuel ratio. For instance, when the actual gain of the controlled object is larger than 1, the target air-fuel ratio is calculated as a value larger than required, so that the controlled object can be placed in an over-gain condition. According to this preferred embodiment, however, since the target air-fuel ratio is calculated based on the value obtained by multiplying the first intermediate value calculated based on one modulation algorithm, by the predetermined gain, by properly setting the predetermined gain, it is possible to attain excellent controllability of the target air-fuel ratio.

Preferably, the air-fuel ratio-calculating means calculates a second intermediate value according to the deviation, based on the one of the modulation algorithms, and calculates the target air-fuel ratio by adding a predetermined value to the calculated second intermediate value.

In general, all of the a modulation algorithm, the ΔΣ modulation algorithm and the ΣΔ modulation algorithm are capable of calculating only a control input that is repeatedly reversed in sign with respect to a value of 0. According to this preferred embodiment, however, since the air-fuel ratio-calculating means calculates the target air-fuel ratio as a control input by adding the predetermined value to the second intermediate value calculated based on one of the modulation algorithms, it is possible to calculate the control input not only as a value that is repeatedly reversed in sign with respect to a value of 0, but also as a value repeatedly increased and decreased within a predetermined range with respect to the predetermined value, which contributes to enhancement of the degree of freedom in control of the air-fuel ratio.

To attain the above object, according to a fourth aspect of the invention, there is provided a control device for an internal combustion engine having a catalyst arranged in an exhaust passage thereof, the control device comprising:

a downstream air-fuel ratio sensor for outputting a detection signal indicative of an air-fuel ratio of exhaust gases on a downstream side of the catalyst arranged in the exhaust passage;

predicted value-calculating means for calculating a predicted value of a value indicative of an output from the downstream air-fuel ratio sensor, based on a predictive algorithm at a predetermined predicted value calculation period;

air-fuel ratio-calculating means for calculating a target air-fuel ratio of a mixture to be supplied to the engine, for controlling the output from the downstream air-fuel ratio sensor according to the calculated predicted value, based on any one of a Δ modulation algorithm, a ΔΣ modulation algorithm, and a ΣΔ modulation algorithm, at a predetermined air-fuel ratio calculation period shorter than the predetermined predicted value calculation period; and air-fuel ratio control means for controlling an air-fuel ratio of the mixture to be supplied to the engine, according to the calculated target air-fuel ratio.

According to this control device, the predicted value of the value indicative of the output from the downstream air-fuel ratio sensor is calculated by the predicted value-calculating means, based on the predictive algorithm at the predetermined predicted value calculation period, and then the target air-fuel ratio of the mixture to be supplied to the internal combustion engine, for controlling the output from the downstream air-fuel ratio sensor is calculated by the air-fuel ratio-calculating means, according to the calculated predicted value, based on any one of the Δ modulation algorithm, the ΔΣ modulation algorithm and the ΣΔ modulation algorithm at the predetermined air-fuel ratio calculation period shorter than the predetermined predicted value calculation period. As described hereinbefore, in a situation where changes in the input/output of the controlled object, i.e. the target air-fuel ratio and the output from the downstream air-fuel ratio sensor are small, if the period at which the predicted value is calculated by the state predictor is set short, the calculated predicted value cannot properly reflect the frequency characteristics of the controlled object, which results in degraded accuracy in the calculation of the predicted value.

However, in the control system according to the fourth aspect of the invention, since the predetermined predicted value calculation period is set longer than the predetermined air-fuel ratio calculation period, in the case of controlling the output from the downstream air-fuel ratio sensor by the air-fuel ratio of the mixture supplied to the internal combustion engine, i.e. in the case of controlling the controlled object with large phase delay and dead time, by setting the predetermined predicted value calculation period to a time period longer than the predetermined air-fuel ratio calculation period and dependent on the frequency characteristics of the controlled object, it is possible to calculate the predicted value accurately as an appropriate value reflecting the dynamic characteristics, such as response delay and dead time, of the controlled object, while avoiding the influence of high frequency noise mixed into the calculated value of the target air-fuel ratio due to the short air-fuel ratio calculation period. As a result, by calculating the target air-fuel ratio based on the accurate predicted value, it is possible to appropriately eliminate lag in control timing between the air-fuel ratio of the mixture supplied to the engine and the output from the downstream air-fuel ratio sensor. For the same reason, when the predicted value-calculating means and the air-fuel ratio-calculating means are implemented by an arithmetic operation unit such as a microcomputer, arithmetic operations required for calculating the predicted value can be reduced compared with a case in which the predetermined predicted value calculation period is set equal to the predetermined air-fuel ratio calculation period, which contributes to reduction of operation load on the arithmetic operation unit. As a result, the predetermined air-fuel ratio calculation period can be set shorter, which makes it possible to enhance accuracy in the calculation of the air-fuel ratio. Thus, the control device according to the fourth aspect of the invention is capable of improving the controllability of the air-fuel ratio and enhancing the exhaust gas purification rate.

Preferably, the air-fuel ratio-calculating means calculates a first intermediate value according to the predicted value, based on the one of the modulation algorithms, and calculates the target air-fuel ratio based on a value obtained by multiplying the calculated first intermediate value by a predetermined gain.

Also preferably, the air-fuel ratio-calculating means calculates a second intermediate value according to the predicted value, based on the one of the modulation algorithms, and calculates the target air-fuel ratio by adding a predetermined value to the calculated second intermediate value.

According to these preferred embodiments, the same advantageous effects as provided by the corresponding preferred embodiments of the third aspect of the invention can be obtained.

Preferably, the control device further comprises output sampling means for sampling the value indicative of the output from the downstream air-fuel ratio sensor as discrete data at a predetermined output sampling period longer than the predetermined air-fuel ratio calculation period, and the predictive algorithm is an algorithm for calculating the predicted value according to the sampled discrete data of the value indicative of the output from the downstream air-fuel ratio sensor.

According to this preferred embodiment, the discrete data of the value indicative of the output from the downstream air-fuel ratio sensor is sampled by the output sampling means, and then the predicted value is calculated by the predicted value-calculating means, based on the sampled discrete data of the value indicative of the output from the downstream air-fuel ratio sensor. Therefore, by properly setting the output sampling period according to a frequency range where exists the power spectrum of the value indicative of the output from the downstream air-fuel ratio sensor, it is possible to adjust the frequency characteristics of the predicted value of the value indicative of the output from the downstream air-fuel ratio sensor to the frequency characteristics of the controlled object, which contributes to further improvement of the controllability and further enhancement of the exhaust gas purification rate.

More preferably, the control device further comprises air-fuel ratio sampling means for sampling a value indicative of the target air-fuel ratio as discrete data at a first predetermined air-fuel ratio sampling period longer than the predetermined air-fuel ratio calculation period, and the predictive algorithm is an algorithm for calculating the predicted value further according to the sampled discrete data of the value indicative of the target air-fuel ratio.

According to this preferred embodiment, the discrete data of the value indicative of the target air-fuel ratio is sampled by the air-fuel ratio sampling means at the first predetermined air-fuel ratio sampling period longer than the predetermined air-fuel ratio calculation period, and then the predicted value is calculated by the predicted value-calculating means, according to the sampled discrete data, based on the predictive algorithm. Thus, the predicted value indicative of the output from the downstream air-fuel ratio sensor is calculated also according to the discrete data of the value indicative of the target air-fuel ratio, and hence even in the case of controlling the air-fuel ratio of an internal combustion engine, i.e. a controlled object with large phase delay and dead time, it is possible to accurately calculate the predicted value as an appropriate value reflecting the dynamic characteristics, such as phase delay and dead time, of the controlled object, while avoiding mixing of high frequency noise due to the short air-fuel ratio calculation period into the calculated value of the target air-fuel ratio, to thereby eliminate lag in control timing between the target air-fuel ratio and the output from the downstream air-fuel ratio sensor, i.e. between the input and output of the controlled object with high accuracy. This contributes to further improvement of controllability of the air-fuel ratio control.

Further preferably, the air-fuel ratio sampling means samples the discrete data of the value indicative of the target air-fuel ratio at the first predetermined air-fuel ratio sampling period by performing decimation on values thereof sampled at a second predetermined air-fuel ratio sampling period shorter than the first predetermined air-fuel ratio sampling period.

According to this preferred embodiment, the discrete data of the value indicative of the target air-fuel ratio is sampled at the first predetermined air-fuel ratio sampling period by performing decimation on values sampled at the second air-fuel ratio sampling period shorter than the first air-fuel ratio sampling period, whereby in calculation of the predicted value of the value indicative of the output from the downstream air-fuel ratio sensor, it is possible to positively avoid mixing of high frequency noise due to the short air-fuel ratio calculation period into the calculated value of the target air-fuel ratio. Further, when the second air-fuel ratio sampling period is set to the same time period as the predetermined air-fuel ratio calculation period, it is possible to reduce arithmetic operation load.

Preferably, the predictive algorithm is an algorithm for calculating the predicted value based on a controlled object model using the value indicative of the target air-fuel ratio and the value indicative of the output from the downstream air-fuel ratio sensor as variables.

According to this preferred embodiment, the predicted value of the value indicative of the output from the downstream air-fuel ratio sensor is calculated based on the controlled object model using the value indicative of the target air-fuel ratio and the value indicative of the output from the downstream air-fuel ratio sensor as variables. Therefore, by defining the controlled object model such that the dynamic characteristics, such as phase delay and dead time, of the controlled object are reflected therein, it is possible to calculate the predicted value as a value properly reflecting the dynamic characteristics of the controlled object. As a result, stability in the air-fuel ratio control can be attained, and the controllability of the air-fuel ratio can be enhanced.

More preferably, the control device further comprises sampling means for sampling the value indicative of the target air-fuel ratio and the value indicative of the output from the downstream air-fuel ratio sensor as discrete data at a first predetermined sampling period longer than the predetermined air-fuel ratio calculation period, and the controlled object model is a discrete-time system model using the sampled discrete data of the value indicative of the target air-fuel ratio and the sampled discrete data of the value indicative of the output from the downstream air-fuel ratio sensor as variables.

According to this preferred embodiment, the controlled object model is a discrete-time system model using the discrete data of the value indicative of the target air-fuel ratio and the discrete data of the value indicative of the output from the downstream air-fuel ratio sensor, both of which are sampled at the first predetermined sampling period, as variables. Therefore, by properly setting the first predetermined sampling period, it is possible to cause the discrete-time system model to properly reflect the frequency characteristics of the controlled object with the value indicative of the target air-fuel ratio and the value indicative of the output from the downstream air-fuel ratio sensor as respective input and output thereof, which contributes to enhancement of accuracy in the calculation of the predicted value. Further, since the discrete-time system model is used as the controlled object model, it is possible to identify model parameters more easily by using a general identification algorithm, such as a least-squares method, compared with a case where a continuous-time system model is employed.

Further preferably, the sampling means samples the discrete data of the value indicative of the target air-fuel ratio at the first predetermined sampling period by performing decimation on values thereof sampled at a second predetermined sampling period shorter than the first predetermined sampling period.

According to this preferred embodiment, the same advantageous effects as provided by the above preferred embodiment related to the air-fuel ratio sampling means can be obtained.

Further preferably, the control device further comprises identification means for identifying model parameters of the discrete-time system model according to the discrete data of the value indicative of the output from the downstream air-fuel ratio sensor.

According to this preferred embodiment, the model parameters of the discrete-time system model are identified by the identification means, according to the discrete data of the value indicative of the output from the downstream air-fuel ratio sensor, and hence even when the dynamic characteristics of the controlled object with the value indicative of the target air-fuel ratio and the value indicative of the output from the downstream air-fuel ratio sensor as the respective input and output thereof change with the lapse of time or vary among individual controlled objects, it is possible to properly identify the model parameters in a manner coping therewith, which enables the dynamic characteristics of the controlled object model to be adapted to the real dynamic characteristics of the controlled object. As a result, accuracy and stability in the air-fuel ratio control can be improved, which contributes to enhancement of the exhaust gas purification rate. In addition, the use of the discrete-time system model facilitates identification of the model parameters by the identification means.

Still more preferably, the identification means identifies the model parameters further according to the discrete data of the value indicative of the target air-fuel ratio.

According to this preferred embodiment, since the model parameters are identified by the identification means, not only according to the discrete data of the value indicative of the output from the downstream air-fuel ratio sensor, but also according to the discrete data of the value indicative of the target air-fuel ratio, it is possible to identify the model parameters while observing the correlation between the input and output of the controlled object, thereby enhancing accuracy in the identification of the model parameters. As a result, accuracy and stability in the air-fuel ratio control can be further improved, which contributes to further enhancement of the exhaust gas purification rate.

Still more preferably, an identification period at which the model parameters are identified by the identification means is set to a longer time period than the predetermined air-fuel ratio calculation period.

In general, in an arithmetic operation unit, excessive operation load caused by arithmetic operation carried out by identification means, such as an identifier, for identification of model parameters sometimes necessitates an increase in length of a calculation period of the air-fuel ratio as the control input, which can degrade the controllability. According to this preferred embodiment, however, since the identification period is set to a longer time period than the predetermined air-fuel ratio calculation period, the operation load applied to the arithmetic operation unit can be reduced, which makes it possible to shorten a period at which the value indicative of the target air-fuel ratio is calculated. This contributes to further enhancement of accuracy in the air-fuel ratio control and makes it possible to achieve a further enhanced exhaust gas purification rate.

More preferably, the control device further comprises an upstream air-fuel ratio sensor for outputting a detection signal indicative of an air-fuel ratio of exhaust gases on an upstream side of the catalyst arranged in the exhaust passage of the engine, and air-fuel ratio sampling means for sampling at least one of the value indicative of the target air-fuel ratio and a value indicative of an output from the upstream air-fuel ratio sensor as discrete data at a first predetermined air-fuel ratio sampling period longer than the predetermined air-fuel ratio calculation period, and the predictive algorithm is an algorithm for calculating the predicted value further according to the at least one of the sampled discrete data of the value indicative of the target air-fuel ratio and the sampled discrete data of the value indicative of the output from the upstream air-fuel ratio sensor.

According to this preferred embodiment, when the predicted value is calculated not only according to the discrete data of the value indicative of the output from the downstream air-fuel ratio sensor, but also according to the discrete data of the value indicative of the target air-fuel ratio, the same advantageous effects as provided by the foregoing fourth preferred embodiment of the fourth aspect of the invention can be obtained. Further, when the predictive data is calculated not only according to the discrete data of the value indicative of the output from the downstream air-fuel ratio sensor or according to this and the discrete data of the value indicative of the target air-fuel ratio, but also according to the discrete data of the value indicative of the output from the upstream air-fuel ratio sensor, the state of the air-fuel ratio of exhaust gases on the upstream side of the catalyst can be reflected in the predicted value, which makes it possible to further enhance accuracy in the calculation of the predicted value.

Further preferably, the air-fuel ratio sampling means samples the at least one of the discrete data of the value indicative of the target air-fuel ratio and the discrete data of the value indicative of the output from the upstream air-fuel ratio sensor at the first predetermined air-fuel ratio sampling period by performing decimation on values thereof sampled at a second predetermined air-fuel ratio sampling period shorter than the first predetermined air-fuel ratio sampling period.

According to this preferred embodiment, when the discrete data of the value indicative of the target air-fuel ratio is sampled, the same advantageous effects as provided by the foregoing fifth preferred embodiment of the present aspect of the invention can be obtained. Further, when the discrete data of the value indicative of the output from the upstream air-fuel ratio sensor or this and the discrete data of the value indicative of the target air-fuel ratio are sampled, it is possible to reliably avoid mixing of high frequency noise due to the short air-fuel ratio calculation period into the discrete data of the value indicative of the output from the upstream air-fuel ratio sensor, which makes it possible to further enhance accuracy in the calculation of the predicted value of the value indicative of the output from the downstream air-fuel ratio sensor.

Preferably, the control device further comprises an upstream air-fuel ratio sensor for outputting a detection signal indicative of an air-fuel ratio of exhaust gases on an upstream side of the catalyst arranged in the exhaust passage of the engine, and the predictive algorithm is an algorithm for calculating the predicted value based on a controlled object model using one of the value indicative of the target air-fuel ratio and the value indicative of the output from the upstream air-fuel ratio sensor and the value indicative of the output from the downstream air-fuel ratio sensor as variables.

According to this preferred embodiment, when the controlled object model uses the value indicative of the target air-fuel ratio and the value indicative of the output from the downstream air-fuel ratio sensor as variables, the same advantageous effects as provided by the foregoing sixth preferred embodiment of the present aspect can be obtained. Further, when the controlled object model uses the value indicative of the output from the upstream air-fuel ratio sensor and the value indicative of the output from the downstream air-fuel ratio sensor as variables, the state of the air-fuel ratio on the upstream side of the catalyst can be reflected in the controlled object model, which makes it possible to further enhance accuracy in the calculation of the predicted value.

More preferably, the control device further comprises sampling means for sampling at least one of the value indicative of the target air-fuel ratio and the value indicative of the output from the upstream air-fuel ratio sensor and the value indicative of the output from the downstream air-fuel ratio sensor as discrete data at a first predetermined sampling period longer than the predetermined air-fuel ratio calculation period, and the controlled object model is a discrete-time system model using one of the sampled discrete data of the value indicative of the target air-fuel ratio and the sampled discrete data of the value indicative of the output from the upstream air-fuel ratio sensor and the sampled discrete data of the value indicative of the output from the downstream air-fuel ratio sensor as variables.

According to this preferred embodiment, when the controlled object model uses the discrete data of the value indicative of the target air-fuel ratio and the discrete data of the value indicative of the output from the downstream air-fuel ratio sensor as variables, the same advantageous effects as provided by the foregoing seventh preferred embodiment of the present aspect can be obtained. Further, when the controlled object model includes the discrete data of the value indicative of the output from the upstream air-fuel ratio sensor and the discrete data of the value indicative of the output from the downstream air-fuel ratio sensor as variables, the state of the air-fuel ratio on the upstream side of the catalyst can be reflected in the controlled object model i.e. the predicted value, which makes it possible to further enhance accuracy in the calculation of the predicted value.

Further preferably, the sampling means samples at least one of the discrete data of the value indicative of the target air-fuel ratio and the discrete data of the value indicative of the output from the upstream air-fuel ratio sensor at the first predetermined sampling period by performing decimation on values thereof sampled at a second predetermined sampling period shorter than the first predetermined sampling period.

According to this preferred embodiment, the same advantageous effects as provided by the foregoing preferred embodiment related to the air-fuel ratio sampling means can be obtained.

Further preferably, the control device further comprises identification means for identifying model parameters of the discrete-time system model according to the discrete data of the value indicative of the output from the downstream air-fuel ratio sensor.

According to this preferred embodiment, the same advantageous effects as provided by the foregoing preferred embodiment related to the identification means can be obtained.

Even more preferably, the identification means identifies the model parameters further according to the one of the discrete data of the value indicative of the target air-fuel ratio and the discrete data of the value indicative of the output from the upstream air-fuel ratio sensor.

According to this preferred embodiment, when the model parameters are identified also according to the discrete data of the value indicative of the target air-fuel ratio, the same advantageous effects as provided by the foregoing tenth preferred embodiment of the present aspect can be obtained. On the other hand, when the model parameters are identified also according to the discrete data of the value indicative of the output from the upstream air-fuel ratio sensor, it is possible to identify the model parameters while observing the correlation between the value indicative of the output from the upstream air-fuel ratio sensor and the value indicative of the output from the downstream air-fuel ratio sensor by using the discrete data of the value indicative of the output from the upstream air-fuel ratio sensor, which has smaller dead time than the value indicative of the target air-fuel ratio, thereby enhancing accuracy in the identification of the model parameters.

Even more preferably, an identification period at which the model parameters are identified by the identification means is set to a longer time period than the predetermined air-fuel ratio calculation period.

According to this preferred embodiment, the same advantageous effects as provided by the foregoing eleventh preferred embodiment of the present aspect can be obtained.

To attain the above object, according to a fifth aspect of the invention, there is provided a control method comprising the steps of:

calculating a deviation between an output from a controlled object and a predetermined target value at a predetermined deviation calculation period; and calculating a control input to the controlled object so as to converge the output from the controlled object to the target value, according to the calculated deviation, based on one of a $\Delta$ modulation algorithm, a $\Delta\Sigma$ modulation algorithm, and a $\Sigma\Delta$ modulation algorithm at a predetermined control input calculation period shorter than the predetermined deviation calculation period.

According to the fifth aspect of the invention, the same advantageous effects as provided by the first aspect of the invention can be obtained.

Preferably, the control input-calculating step includes calculating a first intermediate value according to the deviation, based on the one of the modulation algorithms, and calculating the control input based on a value obtained by multiplying the calculated first intermediate value by a predetermined gain.

Preferably, the control input-calculating step includes calculating a second intermediate value according to the deviation, based on the one of the modulation algorithms, and calculating the control input by adding a predetermined value to the calculated second intermediate value.

According to these preferred embodiment, the same advantageous effects as provided by the corresponding preferred embodiment of the first aspect of the invention can be obtained.

To attain the above object, according to a sixth aspect of the invention, there is provided a control method comprising the steps of:

calculating a predicted value of a value indicative of an output from a controlled object, based on a predictive algorithm at a predetermined predicted value calculation period; and calculating a control input to the controlled object so as to control the output from the controlled object according to the calculated predicted value, based on one of a $\Delta$ modulation algorithm, a $\Delta\Sigma$ modulation algorithm, and a $\Sigma\Delta$ modulation algorithm at a predetermined control input calculation period shorter than the predetermined predicted value calculation period.

According to the sixth aspect of the invention, the same advantageous effects as provided by the second aspect of the invention can be obtained.

Preferably, the control input-calculating step includes calculating a first intermediate value according to the predicted value, based on the one of the modulation algorithms, and calculating the control input based on a value obtained by multiplying the calculated first intermediate value by a predetermined gain.

Preferably, the control input-calculating step includes calculating a second intermediate value according to the predicted value, based on the one of the modulation algorithms, and calculating the control input by adding a predetermined value to the calculated second intermediate value.

Preferably, the control method further comprises the step of sampling the value indicative of the output from the controlled object as discrete data at a predetermined output sampling period longer than the predetermined input calculation period, and the predictive algorithm is an algorithm for calculating the predicted value according to the sampled discrete data of the value indicative of the output from the controlled object.

More preferably, the control method further comprises the step of sampling at least one of a value indicative of the control input and a value reflecting the control input inputted into the controlled object as discrete data at a first predetermined input sampling period longer than the predetermined input calculation period, and the predictive algorithm is an algorithm for calculating the predicted value further according to at least one of the sampled discrete data of the value indicative of the control input and the sampled discrete data of the value reflecting the control input inputted into the controlled object.

Further preferably, the step of sampling at least one of a value indicative, of the control input and a value reflecting the control input inputted into the controlled object includes sampling the at least one of the discrete data of the value indicative of the control input and the discrete data of the value reflecting the control input inputted into the controlled object at the first predetermined input sampling period, by performing decimation on values thereof sampled at a second predetermined input sampling period shorter than the first predetermined input sampling period.

Preferably, the predictive algorithm is an algorithm for calculating the predicted value based on a controlled object model using one of the value indicative of the control input and the value reflecting the control input inputted into the controlled object, and the value indicative of the output from the controlled object, as variables.

More preferably, the control method further comprises the step of sampling at least one of the value indicative of the control input and the value reflecting the control input inputted into the controlled object and the value indicative of the output from the controlled object, as discrete data, at a first predetermined sampling period longer than the predetermined input calculation period, and the controlled object model is a discrete-time system model using one of the sampled discrete data of the value indicative of the control input and the sampled discrete data of the value reflecting the control input inputted into the controlled object and the sampled discrete data of the value indicative of the output from the controlled object as variables.

Further preferably, the step of sampling at least one of the value indicative of the control input and the value reflecting the control input inputted into the controlled object and the value indicative of the output from the controlled object includes sampling the at least one of the discrete data of the value indicative of the control input and the discrete data of the value reflecting the control input inputted into the controlled object at the first predetermined sampling period, by performing decimation on values thereof sampled at a second predetermined sampling period shorter than the first predetermined sampling period.

Further preferably, the control method further comprises the step of identifying model parameters of the discrete-time system model according to the discrete data of the value indicative of the output from the controlled object.

Even more preferably, the identifying step includes identifying the model parameters further according to the at least one of the discrete data of the value indicative of the control input and the discrete data of the value reflecting the control input inputted into the controlled object.

Even more preferably, an identification period at which the model parameters are identified in the identifying step is set to a longer time period than the predetermined input calculation period.

According to these preferred embodiments, the same advantageous effects as provided by the corresponding preferred embodiment of the second aspect of the invention can be obtained.

To attain the above object, according to a seventh aspect of the invention, there is provided a control method for an internal combustion engine including a catalyst arranged in an exhaust passage thereof, the control method comprising the steps of:

detecting a parameter indicative of an air-fuel ratio of exhaust gases on a downstream side of the catalyst arranged in the exhaust passage;

calculating a deviation between the parameter and a predetermined target value at a predetermined deviation calculation period;

calculating a target air-fuel ratio of a mixture to be supplied to the engine so as to converge the parameter to the predetermined target value, according to the calculated deviation, based on any one of a $\Delta$ modulation algorithm, a $\Delta\Sigma$ modulation algorithm, and a $\Sigma\Delta$ modulation algorithm, at a predetermined air-fuel ratio calculation period shorter than the predetermined deviation calculation period; and controlling an air-fuel ratio of the mixture to be supplied to the engine, according to the calculated target air-fuel ratio.

According to the seventh aspect of the invention, the same advantageous effects as provided by the third aspect of the invention can be obtained.

Preferably, the target air-fuel ratio-calculating step includes calculating a first intermediate value according to the deviation, based on the one of the modulation algorithms, and calculating the target air-fuel ratio based on a value obtained by multiplying the calculated first intermediate value by a predetermined gain.

Preferably, the target air-fuel ratio-calculating step includes calculating a second intermediate value according to the deviation, based on the one of the modulation algorithms, and calculating the target air-fuel ratio by adding a predetermined value to the calculated second intermediate value.

According to these preferred embodiment, the same advantageous effects as provided by the corresponding preferred embodiment of the third aspect of the invention can be obtained.

To attain the above object, according to an eighth aspect of the invention, there is provided a control method for an internal combustion engine including a catalyst arranged in an exhaust passage thereof, the control method comprising the steps of:

detecting a parameter indicative of an air-fuel ratio of exhaust gases on a downstream side of the catalyst arranged in the exhaust passage;

calculating a predicted value of a value indicative of the parameter, based on a predictive algorithm at a predetermined predicted value calculation period;

calculating a target air-fuel ratio of a mixture to be supplied to the engine, for controlling the parameter according to the calculated predicted value, based on any one of a $\Delta$ modulation algorithm, a $\Delta\Sigma$ modulation algorithm, and a $\Sigma\Delta$ modulation algorithm, at a predetermined air-fuel ratio calculation period shorter than the predetermined predicted value calculation period; and controlling an air-fuel ratio of the mixture to be supplied to the engine, according to the calculated target air-fuel ratio.

According to the eighth aspect of the invention, the same advantageous effects as provided by the fourth aspect of the invention can be obtained.

Preferably, the target air-fuel ratio-calculating step includes calculating a first intermediate value according to the predicted value, based on the one of the modulation algorithms, calculating the target air-fuel ratio based on a value obtained by multiplying the calculated first intermediate value by a predetermined gain.

Preferably, the target air-fuel ratio-calculating step includes calculating a second intermediate value according to the predicted value, based on the one of the modulation algorithms, and calculating the target air-fuel ratio by adding a predetermined value to the calculated second intermediate value.

Preferably, the control method further comprises the step of sampling the value indicative of the parameter as discrete data at a predetermined output sampling period longer than the predetermined air-fuel ratio calculation period, and the predictive algorithm is an algorithm for calculating the predicted value according to the sampled discrete data of the value indicative of the parameter.

More preferably, the control method further comprises the step of sampling a value indicative of the target air-fuel ratio as discrete data at a first predetermined air-fuel ratio sampling period longer than the predetermined air-fuel ratio calculation period, and the predictive algorithm is an algorithm for calculating the predicted value further according to the sampled discrete data of the value indicative of the target air-fuel ratio.

Further preferably, the step of sampling a value indicative of the target air-fuel ratio includes sampling the discrete data of the value indicative of the target air-fuel ratio at the first predetermined air-fuel ratio sampling period by performing decimation on values thereof sampled at a second predetermined air-fuel ratio sampling period shorter than the first predetermined air-fuel ratio sampling period.

Preferably, the predictive algorithm is an algorithm for calculating the predicted value based on a controlled object model using the value indicative of the target air-fuel ratio and the value indicative of the parameter as variables.

More preferably, the control method further comprises the step of sampling the value indicative of the target air-fuel ratio and the value indicative of the parameter as discrete data at a first predetermined sampling period longer than the predetermined air-fuel ratio calculation period, and the controlled object model is a discrete-time system model using the sampled discrete data of the value indicative of the target air-fuel ratio and the sampled discrete data of the value indicative of the parameter as variables.

Further preferably, the step of sampling the value indicative of the target air-fuel ratio and the value indicative of the parameter includes sampling the discrete data of the value indicative of the target air-fuel ratio at the first predetermined sampling period by performing decimation on values thereof sampled at a second predetermined sampling period shorter than the first predetermined sampling period.

Further preferably, the control method further comprises the step of identifying model parameters of the discrete-time system model according to the discrete data of the value indicative of the parameter.

Even more preferably, the identifying step includes identifying the model parameters further according to the discrete data of the value indicative of the target air-fuel ratio.

Even more preferably, an identification period at which the model parameters are identified in the identifying step is set to a longer time period than the predetermined air-fuel ratio calculation period.

More preferably, the control method further comprises the steps of detecting an upstream parameter indicative of an air-fuel ratio of exhaust gases on an upstream side of the catalyst arranged in the exhaust passage of the engine, and sampling at least one of the value indicative of the target air-fuel ratio and a value indicative of the upstream parameter as discrete data at a first predetermined air-fuel ratio sampling period longer than the predetermined air-fuel ratio calculation period, and the predictive algorithm is an algorithm for calculating the predicted value further according to the at least one of the sampled discrete data of the value indicative of the target air-fuel ratio and the sampled discrete data of the value indicative of the upstream parameter.

More preferably, the step of sampling at least one of the value indicative of the target air-fuel ratio and a value indicative of the upstream parameter includes sampling the at least one of the discrete data of the value indicative of the target air-fuel ratio and the discrete data of the value indicative of the upstream parameter at the first predetermined air-fuel ratio sampling period by performing decimation on values thereof sampled at a second predetermined air-fuel ratio sampling period shorter than the first predetermined air-fuel ratio sampling period.

Preferably, the control method further comprises the step of detecting, an upstream parameter indicative of an air-fuel ratio of exhaust gases on an upstream side of the catalyst arranged in the exhaust passage of the engine, and the predictive algorithm is an algorithm for calculating the predicted value based on a controlled object model using one of the value indicative of the target air-fuel ratio and the value indicative of the upstream parameter and the value indicative of the parameter as variables.

More preferably, the control method further comprises the step of sampling at least one of the value indicative of the target air-fuel ratio and the value indicative of the upstream parameter and the value indicative of the parameter as discrete data at a first predetermined sampling period longer than the predetermined air-fuel ratio calculation period, and the controlled object model is a discrete-time system model using one of the sampled discrete data of the value indicative of the target air-fuel ratio and the sampled discrete data of the value indicative of the upstream parameter and the sampled discrete data of the value indicative of the parameter as variables.

Further preferably, the step of sampling at least one of the value indicative of the target air-fuel ratio and the value indicative of the upstream parameter and the value indicative of the parameter includes sampling at least one of the discrete data of the value indicative of the target air-fuel ratio and the discrete data of the value indicative of the upstream parameter at the first predetermined sampling period by performing decimation on values thereof sampled at a second predetermined sampling period shorter than the first predetermined sampling period.

Further preferably, the control method further comprises the step of identifying model parameters of the discrete-time system model according to the discrete data of the value indicative of the parameter.

Even more preferably, the identifying step includes identifying the model parameters further according to the one of the discrete data of the value indicative of the target air-fuel ratio and the discrete data of the value indicative of the upstream parameter.

Even more preferably, an identification period at which the model parameters are identified in the identifying step is set to a longer time period than the predetermined air-fuel ratio calculation period.

According to these preferred embodiments, the same advantageous effects as provided by the corresponding preferred embodiment of the third aspect of the invention can be obtained.

To attain the above object, according to a ninth aspect of the invention, there is provided a control unit including a control program for causing a computer to control a controlled object, wherein the control program causes the computer to calculate a deviation between an output from the controlled object and a predetermined target value at a predetermined deviation calculation period, and calculate a control input to the controlled object so as to converge the output from the controlled object to the target value, according to the calculated deviation, based on one of a $\Delta$ modulation algorithm, a $\Delta\Sigma$ modulation algorithm, and a $\Sigma\Delta$ modulation algorithm at a predetermined control input calculation period shorter than the predetermined deviation calculation period.

According to the ninth aspect of the invention, the same advantageous effects as provided by the first aspect of the invention can be obtained.

Preferably, in calculating the control input, the control program causes the computer to calculate a first intermediate value according to the deviation, based on the one of the modulation algorithms, and calculate the control input based on a value obtained by multiplying the calculated first intermediate value by a predetermined gain.

Preferably, in calculating the control input, the control program causes the computer to calculate a second intermediate value according to the deviation, based on the one of the modulation algorithms, and calculate the control input by adding a predetermined value to the calculated second intermediate value.

According to these preferred embodiment, the same advantageous effects as provided by the corresponding preferred embodiment of the second aspect of the invention can be obtained.

To attain the above object, according to a tenth aspect of the invention, there is provided a control unit including a control program for causing a computer to control a controlled object, wherein the control program causes the computer to calculate a predicted value of a value indicative of an output from the controlled object, based on a predictive algorithm at a predetermined predicted value calculation period, and calculate a control input to the controlled object so as to control the output from the controlled object according to the calculated predicted value, based on one of a $\Delta$ modulation algorithm, a $\Delta\Sigma$ modulation algorithm, and a $\Sigma\Delta$ modulation algorithm at a predetermined control input calculation period shorter than the predetermined predicted value calculation period.

According to the tenth aspect of the invention, the same advantageous effects as provided by the second aspect of the invention can be obtained.

Preferably, in calculating the control input, the control program causes the computer to calculate a first intermediate value according to the predicted value, based on the one of the modulation algorithms, and calculate the control input based on a value obtained by multiplying the calculated first intermediate value by a predetermined gain.

Preferably, in calculating the control input, the control program causes the computer to calculate a second intermediate value according to the predicted value, based on the one of the modulation algorithms, and calculate the control input by adding a predetermined value to the calculated second intermediate value.

Preferably, the control program causes the computer to further sample the value indicative of the output from the controlled object as discrete data at a predetermined output sampling period longer than the predetermined input calculation period, and the predictive algorithm is an algorithm for calculating the predicted value according to the sampled discrete data of the value indicative of the output from the controlled object.

More preferably, the control program causes the computer to further sample at least one of a value indicative of the control input and a value reflecting the control input inputted into the controlled object as discrete data at a first predetermined input sampling period longer than the predetermined input calculation period, and the predictive algorithm is an algorithm for calculating the predicted value further according to at least one of the sampled discrete data of the value indicative of the control input and the sampled discrete data of the value reflecting the control input inputted into the controlled object.

Further preferably, when the control program causes the computer to sample at least one of a value indicative of the control input and a value reflecting the control input inputted into the controlled object, the control program causes the computer to sample the at least one of the discrete data of the value indicative of the control input and the discrete data of the value reflecting the control input inputted into the controlled object at the first predetermined input sampling period, by performing decimation on values thereof sampled at a second predetermined input sampling period shorter than the first predetermined input sampling period.

Preferably, the predictive algorithm is an algorithm for calculating the predicted value based on a controlled object model using one of the value indicative of the control input and the value reflecting the control input inputted into the controlled object, and the value indicative of the output from the controlled object, as variables.

More preferably, the control program causes the computer to further sample at least one of the value indicative of the control input and the value reflecting the control input inputted into the controlled object and the value indicative of the output from the controlled object, as discrete data, at a first predetermined sampling period longer than the predetermined input calculation period, and the controlled object model is a discrete-time system model using one of the sampled discrete data of the value indicative of the control input and the sampled discrete data of the value reflecting the control input inputted into the controlled object and the sampled discrete data of the value indicative of the output from the controlled object as variables.

Further preferably, when the control program causes the computer to sample at least one of the value indicative of the control input and the value reflecting the control input inputted into the controlled object and the value indicative of the output from the controlled object, the control program causes the computer to sample the at least one of the discrete data of the value indicative of the control input and the discrete data of the value reflecting the control input inputted into the controlled object at the first predetermined sampling period, by performing decimation on values thereof sampled at a second predetermined sampling period shorter than the first predetermined sampling period.

Further preferably, the control program causes the computer to further identify model parameters of the discrete-time system model according to the discrete data of the value indicative of the output from the controlled object.

Even more preferably, when the control program causes the computer to identify model parameters of the discrete-time system model, the control program causes the computer to identify the model parameters further according to the at least one of the discrete data of the value indicative of the control input and the discrete data of the value reflecting the control input inputted into the controlled object.

Even more preferably, an identification period at which the model parameters are identified is set to a longer time period than the predetermined input calculation period.

According to these preferred embodiments, the same advantageous effects as provided by the corresponding preferred embodiment of the third aspect of the invention can be obtained.

To attain the above object, according to an eleventh aspect of the invention, there is provided an engine control unit including a control program for causing a computer to control an internal combustion engine including a catalyst arranged in an exhaust passage thereof, wherein the control program causes the computer to detect a parameter indicative of an air-fuel ratio of exhaust gases on a downstream side of the catalyst arranged in the exhaust passage, calculate a deviation between the parameter and a predetermined target value at a predetermined deviation calculation period, calculate a target air-fuel ratio of a mixture to be supplied to the engine so as to converge the parameter to the predetermined target value, according to the calculated deviation, based on any one of a $\Delta$ modulation algorithm, a $\Delta\Sigma$ modulation algorithm, and a $\Sigma\Delta$ modulation algorithm, at a predetermined air-fuel ratio calculation period shorter than the predetermined deviation calculation period, and control an air-fuel ratio of the mixture to be supplied to the engine, according to the calculated target air-fuel ratio.

According to the eleventh aspect of the invention, the same advantageous effects as provided by the third aspect of the invention can be obtained.

Preferably, the control program causes the computer to calculate a first intermediate value according to the deviation, based on the one of the modulation algorithms, and calculate the target air-fuel ratio based on a value obtained by multiplying the calculated first intermediate value by a predetermined gain.

Preferably, the control program causes the computer to calculate a second intermediate value according to the deviation, based on the one of the modulation algorithms, and calculating the target air-fuel ratio by adding a predetermined value to the calculated second intermediate value.

According to these preferred embodiment, the same advantageous effects as provided by the corresponding preferred embodiment of the third aspect of the invention can be obtained.

To attain the above object, according to a twelfth aspect of the invention, there is provided an engine control unit including a control program for causing a computer to control an internal combustion engine including a catalyst arranged in an exhaust passage thereof, wherein the control program causes the computer to detect a parameter indicative of an air-fuel ratio of exhaust gases on a downstream side of the catalyst arranged in the exhaust passage, calculate a predicted value of a value indicative of the parameter, based on a predictive algorithm at a predetermined predicted value calculation period, calculate a target air-fuel ratio of a mixture to be supplied to the engine, for controlling the parameter according to the calculated predicted value, based on any one of a $\Delta$ modulation algorithm, a $\Delta\Sigma$ modulation algorithm, and a $\Sigma\Delta$ modulation algorithm, at a predetermined air-fuel ratio calculation period shorter than the predetermined predicted value calculation period, and control an air-fuel ratio of the mixture to be supplied to the engine, according to the calculated target air-fuel ratio.

According to the twelfth aspect of the invention, the same advantageous effects as provided by the fourth aspect of the invention can be obtained.

Preferably, the control program causes the computer to calculate a first intermediate value according to the predicted value, based on the one of the modulation algorithms, and calculate the target air-fuel ratio based on a value obtained by multiplying the calculated first intermediate value by a predetermined gain.

Preferably, the control program causes the computer to calculate a second intermediate value according to the predicted value, based on the one of the modulation algorithms, and calculate the target air-fuel ratio by adding a predetermined value to the calculated second intermediate value.

Preferably, the control program causes the computer to further sample the value indicative of the parameter as discrete data at a predetermined output sampling period longer than the predetermined air-fuel ratio calculation period, and the predictive algorithm is an algorithm for calculating the predicted value according to the sampled discrete data of the value indicative of the parameter.

Preferably, the control program causes the computer to further sample a value indicative of the target air-fuel ratio as discrete data at a first predetermined air-fuel ratio sampling period longer than the predetermined air-fuel ratio calculation period, and the predictive algorithm is an algorithm for calculating the predicted value further according to the sampled discrete data of the value indicative of the target air-fuel ratio.

More preferably, the control program causes the computer to further sample the discrete data of the value indicative of the target air-fuel ratio at the first predetermined air-fuel ratio sampling period by performing decimation on values thereof sampled at a second predetermined air-fuel ratio sampling period shorter than the first predetermined air-fuel ratio sampling period.

Further preferably, the predictive algorithm is an algorithm for calculating the predicted value based on a controlled object model using the value indicative of the target air-fuel ratio and the value indicative of the parameter as variables.

Preferably, the control program causes the computer to sample the value indicative of the target air-fuel ratio and the value indicative of the parameter as discrete data at a first predetermined sampling period longer than the predetermined air-fuel ratio calculation period, and the controlled object model is a discrete-time system model using the sampled discrete data of the value indicative of the target air-fuel ratio and the sampled discrete data of the value indicative of the parameter as variables.

More preferably, when the control program causes the computer to sample the value indicative of the target air-fuel ratio and the value indicative of the parameter, the control program causes the computer to sample the discrete data of the value indicative of the target air-fuel ratio at the first predetermined sampling period by performing decimation on values thereof sampled at a second predetermined sampling period shorter than the first predetermined sampling period.

Further preferably, the control program causes the computer to further identify model parameters of the discrete-time system model according to the discrete data of the value indicative of the parameter.

Even more preferably, the control program causes the computer to further identify the model parameters further according to the discrete data of the value indicative of the target air-fuel ratio.

Even more preferably, an identification period at which the model parameters are identified is set to a longer time period than the predetermined air-fuel ratio calculation period.

More preferably, the control program causes the computer to detect an upstream parameter indicative of an air-fuel ratio of exhaust gases on an upstream side of the catalyst arranged in the exhaust passage of the engine, and sample at least one of the value indicative of the target air-fuel ratio and a value indicative of the upstream parameter as discrete data at a first predetermined air-fuel ratio sampling period longer than the predetermined air-fuel ratio calculation period, and the predictive algorithm is an algorithm for calculating the predicted value further according to the at least one of the sampled discrete data of the value indicative of the target air-fuel ratio and the sampled discrete data of the value indicative of the upstream parameter.

Further preferably, when the control program causes the computer to sample at least one of the value indicative of the target air-fuel ratio and a value indicative of the upstream parameter, the control program causes the computer to sample the at least one of the discrete data of the value indicative of the target air-fuel ratio and the discrete data of the value indicative of the upstream parameter at the first predetermined air-fuel ratio sampling period by performing decimation on values thereof sampled at a second predetermined air-fuel ratio sampling period shorter than the first predetermined air-fuel ratio sampling period.

Preferably, the control program causes the computer to detect an upstream parameter indicative of an air-fuel ratio of exhaust gases on an upstream side of the catalyst arranged in the exhaust passage of the engine, and the predictive algorithm is an algorithm for calculating the predicted value based on a controlled object model using one of the value indicative of the target air-fuel ratio and the value indicative of the upstream parameter and the value indicative of the parameter as variables.

More preferably, the control program causes the computer to further sample at least one of the value indicative of the target air-fuel ratio and the value indicative of the upstream parameter and the value indicative of the parameter as discrete data at a first predetermined sampling period longer than the predetermined air-fuel ratio calculation period, and the controlled object model is a discrete-time system model using one of the sampled discrete data of the value indicative of the target air-fuel ratio and the sampled discrete data of the value indicative of the upstream parameter and the sampled discrete data of the value indicative of the parameter as variables.

Further preferably, when the control program causes the computer to sample at least one of the value indicative of the target air-fuel ratio and the value indicative of the upstream parameter and the value indicative of the parameter, the control program causes the computer to sample at least one of the discrete data of the value indicative of the target air-fuel ratio and the discrete data of the value indicative of the upstream parameter at the first predetermined sampling period by performing decimation on values thereof sampled at a second predetermined sampling period shorter than the first predetermined sampling period.

Further preferably, the control program causes the computer to further identify model parameters of the discrete-time system model according to the discrete data of the value indicative of the parameter.

Even more preferably, the control program causes the computer to identify the model parameters further according to the one of the discrete data of the value indicative of the target air-fuel ratio and the discrete data of the value indicative of the upstream parameter.

Even more preferably, an identification period at which the model parameters are identified is set to a longer time period than the predetermined air-fuel ratio calculation period.

According to these preferred embodiments, the same advantageous effects as provided by the corresponding preferred embodiment of the fourth aspect of the invention can be obtained.

The above and other objects, features, and advantages of the invention will become more apparent from the following detailed description taken in conjunction with the accompanying drawings.

BRIEF DESCRIPTION OF THE DRAWINGS

FIGS. 5A to 5E provide a timing chart showing an example of control by the FIG. 4 control system;

FIG. 22 is a diagram showing a limited range to which combinations of a1' & a2' are limited by the FIG. 21 process;

FIG. 24 is a flowchart of an arithmetic operation process carried out by the state predictor in a step S33 in FIG. 10;

FIG. 26 is a flowchart of an integrated value-calculating process executed in a step S151 in FIG. 25 so as to calculate an integrated value σPRE;

FIG. 30 shows an example of a table for use in calculating KDSM;

DETAILED DESCRIPTION OF PREFERRED EMBODIMENTS

Figure 1:
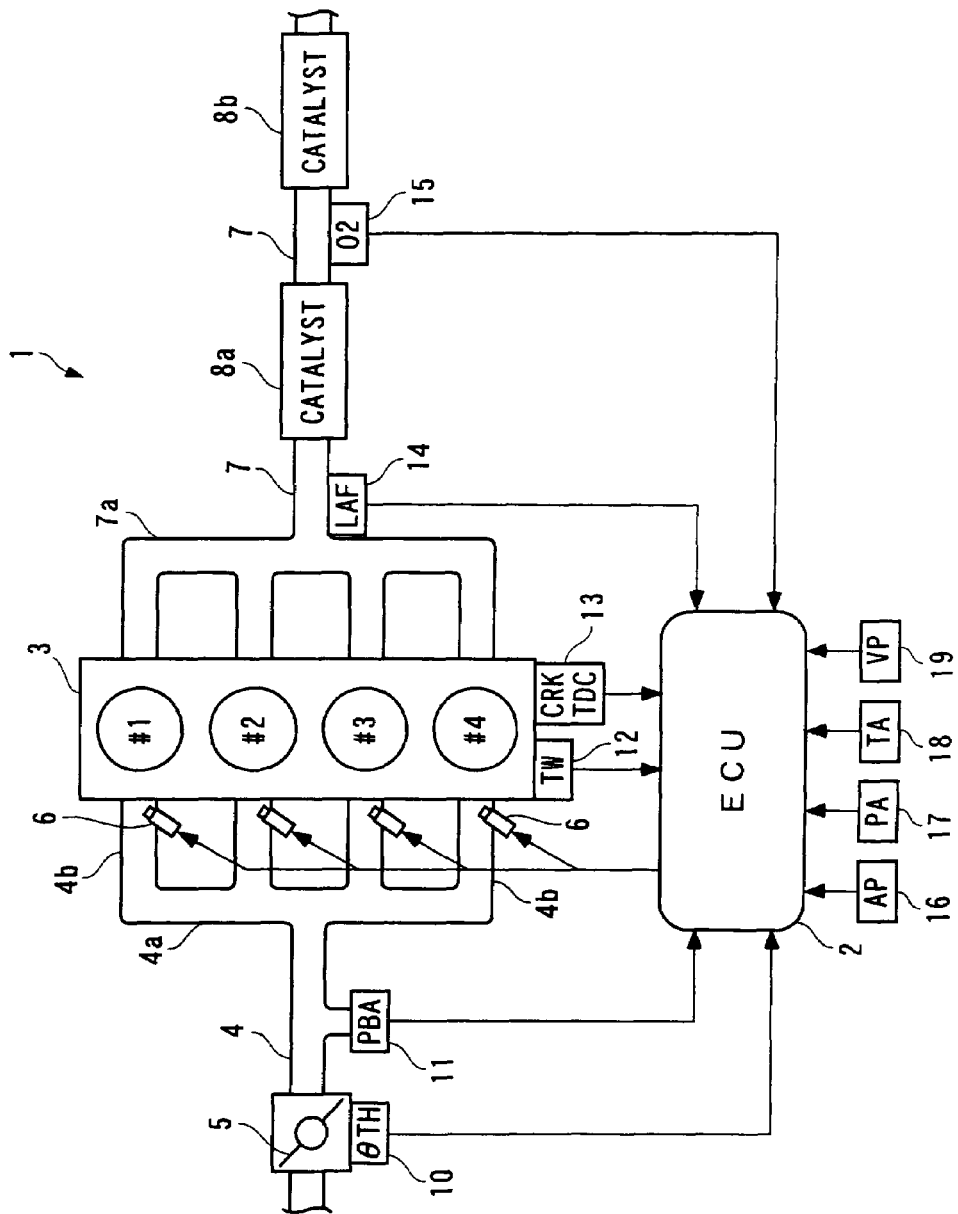
FIG. 1 is a block diagram schematically showing the arrangement of a control device according to a first embodiment of the invention and an internal combustion engine to which the control device is applied.

The invention will now be described in detail with reference to drawings showing preferred embodiments thereof. In these embodiments, a control device (control method, control unit, engine control unit) according to the invention is configured to control the air-fuel ratio of a mixture supplied to an internal combustion engine. Referring first to FIG. 1, there is schematically shown the arrangement of a control device 1 according to a first embodiment of the invention and an internal combustion engine 3 to which the control device 1 is applied. As shown in the figure, the control device 1 includes an ECU 2 which controls the air-fuel ratio of an air-fuel mixture supplied to the internal combustion engine (hereinafter simply referred to as "the engine") 3, as described hereinafter, according to operating conditions of the engine 3.

The engine 3 is an inline four-cylinder gasoline engine installed on an automotive vehicle, not shown, and has first to fourth cylinders #1 to #4. In the vicinity of a throttle valve 5 arranged in an intake pipe 4 of the engine 3, there is provided a throttle valve opening sensor 10 implemented e.g. by a potentiometer, for detecting the degree of opening (hereinafter referred to as "throttle valve opening") θTH of the throttle valve 5 to deliver an electric signal indicative of the sensed throttle valve opening θTH to the ECU 2.

Further, an intake pipe absolute pressure sensor 11 is arranged at a location downstream of the throttle valve 5 in communication with the inside of the intake pipe 4. The intake pipe absolute pressure sensor 11 is implemented e.g. by a semiconductor pressure sensor for detecting the intake pipe absolute pressure PBA within the intake pipe 4 to deliver an electric signal indicative of the sensed intake pipe absolute pressure PBA to the ECU 2.

The intake pipe 4 is connected to the four cylinders #1 to #4 via four branch portions 4b of an intake manifold 4a. In the branch portions 4b, injectors 6 are inserted at respective locations upstream of intake ports, not shown, for the cylinders. Each injector 6 is controlled as to a final fuel injection amount TOUT over which the injector 6 is open, and fuel injection timing, by a drive signal delivered from the ECU 2 during operation of the engine 3.

Further, an engine coolant temperature sensor 12 formed e.g. by a thermistor is mounted in a cylinder block of the engine 3. The engine coolant temperature sensor 12 senses an engine coolant temperature TW which is the temperature of an engine coolant circulating through the cylinder block of the engine 3 and delivers a signal indicative of the sensed engine coolant temperature TW to the ECU 2.

A crank angle position sensor 13 is arranged for a crankshaft, not shown, of the engine 3, for delivering a CRK signal and a TDC signal, which are both pulse signals, to the ECU 2 in accordance with rotation of the crankshaft.

Each pulse of the CRK signal is generated whenever the crankshaft rotates through a predetermined angle (e.g. 30 degrees). The ECU 2 determines a rotational speed (hereinafter referred to as "the engine rotational speed") NE of the engine 3, based on the CRK signal. The TDC signal indicates that each piston, not shown, in an associated cylinder is in a predetermined crank angle position immediately before the TDC position at the start of the intake stroke, and each pulse of the TDC signal is generated whenever the crankshaft rotates through a predetermined angle.

On the other hand, first and second catalytic devices 8a, 8b (catalyst) are arranged in the mentioned order from upstream to downstream in an exhaust pipe 7 (exhaust passage) at respective locations downstream of an exhaust manifold 7a thereof. Each catalytic device 8a(8b) is a combination of a NOx catalyst and a three-way catalyst. Although not shown, the NOx catalyst is formed by coating a surface of a base material having a honeycomb structure with an iridium catalyst (calcined material of silica and silicon carbide whisker powder carrying iridium) and then further applying a coating of perovskite double-oxide (calcined material of $LaCoO_3$ powder and silica) to the coated surface of the base material. The catalytic device 8a(8b) eliminates NOx from exhaust gases emitted during a lean burn operation of the engine 3 by oxidation-reduction catalytic actions of the NOx catalyst, and eliminates CO, HC, and NOx from exhaust gases emitted during other operations of the engine 3 than the lean burn operation by oxidation-reduction catalytic actions of the three-way catalyst. It should be noted that the catalytic device 8a(8b) is not limited to the combination of a NOx catalyst and a three-way catalyst, but it may be implemented by any catalyst which is capable of eliminating CO, HC, and NOx from exhaust gases. For instance, the catalytic device 8a(8b) may be formed by a non-metal catalyst such as a perovskite catalyst and/or a metal catalyst such as a three-way catalyst.

An oxygen concentration sensor (hereinafter referred to as "the O2 sensor") 15 is inserted into the exhaust pipe 7 between the first and second catalytic devices 8a, 8b. The O2 sensor 15 (downstream air-fuel ratio sensor) is comprised of a zirconia layer and platinum electrodes, and delivers to the ECU 2 an output Vout dependent on the concentration of oxygen contained in exhaust gases downstream of the first catalytic device 8a. The output Vout (output from a controlled object) assumes a high-level voltage value (e.g. 0.8 V) when an air-fuel mixture having a richer air-fuel ratio than the stoichiometric air-fuel ratio has been burned, whereas it assumes a low-level voltage value (e.g. 0.2 V) when an air-fuel mixture having a leaner air-fuel ratio than the stoichiometric air-fuel ratio has been burned. Further, when the air-fuel ratio of the mixture is close to the stoichiometric air-fuel ratio, the output Vout assumes a predetermined target value Vop (e.g. 0.6 V)(see FIG. 2).

Further, a LAF sensor 14 (upstream air-fuel ratio sensor) is mounted in the vicinity of the base portion of the exhaust manifold 7a. The LAF sensor 14 is formed by combining a sensor similar to the O2 sensor 15 and a detection circuit, such as a linearizer, and detects the concentration of oxygen contained in exhaust gases linearly in a wide range of the air-fuel ratio ranging from a rich region to a lean region, to deliver an output KACT proportional to the sensed oxygen concentration to the ECU 2. The output KACT is expressed as an equivalent ratio proportional to the reciprocal of the air-fuel ratio.

Figure 2:
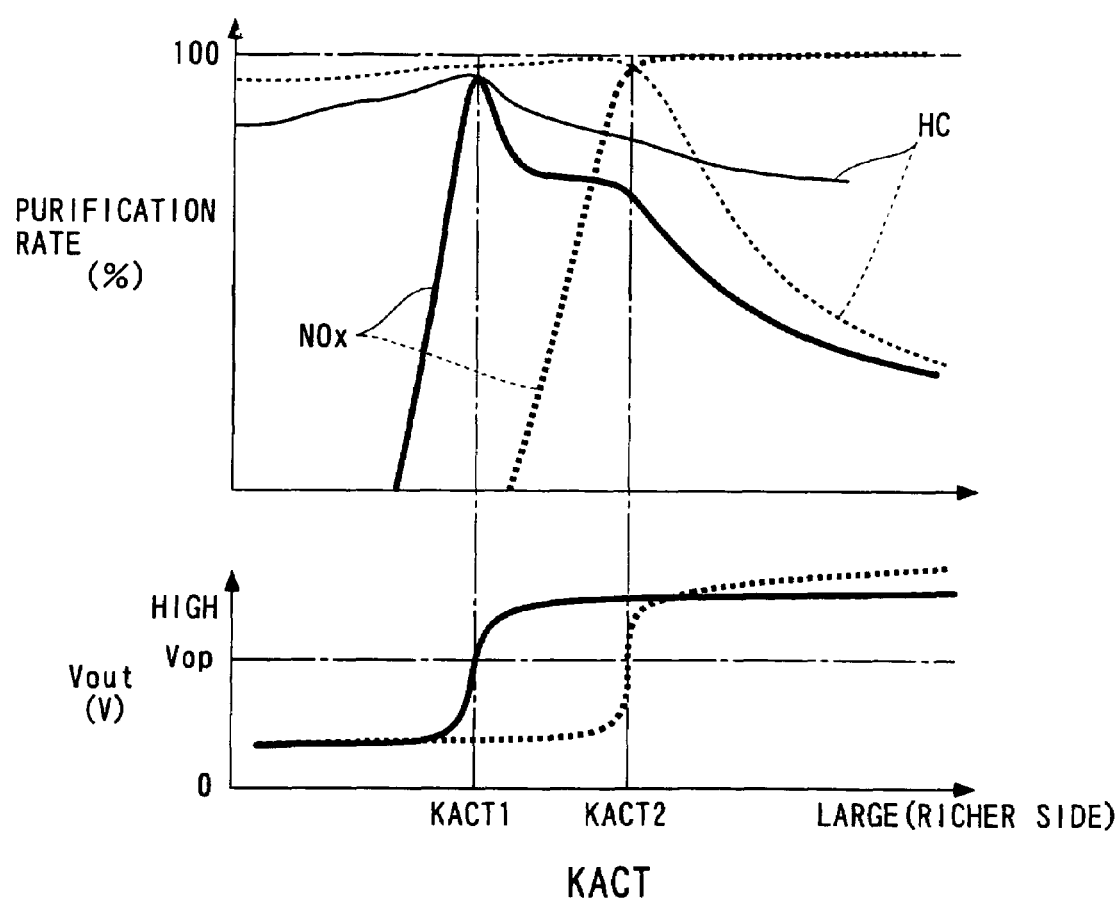
FIG. 2 is a diagram showing an example of respective results of measurement of HC purification rates and NOx purification rates of a first catalytic device, and corresponding outputs Vout of an O2 sensor 15, each measured with respect to an output KACT from a LAF sensor 14, when the first catalytic device was in a degraded state and an undegraded state.

Next, the relationship between the exhaust gas purification rate of the first catalytic device 8a and the output Vout (voltage value) from the O2 sensor 15 will be described with reference to FIG. 2. The figure illustrates HC purification rates and NOx purification rates of the first catalytic device 8a and corresponding outputs Vout from the O2 sensor 15, each measured when the output KACT from the LAF sensor 14, i.e. the air-fuel ratio of the mixture supplied to the engine 3 is changed across the stoichiometric air-fuel ratio, in respective states in which the purification capability of the first catalytic device 8a is degraded due to long-term use and in which the purification capability is not yet degraded. In the figure, broken lines each represent a measurement result obtained when the first catalytic device 8a is in the undegraded state, while solid lines each represent a measurement result obtained when the first catalytic device 8a is in the degraded state. Further, the figure shows that as the output KACT from the LAF sensor 14 is larger, the air-fuel ratio of the mixture is richer.

As shown in the figure, when the first catalytic device 8a is degraded, its purification capability is lowed compared with that in the undegraded state, and hence the output Vout from the O2 sensor 15 crosses the target value Vop when the output KACT from the LAF sensor 14 assumes a value KACT 1 on a leaner side. The first catalytic device 8a has a characteristic of eliminating HC and NOx most efficiently when the output Vout from the O2 sensor 15 is equal to the target value Vop, irrespective of whether the first catalytic device 8a is degraded state or not degraded. Accordingly, by controlling the air-fuel ratio of the mixture such that the output Vout from the O2 sensor 15 becomes equal to the target value Vop, it is possible to achieve most efficient purification of exhaust gases by the first catalytic device 8a. For this reason, in an air-fuel ratio control process described in detail hereinafter, a target air-fuel ratio KCMD is controlled such that the output Vout converges to the target value Vop.

Further, the ECU 2 has an accelerator pedal opening sensor 16, an atmospheric pressure sensor 17, an intake air temperature sensor 18, and a vehicle speed sensor 19 connected thereto. The accelerator pedal opening sensor 16 detects a depression amount (hereinafter referred to as "the accelerator pedal opening") AP of an accelerator pedal, not shown, of the vehicle and delivers a signal indicative of the sensed accelerator pedal opening AP to the ECU 12. Further, the atmospheric pressure sensor 17, the intake air temperature sensor 18, and the vehicle speed sensor 19 detect atmospheric pressure AP, intake air temperature TA, and a vehicle speed VP, respectively, and delivers respective signals indicative of the detected atmospheric pressure AP, intake air temperature TA, and vehicle speed VP to the ECU 2.

Next, description will be given of the ECU 2 (deviation-calculating means, control input-calculating means, predicted value-calculating means, output sampling means, input sampling means, sampling means, identification means, air-fuel ratio-calculating means, air-fuel ratio control means, air-fuel ratio sampling means).

The ECU 2 is implemented by a microcomputer including an input/output interface, a CPU, a RAM, and a ROM (none of which is shown). The ECU 2 determines operating conditions of the engine 3, based on the outputs from the above-mentioned sensors 10 to 19. Further, the ECU 2 executes an adaptive air-fuel ratio control process or a map retrieval process, which will be described in detail hereinafter, according to control programs read from the ROM, data stored in the RAM, and the like, to thereby calculate the target air-fuel ratio KCMD (which is calculated as an equivalent ratio proportional to the reciprocal of the air-fuel ratio) so as to converge the output Vout from the O2 sensor 15 to the target value Vop. Furthermore, as described hereinafter, the ECU 2 calculates the final fuel injection amount TOUT of each injector 6, on a cylinder-by-cylinder basis, and drives the injector 6 by a drive signal generated based on the calculated final fuel injection amount TOUT, to thereby feedback-control the air-fuel ratio of the mixture such that the output KACT from the LAF sensor 14 becomes equal to the target air-fuel ratio KCMD.

Figure 3:
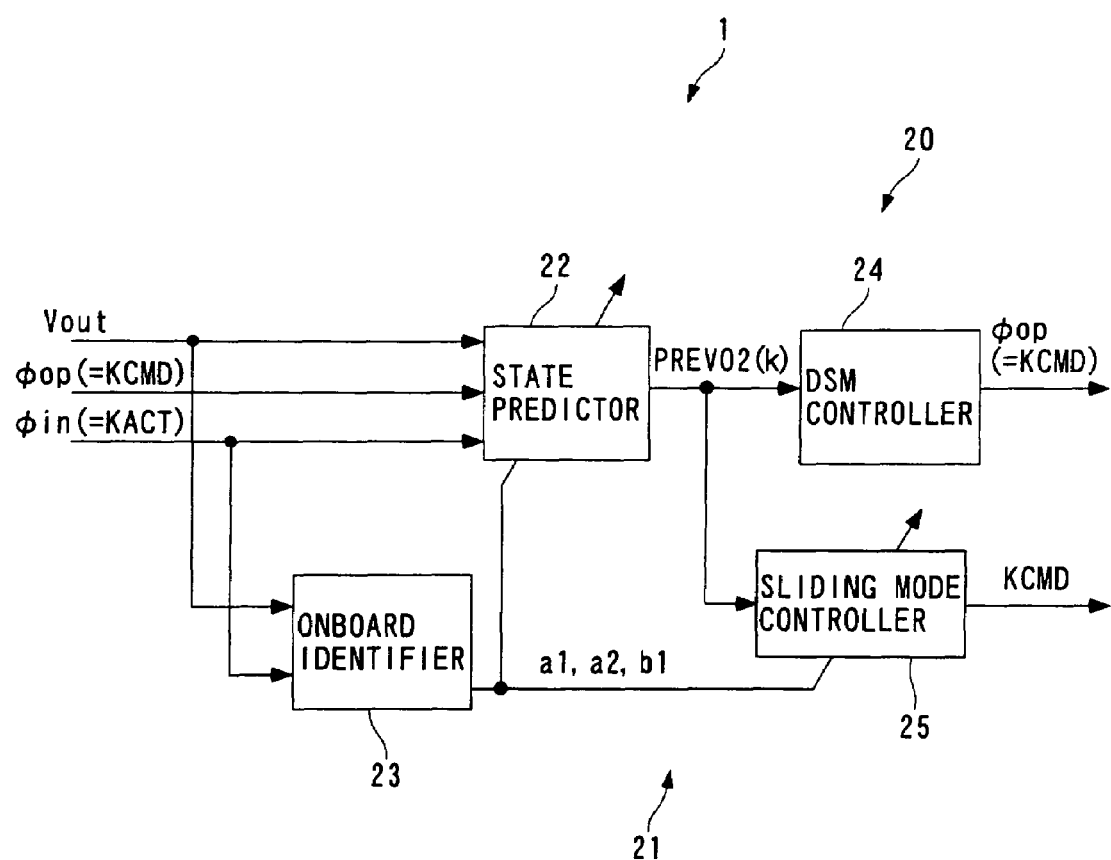
FIG. 3 is a block diagram showing the arrangement of an ADSM controller and a PRISM controller of the control device according to the first embodiment.

As shown in FIG. 3, the control device 1 includes an ADSM controller 20 and a PRISM controller 21, for calculating the target air-fuel ratio KCMD (control input), and more specifically, the two controllers 20, 21 are each implemented by the ECU 2.

Now, the ADSM controller 20 will be described below. The ADSM controller 20 calculates the target air-fuel ratio KCMD for converging the output Vout from the O2 sensor 15 to the target value Vop, by using a control algorithm for an adaptive prediction ΔΣ (delta sigma) modulation control (hereinafter referred to as "ADSM") process described in detail hereinafter. The ADSM controller 20 is comprised of a state predictor 22, an onboard identifier 23, and a DSM controller 24. A specific program for the ADSM process will be described in detail hereinafter.

First, the state predictor 22 will be described. The state predictor 22 predicts (calculates) a predicted value PREVO2 of an output deviation VO2 by using a predictive algorithm described below. In the present embodiment, the target air-fuel ratio KCMD is used as a control input to a controlled object, and the output Vout from the O2 sensor is used as an output from the controlled object. Further, a system extending from the intake system of the engine 3 including the injectors 6 to the O2 sensor arranged downstream of the first catalyst 8a in the exhaust system of the engine 3 including the first catalyst 8a is regarded as the controlled object, and the controlled object is modeled as an ARX model (auto-regressive model with exogenous input) which is a discrete-time system model, as expressed by the following equation (1):

$$VO2(k) = a1 \cdot VO2(k-1) + a2 \cdot VO2(k-2) + \\ b1 \cdot DKCMD(k-dt) \tag{1}$$

wherein VO2 represents an output deviation as a deviation (Vout−Vop) between the output Vout from the O2 sensor 15 and the target value Vop; DKCMD represents an air-fuel ratio deviation as a deviation (KCMD−FLAFBASE) between the target air-fuel ratio KCMD (=φ op) and a reference value FLAFBASE; and the symbol k represents a time period discretized by sampling. The reference value FLAFBASE is set to a predetermined constant value. Further, a1, a2 and b1 represent model parameters which are sequentially identified by the onboard identifier 23 as described hereinafter.

Further, the symbol dt in the above equation (1) represents predicted time calculated as a time period which will be taken from a time point a mixture with the target air-fuel ratio KCMD, is supplied to the intake system by an injector 6 to a time point the air-fuel ratio of the mixture is reflected in the output Vout from the O2 sensor 15. The predicted time dt is defined by the following equation:

$$dt = d + d' + dd \tag{2}$$

wherein d represents dead time in the exhaust system from the LAF sensor 14 to the O2 sensor 15; d' represents dead time occurring in an air-fuel ratio operation system from the injectors 6 to the LAF sensor 14; and dd represents phase delay time between the exhaust system and the air-fuel ratio operation system (it should be noted that in a control program for the adaptive air-fuel ratio control process described in detail hereinafter, switching between the ADSM process and a PRISM process is performed so as to calculate the target air-fuel ratio KCMD, and hence the phase delay time dd is set to 0).

The reason why the controlled object model is formed by using discrete data (time series data) of the output deviation VO2 and discrete data of the air-fuel ratio deviation DKCMD as described above is as follows: It is known that in a controlled object model, in general, when variables indicative of the input/output are defined by deviations between the input/output of a controlled object and respective corresponding predetermined reference values, it is possible to identify or define model parameters more accurately than when the same are defined by respective absolute values of the input/output, which enables the dynamic characteristics of the controlled object model to be adapted to the real dynamic characteristics of the controlled object. Therefore, according to the control device 1 of the present embodiment, since the controlled object model is formed by using the discrete data of the output deviation VO2 and the discrete data of the air-fuel ratio deviation DKCMD, it is possible to improve adaptability of the dynamic characteristics of the controlled object model to the real dynamic characteristics of the controlled object, compared with the case where the absolute values of the output Vout from the O2 sensor 15 and target air-fuel ratio KCMD, to thereby enhance accuracy in the calculation of the predicted value PREVO2.

The predicted value PREVO2 is a value predicting an output deviation VO2 (k+dt) which will be obtained when the predicted time dt has elapsed after the mixture having the target air-fuel ratio KCMD being supplied to the intake system. From the equation (1), an equation (3) for calculating the predicted value PREVO2 can be obtained as follows:

$$PREVO2 \approx VO2(k+dt) \tag{3}$$
$$= a1 \cdot VO2(k+dt-1) + a2 \cdot VO2(k+dt-2) + \\ b1 \cdot DKCMD(k)$$

This equation (3) requires calculation of VO2(k+dt−1) and VO2(k+dt−2) each corresponding to a future value of an output deviation VO2(k), and hence it is difficult to actually program the equation (3). For this reason, matrices A, B are defined by equations (4), (5), shown below, by using the model parameters a1, a2, b1, and the equation (3) is deformed by repeatedly using a recurrence formula thereof, whereby an equation (6) shown below is obtained. When this equation (6) is used as the predictive algorithm, i.e. a formula for calculating the predicted value PREVO2, the predicted value PREVO2 is calculated based on the output deviation VO2 and the air-fuel ratio deviation DKCMD.

$$A = \begin{bmatrix} a1 & a2 \\ 1 & 0 \end{bmatrix} \tag{4}$$

$$B = \begin{bmatrix} b1 \\ 0 \end{bmatrix} \tag{5}$$

$$PREVO2(k) = \alpha 1 \cdot VO2(k) + \alpha 2 \cdot VO2(k-1) + \sum_{i=1}^{dt} \beta i \cdot DKCMD(k-i) \tag{6}$$

wherein α1: first-row first-column element of $A^{dt}$
α2: first-row second-column element of $A^{dt}$
βi: first-row element of $A^{i-1}B$ Now, when a LAF output deviation DKACT is defined as a deviation (KACT−FLAFBASE) between the output KACT (=φin) from the LAF sensor 14 and the reference value FLAFBASE, DKACT(k)=DKCMD(k−d') holds. By applying this relation between the LAF output deviation and the air-fuel ratio deviation to the equation (6), an equation (7) shown below can be obtained.

$$PREVO2(k) = \alpha 1 \cdot VO2(k) + \alpha 2 \cdot VO2(k-1) + \qquad (7)$$
$$\sum_{i=1}^{d'-1} \beta i \cdot DKCMD(k-i) +$$
$$\sum_{j=d'}^{dt} \beta j \cdot DKACT(k-j)$$

wherein $\beta j$: first-row element of $A^{j-1}B$

When the predicted value PREVO2 calculated by the use of the equation (6) or the equation (7) is used to calculate the target air-fuel ratio KCMD as described hereinafter, it is possible to calculate the target air-fuel ratio KCMD while compensating for response delay or dead time between the input and output of the controlled object. Particularly when the equation (7) is used as the predictive algorithm, the predicted value PREVO2 is calculated based on the output deviation VO2, the LAF output deviation DKACT and the air-fuel ratio deviation DKCMD, so that the predicted value PREVO2 can reflect a state of the air-fuel ratio of exhaust gases actually supplied to the first catalytic device 8a. Therefore, it is possible to improve accuracy in the calculation of the predicted value PREVO2, i.e. prediction accuracy of the predicted value PREVO2 rather than when the equation (6) is used. Further, when the equation (7) is used, if it can be regarded that $d' \leq 1$ holds, it is possible to calculate the predicted value PREVO2 without using the air-fuel ratio deviation DKCMD but by using the output deviation VO2 and the LAF output deviation DKACT alone. In the present embodiment, since the LAF sensor 14 is provided in the engine 3, the equation (7) is adopted as the predictive algorithm.

It should be noted that when the relationship of DKACT(k)=DKCMD(k−d') is applied to the aforementioned equation (1), the controlled object model expressed by the equation (1) can also be defined as a model having the output deviation VO2 and the LAF output deviation DKACT as variables.

Next, the onboard identifier 23 (identification means) will be described. The onboard identifier 23 identifies (calculates) the model parameters a1, a2, b1 in the equation (1) by using a sequential identification algorithm described hereinbelow. More specifically, a vector $\theta(k)$ of the model parameters is calculated by using equations (8), (9) shown below.

$$\theta(k)=\theta(k-1)+KP(k) \cdot ide\_f(k) \qquad (8)$$

$$\theta(k)^T=[a1'(k),a2'(k),b1'(k)] \qquad (9)$$

In the equation (8), KP(k) represents a vector of a gain coefficient, and ide_f(k) represents an identification error filtered value. Further, $\theta(k)^T$ in the equation (9) represents a transposed matrix of $\theta(k)$, while a1'(k), a2'(k) and b1'(k) represent respective model parameters which are not yet subjected to a limiting process described hereinafter. In the following description, the word "vector" is omitted when deemed appropriate.

The identification error filtered value ide_f(k) in the equation (8) is a value obtained by subjecting an identification error ide(k) calculated by the use of equations (11) to (13) shown below to a moving average filtering process expressed by an equation (10) shown below. A symbol n in the equation (10) represents a filter order (an integer equal to or larger than 1) in the moving average filtering process, and VO2HAT(k) in the equation (12) represents an identified value of the output deviation VO2.

$$ide\_f(k) = \frac{1}{n}\sum_{i=1}^{n} ide(i) \qquad (10)$$

$$ide(k) = VO2(k) - VO2HAT(k) \qquad (11)$$

$$VO2HAT(k) = \theta(k-1)^T \zeta(k) \qquad (12)$$

$$\zeta(k)^T = [VO2(k-1), VO2(k-2), DKCMD(k-dt)] \qquad (13)$$

The identification error filtered value ide_f(k) is used for the following reason: The controlled object in the present embodiment uses the target air-fuel ratio KCMD as a control input and the output Vout from the O2 sensor 15 as an output therefrom, and has low-pass characteristics as frequency characteristics. In the controlled object having the low-pass characteristics, the model parameters are identified in a sate in which high-frequency characteristics of the controlled object are emphasized due to the identification algorithm of the onboard identifier 23, or more specifically, due to frequency weighting characteristics of a weighted least-squares algorithm described hereinafter, and hence gain characteristics of the controlled object model show a tendency to become lower than actual gain characteristics of the controlled object. As a result, when the ADSM process or the PRISM process is executed by the control device 1, the controlled object is placed into an over-gain condition, which can make the whole control system divergent and unstable.

Therefore, in the present embodiment, the identification error filtered value ide_f(k) obtained by subjecting the identification error ide(k) to the moving average filtering process is used, and the filter order n for the moving average filtering process is set according to an exhaust gas volume AB_SV, as described hereinafter, so as to properly correct the frequency weighting characteristics of the weighted least-squares algorithm to thereby adjust the gain characteristics of the controlled object model to the actual gain characteristics of the controlled object.

Further, the vector KP(k) of the gain coefficient in the aforementioned equation (8) is calculated by using an equation (14) shown below. A symbol P(k) in the equation (14) represents a third-order square matrix defined by an equation (15) shown below.

$$KP(k) = \frac{P(k)\zeta(k)}{1 + \zeta(k)^T P(k)\zeta(k)} \qquad (14)$$

$$P(k+1) = \frac{1}{\lambda_1}\left(I - \frac{\lambda_2 P(k)\zeta(k)\zeta(k)^T}{\lambda_1 + \lambda_2 \zeta(k)^T P(k)\zeta(k)}\right)P(k) \qquad (15)$$

wherein, I represents a unit matrix.

In the identification algorithm described above, one of the following four identification algorithms is selected depending on the setting of weight parameters $\lambda 1, \lambda 2$ in the equation (15):

$\lambda 1=1, \lambda 2=0$; fixed gain algorithm
$\lambda 1=1, \lambda 2=1$; least-squares algorithm
$\lambda 1=1, \lambda 2=\lambda$; progressively decreasing gain algorithm
$\lambda 1=\lambda, \lambda 2=1$; weighted least-squares algorithm $\lambda$ is a predetermined value set such that $0<\lambda<1$ holds.

In the present embodiment, the weighted least-squares algorithm is adopted from the four identification algorithms. This is because it is possible to properly set identification accuracy and the speed of convergence of the model parameters to an optimal value, by setting the value of the weight parameter λ1 according to the operating conditions of the engine 3, or more specifically, according to the exhaust gas volume AB_SV. For instance, when the engine 3 is in a low load operating condition, the weight parameter λ1 is set to a value close to 1 in accordance with the operating condition, that is, the weight parameter λ1 is set such that an algorithm close to the weighted least-squares algorithm is selected, whereby excellent identification accuracy can be maintained, while when the engine 3 is in a high load operating condition, the weight parameter λ1 is set to a value smaller than the value set in the low load operating condition, in accordance with the operating condition, whereby the model parameters can be promptly converged to an optimal value. As described above, by setting the value of the weight parameter λ1 according to the exhaust gas volume AB_SV, it is possible to properly set the identification accuracy and the speed of convergence of the model parameters to an optimal value, thereby enhancing the rate of exhaust gas purification by the catalytic devices 8a, 8b.

When the relationship of DKACT(k)=DKCMD(k−d') is applied to the identification algorithm expressed by the equations (8) to (15), an identification algorithm expressed by equations (16) to (23) shown below can be obtained.

$$\theta(k) = \theta(k-1) + KP(k) \cdot \text{ide\_f}(k) \tag{16}$$

$$\theta(k)^T = [a1'(k), a2'(k), b1'(k)] \tag{17}$$

$$\text{ide\_f}(k) = \frac{1}{n}\sum_{i=1}^{n} ide(i) \tag{18}$$

$$ide(k) = VO2(k) - VO2HAT(k) \tag{19}$$

$$VO2HAT(k) = \theta(k-1)^T \zeta(k) \tag{20}$$

$$\zeta(k)^T = [VO2(k-1), VO2(k-2), DKACT(k-d-dd)] \tag{21}$$

$$KP(k) = \frac{P(k)\zeta(k)}{1 + \zeta(k)^T P(k)\zeta(k)} \tag{22}$$

$$P(k+1) = \frac{1}{\lambda_1}\left(I - \frac{\lambda_2 P(k)\zeta(k)\zeta(k)^T}{\lambda_1 + \lambda_2 \zeta(k)^T P(k)\zeta(k)}\right) P(k) \tag{23}$$

wherein I represents a unit matrix.

In the present embodiment, since the LAF sensor 14 is provided in the engine 3, the equations (16) to (23) are used. When the equations (16) to (23) are used, for the reason described above, it is possible to identify the model parameters as values more reflective of a state of the air-fuel ratio of exhaust gases actually supplied to the catalytic device 8a, thereby further enhancing accuracy in identification of the model parameters than in the case of using the identification algorithm expressed by the equations (8) to (15).

Further, in the onboard identifier 23, the model parameters a1'(k), a2'(k) and b1'(k) calculated by using the above identification algorithm are subjected to the limiting process described in detail hereinafter, to thereby calculate the model parameters a1(k), a2(k) and b1(k). Further, in the state predictor 22 described hereinbefore, the predicted value PREVO2 is calculated based on the model parameters a1(k), a2(k) and b1(k) obtained by the limiting process.

Next, the DSM controller 24 will be described. The DSM controller 24 generates (calculates) a control input φop(k) (=the target air-fuel ratio KCMD) based on the predicted value PREVO2 calculated by the state predictor 22, by using a control algorithm to which the ΔΣ modulation algorithm is applied, and then inputs the control input φop(k) to the controlled object to thereby control the output Vout from the O2 sensor 15 as the output from the controlled object such that the output Vout converges to the target value Vop.

Figure 4:
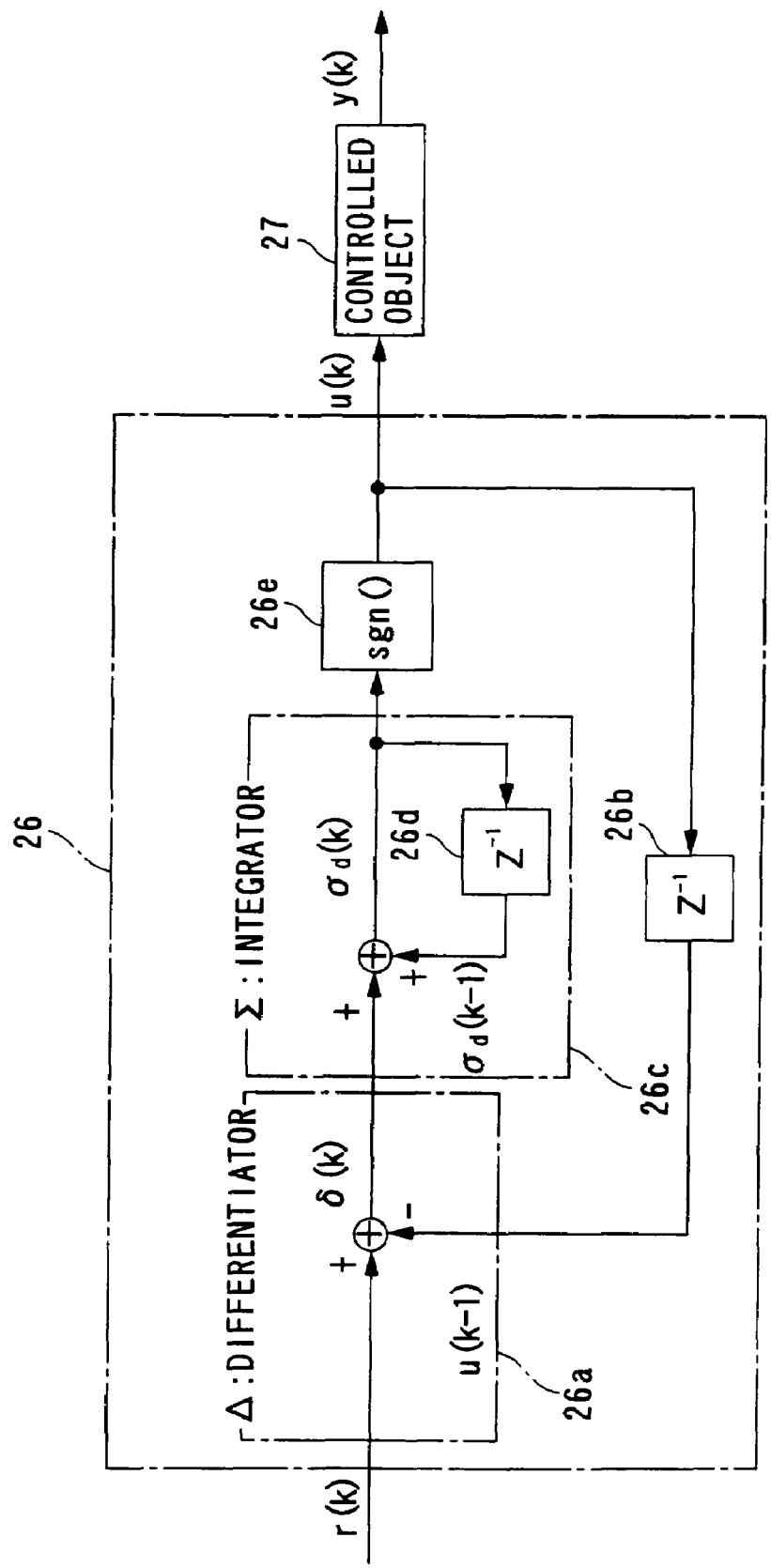
FIG. 4 is a block diagram showing the arrangement of a controller for executing $\Delta\Sigma$ modulation and a control system equipped with the same.

First, a general ΔΣ modulation algorithm will be described. FIG. 4 shows the arrangement of a control system in which a controller 26 having the ΔΣ modulation algorithm applied thereto controls a controlled object 27. As shown in the figure, in the controller 26, a deviation signal δ(k) is generated by a differentiator 26a, as a deviation between a reference signal r(k) and a DSM signal u(k−1) delayed by a delay element 26b. Then, an integral of the deviation (hereinafter referred to as "a deviation integral value") σ_d(k) is generated by an integrator 26c, as the sum of the deviation signal δ(k) and a deviation integral value σ_d(k−1) delayed by a delay element 26d. Subsequently, a DSM signal u(k) is generated by a quantizer 26e (sign (signum) function), as a signal indicative of a sign determined based on the deviation integral value σ_d(k). The DSM signal u(k) thus generated is inputted into the controlled object 27, and an output signal y(k) is outputted from the controlled object 27.

The above ΔΣ modulation algorithm can be expressed by the following equations (24) to (26):

$$\delta(k) = r(k) - u(k-1) \tag{24}$$

$$\sigma_d(k) = \sigma_d(k-1) + \delta(k) \tag{25}$$

$$u(k) = \text{sgn}(\sigma_d(k)) \tag{26}$$

The sign function $\text{sgn}(\sigma_d(k))$ has a value which becomes equal to 1 when $\sigma_d(k) \geq 0$ holds, and becomes equal to −1 when $\sigma_d(k) < 0$ holds (sign function $\text{sgn}(\sigma_d(k))$ may be configured to become equal to 0 when $\sigma_d(k) = 0$ holds).

FIGS. 5A to 5E show results of simulation of control by the above control system. As shown in FIG. 5A, when the sinusoidal reference signal r(k) is inputted into the control system, the DSM signal u(k) shown in FIG. 5D is generated as a rectangular signal, and when the DSM signal u(k) is inputted into the controlled object 27, the output signal y(k) shown in FIG. 5E different in amplitude from the reference signal r(k), but identical in frequency to the same is outputted from the controlled object 27. Although having noise, the output signal y(k) has a waveform similar to that of the reference signal r(k) as a whole. As described above, the ΔΣ modulation algorithm is characterized in that the DSM signal u(k) can be generated from the reference signal r(k), as a value which when inputted into the controlled object 27, causes the output y(k) from the controlled object 27 to be generated as a signal different in amplitude from the reference signal r(k), but identical in frequency and similar in waveform as a whole to the same. In other words, the characteristic of the ΔΣ modulation algorithm lies in that the DSM signal u(k) can be generated as a value which causes the reference signal r(k) to be reproduced in the actual output y(k) from the controlled object 27 when the value is inputted thereto.

The DSM controller 24 utilizes the above characteristic of the ΔΣ modulation algorithm to calculate the control input φop(k) for converging the output Vout from the O2 sensor 15 to the target value Vop. The principle can be explained as follows: For instance, in a case where the output deviation VO2 is fluctuating with respect to the value of 0 (i.e. the output Vout from the O2 sensor 15 is fluctuating with respect to the target value Vop) as illustrated by a one-dot chain line in FIG. 6, it is possible to converge the output deviation VO2 to the value of 0 (i.e. converge the output Vout to the target value Vop) simply by generating the control input φop(k) such that an output deviation VO2* having the opposite phase waveform as illustrated by a broken line in FIG. 6 is generated so as to cancel out the output deviation VO2.

Figure 6:
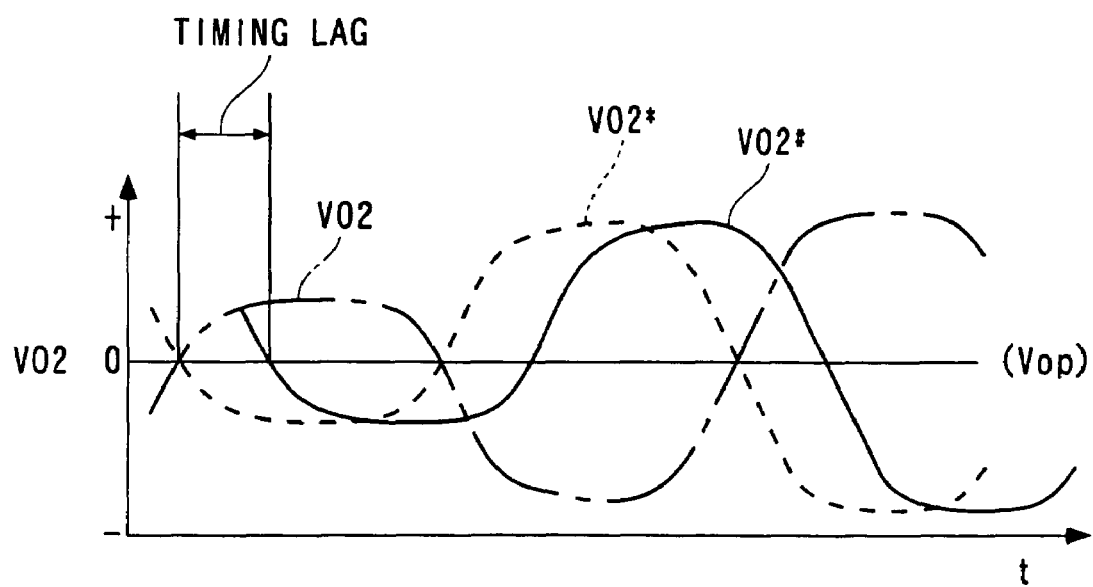
FIG. 6 is a timing chart useful in explaining the principles of an adaptive prediction $\Delta\Sigma$ modulation control by the ADSM controller used in the first embodiment.

However, in the controlled object in the present embodiment, as described hereinbefore, a time delay amounting to the predicted time dt occurs between the time point the target air-fuel ratio KCMD as the control input φop(k) is inputted into the controlled object and the time point it is reflected in the output Vout from the O2 sensor 15, and hence an output deviation VO2# obtained by generating the control input φop(k) based on the present output deviation VO2 delays with respect to the output deviation VO2* as illustrated by a solid line in FIG. 6. Thus, lag in control timing occurs. Therefore, to compensate for the lag, the DSM controller 24 in the ADSM controller 20 of the present embodiment uses the predicted value PREVO2 of the output deviation VO2 to generate the control input φop(k) as a signal for causing an output deviation (output deviation similar to the output deviation VO2* having the opposite phase waveform) so as to cancel out the present output deviation VO2 without causing the lag in control timing.

Figure 7:
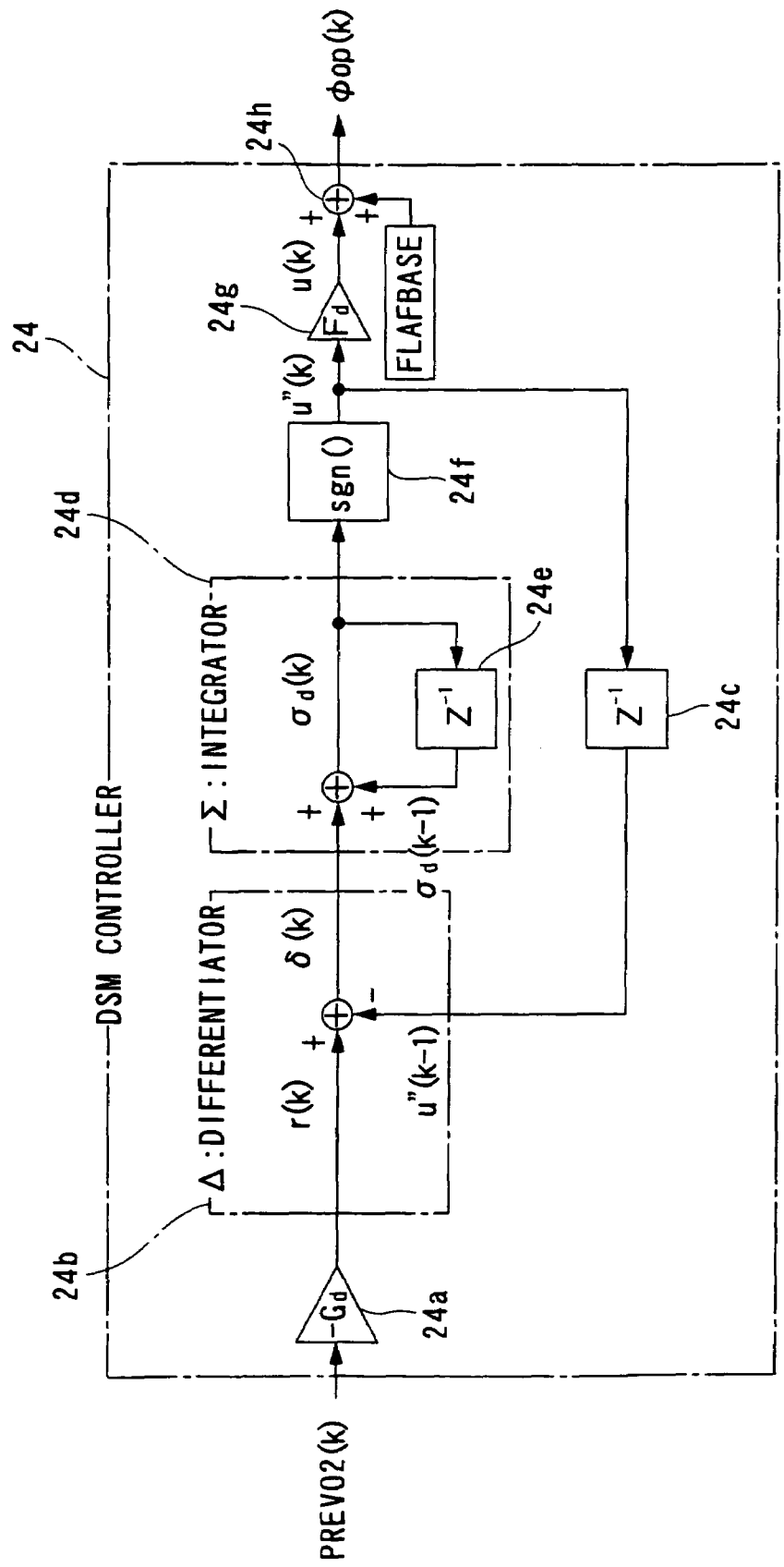
FIG. 7 is a block diagram showing the arrangement of a DSM controller included in the ADSM controller.

More specifically, in the DSM controller 24, as shown in FIG. 7, an inverter amplifier 24a generates the reference signal r(k) as a signal obtained as the product obtained by multiplying the value of −1, a gain $G_d$ for the reference signal, and the predicted value PREVO2 by each other. Then, a differentiator 24b generates the deviation signal δ(k) as a deviation between the reference signal r(k) and a DSM signal u"(k−1) delayed by a delay element 24c.

Subsequently, an integrator 24d generates the deviation integral value $\sigma_d(k)$ as a signal as the sum obtained by adding together the deviation signal δ(k) and a deviation integral value $\sigma_d(k-1)$ delayed by a delay element 24e, whereafter a quantizer 24f (sign function) generates a DSM signal u"(k) as a value determined based on the deviation integral value $\sigma_d(k)$. Further, an amplifier 24g generates an amplified DSM signal u(k) as a value obtained by amplifying the DSM signal u"(k) by a predetermined gain $F_d$, and then an adder 24h generates the control input φop(k) as a value obtained by adding the amplified DSM signal u(k) to the predetermined reference value FLAFBASE.

The control algorithm used by the above DSN controller 24 can be expressed by the following equations (27) to (32):

$$r(k)=-1 \cdot G_d \cdot PREVO2(k) \quad (27)$$

$$\delta \cdot (k)=r(k)-u"(k-1) \quad (28)$$

$$\sigma_d(k)=\sigma_d(k-1)+\delta(k) \quad (29)$$

$$u"(k)=sgn(\sigma_d(k)) \quad (30)$$

$$u(k)=F_d \cdot u"(k) \quad (31)$$

$$\phi op(k)=FLAFBASE+u(k) \quad (32)$$

wherein $G_d$ and $F_d$ represent gains; and the sign function sgn($\sigma_d(k)$) has a value which becomes equal to 1 when $\sigma_d(k) \geqq 0$ holds, and becomes equal to −1 when $\sigma_d(k)<0$ holds (sign function sgn($\sigma_d(k)$) may be configured to become equal to 0 when $\sigma_d(k)=0$ holds).

As described above, in the DSM controller 24, the control input φop(k) is calculated by using the algorithm expressed by the equations (27) to (32), as the value for causing the output deviation VO2* to cancel out the output deviation VO2 without causing lag in control timing. In other words, the control input φop(k) is calculated as the value which is capable of converging the output Vout from the O2 sensor 15 to the target value Vop. Further, since the control input φop(k) is calculated as the value obtained by adding the amplified DSM signal u(k) to the predetermined reference value FLAFBASE, it is possible to calculate the control input φop(k) not as a value that is repeatedly reversed in sign with respect to a value of 0, but as a value which is repeatedly increased and decreased from the reference value FLAFBASE. Thus, the algorithm used here can enhance the degree of freedom in control rather than the conventional ΔΣ modulation algorithm.

Next, the PRISM controller 21 will be described. The PRISM controller 21 uses a control algorithm for an onboard identification sliding mode control process (hereinafter referred to as "the PRISM control") described hereinbelow to calculate the target air-fuel ratio KCMD for converging the output Vout from the O2 sensor 15 to the target value Vop. The PRISM controller 21 is comprised of the state predictor 22, the onboard identifier 23, and the sliding mode controller (hereinafter referred to as "the SLD controller") 25. A specific program for the PRISM control will be described in detail hereinafter.

The state predictor 22 and the onboard identifier 23 are described hereinbefore, and hence the following description is given of the SLD controller 25 alone. The SLD controller 25 carries out sliding mode control based on a sliding mode control algorithm. Now, a general sliding mode control algorithm is explained. In the sliding mode control algorithm, the discrete-time system model expressed by the aforementioned equation (1) is used as a controlled object model, so that a switching function σ is set as a linear function of the time series data of the output deviation VO2 as shown by the following equation (33):

$$\sigma(k)=S1 \cdot VO2(k)+S2 \cdot VO2(k-1) \quad (33)$$

wherein S1 and S2 are coefficients set such that −1<(S2/S1)<1 holds.

In general, in the sliding mode control algorithm, when the switching function σ is formed by two state variables (time series data of the output deviation VO2 in the present embodiment), a phase space constituted by the two state variables forms a two-dimensional phase plane having the state variables as the ordinate and the abscissa, and hence on the phase plane, a combination of two values of the state variables satisfying an equation of σ=0 is on a straight line referred to as a switching line. Therefore, by determining a control input to a controlled object properly such that the combination of the two state variables converges onto the switching line, it is possible to converge (slide) the two state variables to an equilibrium point at which they each become equal to the value of 0. Further, in the sliding mode control algorithm, it is possible to set the switching function σ to thereby specify the dynamic characteristics, or more specifically, convergence behavior and speed, of the state variables. For instance, when the switching function σ is formed by two state variables as in the present embodiment, if the inclination of the switching straight line is set close to the value of 1, the convergence speed of the state variables becomes slow, whereas if the inclination of the switching straight line is set close to the value of 0, the same becomes fast.

In the present embodiment, the switching function σ is formed by two time series data, more specifically the present value VO2(k) and the immediately preceding value VO2(k−

1), of the output deviation VO2 as shown in the equation (33), and hence it is only required that the control input to the controlled object, i.e. the target air-fuel ratio KCMD is set such that the combination of the present value VO2(k) and the immediately preceding value VO2(k–1) converges onto the switching straight line. More specifically, when a control amount Usl(k) is defined as a value which is added to the reference value FLAFBASE to form the target air-fuel ratio KCMD, the control amount Usl(k) required for converging the combination of the present value VO2(k) and the immediately preceding value VO2(k–1) onto the switching straight line is set by an adaptive sliding mode control algorithm expressed by an equation (34) shown below as a sum total of an equivalent control input Ueq(k), a reaching law input (input of a reaching law) Urch(k) and an adaptive law input Uadp(k).

$$Usl(k) = Ueq(k) + Urch(k) + Uadp(k) \quad (34)$$

The equivalent control input Ueq(k) is used for holding the combination of the present value VO2(k) and the immediately preceding value VO2(k–1) on the switching straight line, and specifically, it is defined by an equation (35) shown below. The reaching law input Urch(k) is used for converging the combination of the present value VO2(k) and the immediately preceding value VO2(k–1) onto the switching straight line when the values deviated from the switching straight line due to disturbance or modeling error, and specifically, it is defined by an equation (36) shown below. In the equation (36), F represents a gain.

$$Ueq(k) = \frac{-1}{S1 \cdot b1}\{[S1 \cdot (a1-1) + S2] \cdot VO2(k+dt) + \quad (35)$$
$$(S1 \cdot a2 - S2) \cdot VO2(k+dt-1)\}$$

$$Urch(k) = \frac{-F}{S1 \cdot b1} \cdot \sigma(k+dt) \quad (36)$$

Further, the adaptive law input Uadp(k) is used for positively converging the combination of the present value VO2(k) and the immediately preceding value VO2(k–1) onto the switching straight line while suppressing influences of a steady-state deviation, modeling error, and disturbance in the controlled object, and specifically, it is defined by an equation (37) shown below. In the equation (37), G represents a gain, and ΔT represents a control period.

$$Uadp(k) = \frac{-G}{S1 \cdot b1}\sum_{i=0}^{k+dt} \Delta T \cdot \sigma(i) \quad (37)$$

In the PRISM controller 21 and the SLD controller 25 in the present embodiment, since the predicted value PREVO2 is employed in place of the output deviation VO2 as described hereinbefore, an algorithm expressed by equations (38) to (42), shown below, is used which are obtained by rewriting the equations (33) to (37) of the above algorithm by applying the relationship of PREVO2(k)≈VO2(k+dt) thereto. A symbol σPRE in the equation (38) represents a value of a switching function (hereinafter referred to as "the predictive switching function") in the case of using the predicted value PREVO2. In short, in the SLD controller 25 in the present embodiment, the control amount Usl(k) calculated by using the above algorithm is added to the reference value FLAFBASE to thereby calculate the target air-fuel ratio KCMD.

$$\sigma PRE(k) = S1 \cdot PREVO2(k) + S2 \cdot PREVO2(k-1) \quad (38)$$

$$Usl(k) = Ueq(k) + Urch(k) + Uadp(k) \quad (39)$$

$$Ueq(k) = \frac{-1}{S1 \cdot b1}\{[S1 \cdot (a1-1) + S2] \cdot PREVO2(k) + \quad (40)$$
$$(S1 \cdot a2 - S2) \cdot PREVO2(k-1)\}$$

$$Urch(k) = \frac{-F}{S1 \cdot b1} \cdot \sigma PRE(k) \quad (41)$$

$$Uadp(k) = \frac{-G}{S1 \cdot b1}\sum_{i=0}^{k} \Delta T \cdot \sigma PRE(i) \quad (42)$$

Figure 8:
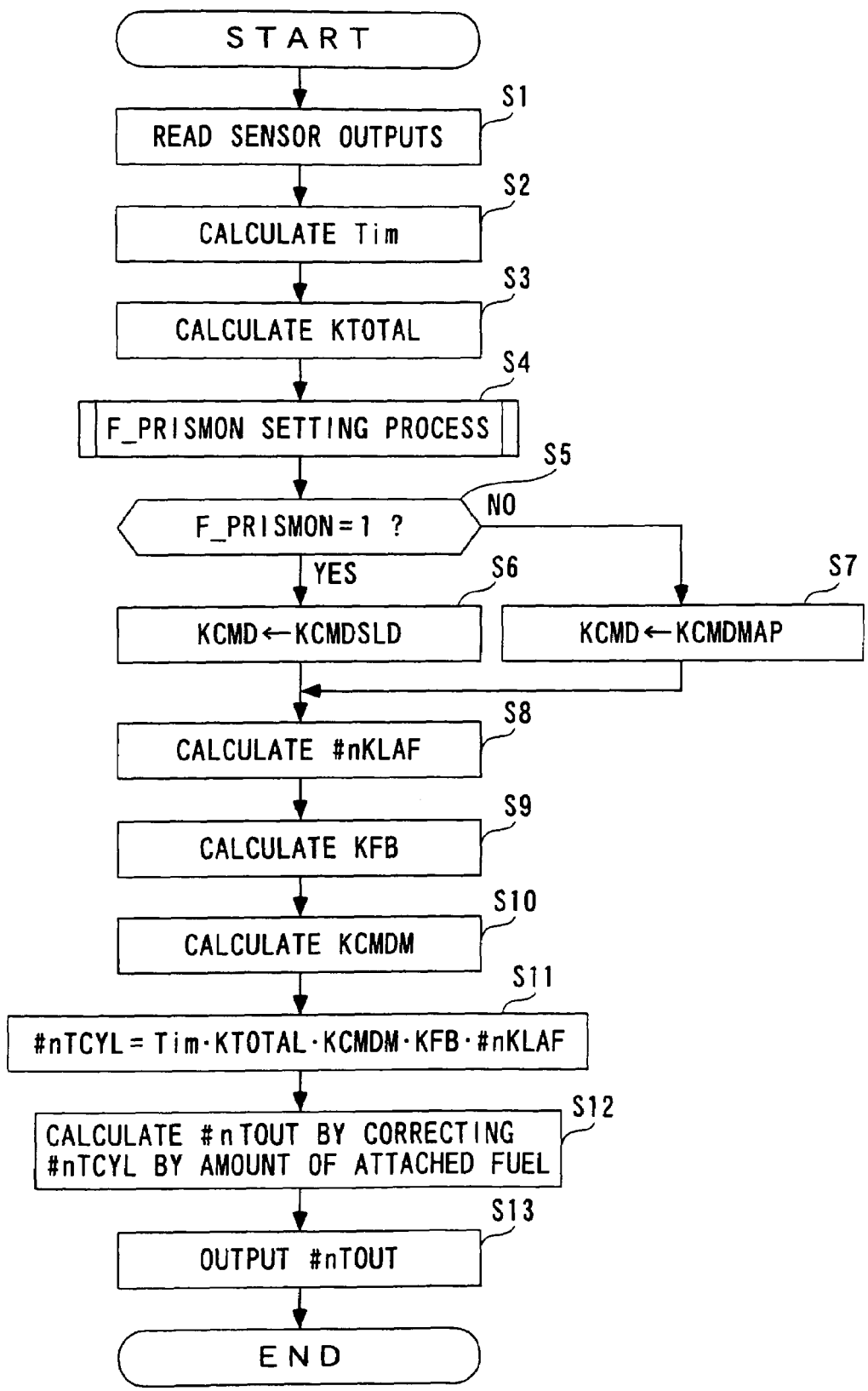
FIG. 8 is a flowchart of a fuel injection control process carried out for an internal combustion engine.

In the following, a process of calculating a fuel injection amount, which is executed by the ECU 2, will be described with reference to FIG. 8. In the following description, the symbol (k) representative of a present value is omitted when deemed appropriate. FIG. 8 shows a main routine for carrying out the control process, which is executed by an interrupt handling routine in synchronism with input of each TDC signal pulse. In this process, a fuel injection amount TOUT is calculated on a cylinder-by-cylinder basis by using the target air-fuel ratio KCMD calculated by the adaptive air-fuel ratio control process or the map retrieval process, which will be described hereinafter.

First, in a step S1, outputs from the sensors 10 to 19 described hereinbefore are read in and stored in the RAM.

Then, the program proceeds to a step S2, wherein a basic fuel injection amount Tim is calculated. In this process, the basic fuel injection amount Tim is calculated by searching a map, not shown, according to the engine rotational speed NE and the intake pipe absolute pressure PBA.

Then, the program proceeds to a step S3, wherein a total correction coefficient KTOTAL is calculated. The total correction coefficient KTOTAL is obtained by calculating various correction coefficients by searching tables and maps according to various operating parameters (e.g. the intake air temperature TA, the atmospheric pressure PA, the engine coolant temperature TW, the accelerator pedal opening AP, etc.) and then multiplying the correction coefficients by each other.

Then, the program proceeds to a step S4, wherein a process of setting an adaptive control flag F_PRISMON is executed. More specifically, although a program for carrying out this process is not shown, when conditions (A) to (F) shown below are all satisfied, it is judged that the conditions for using the target air-fuel ratio KCMD calculated in the adaptive air-fuel ratio control process are satisfied, and the adaptive control flag F_PRISMON is set to 1 so as to indicate the judgment. On the other hand, when at least one of the conditions (A) to (F) is not satisfied, the adaptive control flag F_PRISMON is set to 0.

(A) The LAF sensor 14 and the O2 sensor 15 are both active.

(B) The engine 3 is not performing lean-burn operation.

(C) The throttle valve 5 is not fully open.

(D) Retardation of ignition timing is not being executed.

(E) The engine 3 is not performing fuel cut-off operation.

(F) The engine rotational speed NE and the intake pipe absolute temperature PBA are within respective predetermined ranges.

Then, the program proceeds to a step S5, wherein it is determined whether or not the adaptive control flag F_PRISMON set in the step S4 assumes 1. If the answer to this question is affirmative (YES), the program proceeds to a step S6, wherein the target air-fuel ratio KCMD is set to an adaptive target air-fuel ratio KCMDSLD calculated in the adaptive air-fuel ratio control process described hereinafter.

On the other hand, if the answer to the question of the step S5 is negative (NO), the program proceeds to a step S7, wherein the target air-fuel ratio KCMD is set to a map value KCMDMAP. This map value KCMDMAP is calculated by searching a map, not shown, according to the engine rotational speed NE and the intake pipe absolute pressure PBA.

In a step S8 following the step S6 or S7, observer feedback correction coefficients #nKLAF are calculated on a cylinder-by-cylinder basis. The observer feedback correction coefficients #nKLAF are used for correcting variations in the actual air-fuel ratios in the respective cylinders. More specifically, an actual air-fuel ratio in each cylinder is estimated from the output KACT from the LAF sensor 14 by an observer, and then an observer feedback correction coefficient #nKLAF is calculated by PID control, according to each of the estimated air-fuel ratios. It should be noted that the symbol #n of the observer feedback correction coefficient #nKLAF represents one of cylinder numbers #1 to #4. This also applies to a required fuel injection amount #nTCYL and a final fuel injection amount #nTOUT.

Then, the program proceeds to a step S9, wherein a feedback correction coefficient KFB is calculated. The feedback correction coefficient KFB is for causing the output KACT from the LAF sensor 14 to become equal to the target air-fuel ratio KCMD. The feedback correction coefficient KFB is calculated as follows: A feedback coefficient KLAF is calculated according to a deviation between the output KACT from the LAF sensor 14 and the target air-fuel ratio KCMD; further, a feedback correction coefficient KSTR is calculated by a Self Tuning Regulator type adaptive controller, not shown, and then the calculated coefficient KSTR is divided by the target air-fuel ratio KCMD to obtain a feedback correction coefficient kstr; and one of the feedback coefficient KLAF and the feedback correction coefficients kstr is set to the feedback correction coefficient KFB.

Then, the program proceeds to a step S10, wherein a corrected target air-fuel ratio KCMDM is calculated. The corrected target air-fuel ratio KCMDM is for compensating for a change in charging efficiency due to a change in the air-fuel ratio A/F. The corrected target air-fuel ratio KCMDM is calculated by searching a table, not shown, according to the target air-fuel ratio KCMD calculated in the step S6 or S7.

Then, the program proceeds to a step S11, wherein the required fuel injection amounts #nTCYL are calculated on a cylinder-by-cylinder basis by using an equation (43) shown below, based on the basic fuel injection amount Tim, the total correction coefficient KTOTAL, the observer feedback correction coefficient #nKLAF, the feedback correction coefficient KFB, and the corrected target air-fuel ratio KCMDM each calculated as above.

$$\#nTCYL = Tim \cdot KTOTAL \cdot KCMDM \cdot KFB \cdot \#nKLAF \quad (43)$$

Then, the program proceeds to a step S12, wherein the final fuel injection amounts #nTOUT are calculated by correcting the required fuel injection amount #nTCYL by an amount of attached fuel. More specifically, the final fuel injection amount #nTOUT is obtained by calculating the ratio of fuel attached to an inner wall of a combustion chamber to all fuel injected from the injector 6 in the present combustion cycle, according to an operating condition of the engine, and then correcting the corresponding required fuel injection amount #nTCYL based on the calculated ratio of attached fuel.

Then, the program proceeds to a step S13, and a drive signal generated based on the final fuel injection amount #nTOUT calculated as above is delivered to the injector 6 of the corresponding cylinder, followed by terminating the program. Thus, the air-fuel ratio of the mixture is feedback controlled such that the output KACT from the LAF sensor 14 become equal to the target air-fuel ratio KCMD.

Next, the adaptive air-fuel ratio control process including the ADSM process and the PRISM process will be described with reference to FIGS. 9 and 10. This process is executed at predetermined control periods of ΔT (30 milliseconds). In the adaptive air-fuel ratio control process, the target air-fuel ratio KCMD is calculated according to the operating conditions of the engine 3 by the ADSM process, the PRISM process, or a process of setting the sliding mode control amount DKCMDSLD to a predetermined value SLDHOLD.

In the present process, first, an post-F/C determination process is executed in a step S20. Although a program of this process is not shown, during fuel cut-off operation of the engine, an post-F/C determination flag F_AFC is set to 1 to indicate that the engine is performing the fuel cut-off operation, while when a predetermined time period X_TM_AFC has elapsed after termination of the fuel cut-off operation, the flag F_AFC is set to 0 to indicate termination of the fuel cut-off operation.

Figure 11:
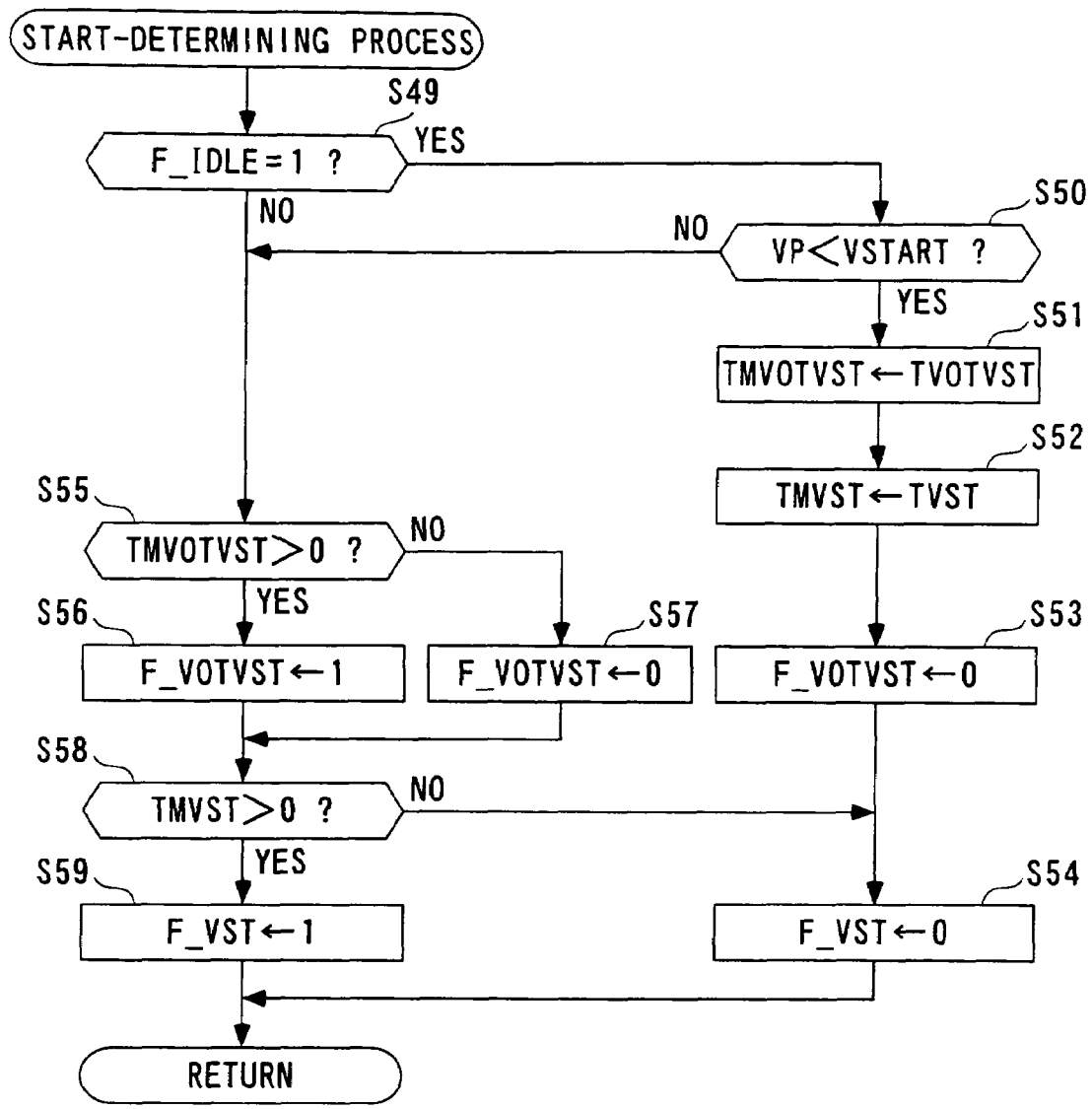
FIG. 11 is a flowchart of a start-determining process executed in a step S21 in FIG. 9.

Then, the program proceeds to a step S21, wherein a start-determining process is executed for determining, based on the vehicle speed VP, whether or not the vehicle on which the engine 3 is installed has started. As shown in FIG. 11, in the start-determining process, first, it is determined in a step S49 whether or not an idle flag F_IDLE assumes 1. The idle flag F_IDLE is set to 1 when the engine 3 is performing idle operation, and set to 0 when the engine 3 is not performing idle operation.

If the answer to the question is affirmative (YES), i.e. if the engine 3 is performing idle operation, the program proceeds to a step S50, wherein it is determined whether or not the vehicle speed VP is lower than a predetermined vehicle speed VSTART (e.g. 1 km/h). If the answer to the question is affirmative (YES), i.e. if the vehicle is standing, the program proceeds to a step S51, wherein a timer count TMVOTVST of a first start-determining timer as a downcount timer is set to a first predetermined time period TVOTVST (e.g. 3 milliseconds).

Then, the program proceeds to a step S52, wherein a timer count TMVST of a second start-determining timer as a downcount timer is set to a second predetermined time period TVST (e.g. 500 milliseconds) which is longer than the first predetermined time period TVOTVST. Thereafter, first and second start flags F_VOTVST and F_VST are both set to 0 in respective steps 53 and 54, followed by terminating the program.

On the other hand, if the answer to the question of the step S49 or S50 is negative (NO), i.e. if the engine 3 is not performing idle operation, or if the vehicle has started, the program proceeds to a step S55, wherein it is determined whether or not the timer count TMVOTVST of the first start-determining timer is larger than the value of 0. If the answer to the question is affirmative (YES), i.e. if the first predetermined time period TVOTVST has not elapsed after termination of the idle operation or the start of the vehicle, it is judged that the engine 3 is in a first start mode, and the program proceeds to a step S56, wherein the first start flag F_VOTVST is set to 1.

On the other hand, if the answer to the question of the step S55 is negative (NO), i.e. if the first predetermined time period TVOTVST has elapsed after termination of the idle operation or the start of the vehicle, it is judged that the first start mode is terminated, and the program proceeds to a step S57, wherein the first start flag F_VOTVST is set to 0.

In a step S58 following the step S56 or S57, it is determined whether or not the timer count TMVST of the second start-determining timer is larger than the value of 0. If the answer to the question is affirmative (YES), i.e. if the second predetermined time period TVST has not elapsed after termination of the idle operation or the start of the vehicle, it is judged that the engine 3 is in a second start mode, and the program proceeds to a step S59, wherein the second start flags F_VST is set to 1, followed by terminating the present program.

On the other hand, if the answer to the question of the step S58 is negative (NO), i.e. if the second predetermined time period TVST has elapsed after termination of the idle operation or the start of the vehicle, it is judged that the second start mode is terminated, and the step S54 is executed, followed by terminating the program.

Referring again to FIG. 9, in a step S22 following the step S21, a process of setting the state variables is executed. In this process, although not shown, the respective time series data of the target air-fuel ratio KCMD, the output KACT from the LAF sensor 14, and the output deviation VO2 are each shifted toward the past side by one sampling cycle. Then, the present values of KCMD, KACT and VO2 are calculated based on the latest values of the time series data of KCMD, KACT and VO2, the reference value FLAFBASE, and an adaptive correction term FLAFADP described hereinafter.

Then, the program proceeds to a step S23, wherein a PRISM/ADSM process execution-determining process is executed. This process is for determining whether or not conditions for executing the PRISM process or the ADSM process are satisfied, and more specifically, it is carried out as shown by a FIG. 12 flowchart.

Figure 12:
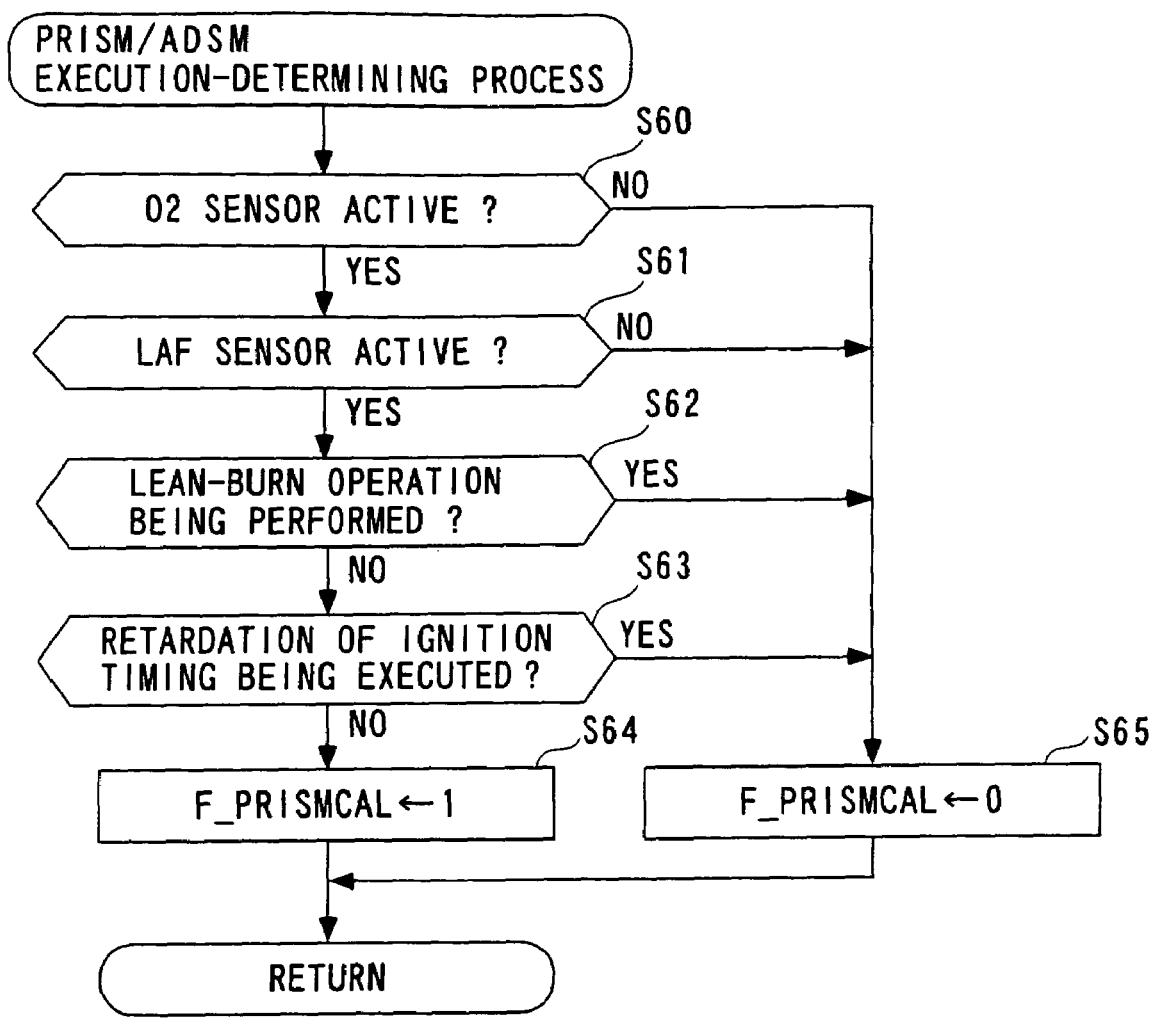
FIG. 12 is a flowchart of an execution-determining process executed in a step S23 in FIG. 9 so as to determine whether or not a PRISM/ADSM process should be carried out.

When conditions (G) to (J) shown below are all satisfied in steps S60 to S63 in FIG. 12, it is judged that the engine 3 is in an operating condition in which the PRISM process or the ADSM process should be executed, and a PRISM/ADSM execution flag F_PRSMCAL is set to 1 in a step S64 so as to indicate the judgment, followed by terminating the program. On the other hand, if at least one of the conditions (G) to (J) is not satisfied, it is judged that the engine 3 is not in the operating condition in which the PRISM process or the ADSM process should be executed, and the PRISM/ADSM execution flag F_PRSMCAL is set to 0 in a step S65 so as to indicate the judgment, followed by terminating the program.

(G) The O2 sensor 15 is active.
(H) The LAF sensor 14 is active.
(I) The engine 3 is not performing lean-burn operation.
(J) Retardation of the ignition timing is not being executed.

Referring again to FIG. 9, in a step S24 following the step S23, an identifier operation execution-determining process is executed. This process is for determining whether or not conditions for executing parameter identification by the onboard identifier 23 are satisfied, and more specifically, it is carried out as shown by a FIG. 13 flowchart.

Figure 13:
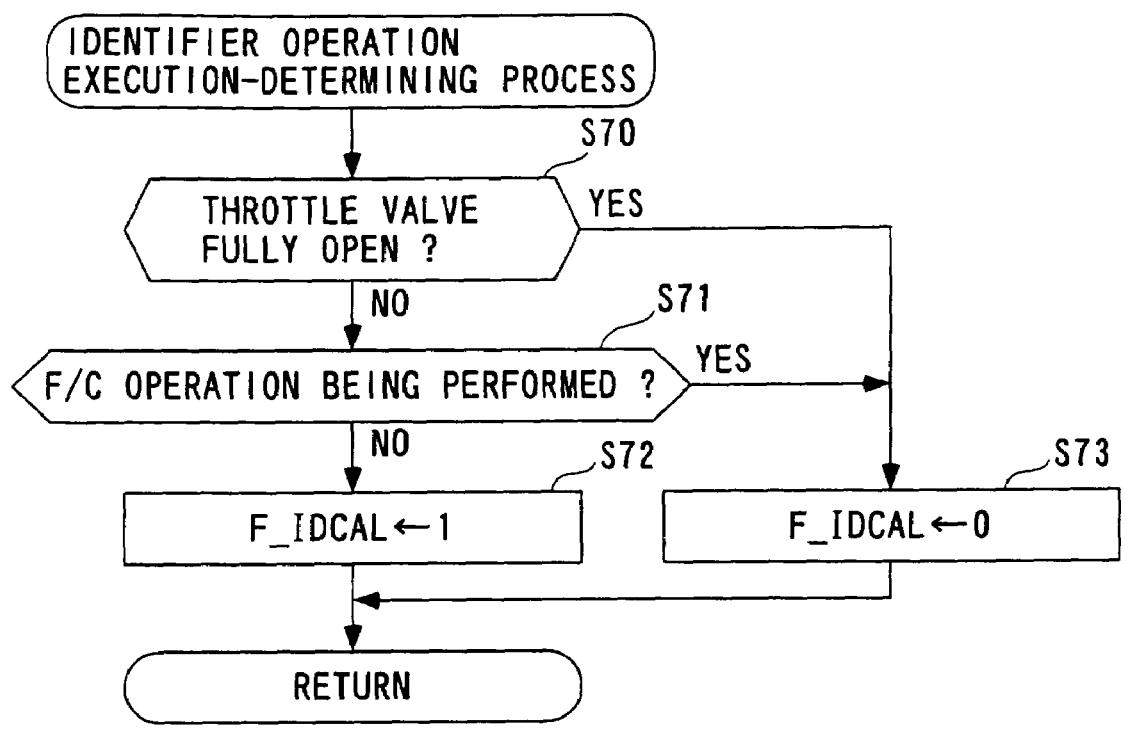
FIG. 13 is a flowchart of an execution-determining process executed in a step S24 in FIG. 9 so as to determine whether or not arithmetic operation should be carried out by an identifier.

That is, if answers to questions of steps S70 and S71 in FIG. 13 are both negative (NO), in other words, if the throttle valve opening θTH is not fully open and the engine 3 is not performing fuel cut-off operation, it is judged that the engine 3 is in an operating condition in which the parameter identification should be carried out, and the program proceeds to a step S72, followed by terminating the program. On the other hand, if either the answer to the question of the step S70 or that to the question of the step S71 is affirmative (YES), it is judged that the engine 3 is not in the operating condition in which the parameter identification should be carried out, and the program proceeds to a step S73, wherein the identification execution flag F_IDCAL is set to 0, followed by terminating the present program.

Referring again to FIG. 19, in a step S25 following the step S24, the various parameters (including the exhaust gas volume AB_SV) are calculated. This process will be described in detail hereinafter.

Then, the program proceeds to a step S26, wherein it is determined whether or not the PRISM/ADSM execution flag F_PRSMCAL set in the step S23 assumes 1. If the answer to the question is affirmative (YES), i.e. if the conditions for executing the PRISM process or the ADSM process are satisfied, the program proceeds to a step S27, wherein it is determined whether or not the identification execution flag F_IDCAL set in the step S24 assumes 1.

If the answer to the question is affirmative (YES), i.e. if the engine 3 is in the operating condition in which the parameter identification by the onboard identifier 23 should be carried out, the program proceeds to a step S28, wherein it is determined whether or not a parameter initialization flag F_IDRSET assumes 1. If the answer to the question is negative (NO), which means that initialization of the model parameters a1, a2 and b1 stored in the RAM is not required, the program immediately proceeds to a step S31 referred to hereinbelow.

On the other hand, if the answer to the question is affirmative (YES), i.e. if initialization of the model parameters a1, a2 and b1 is required, the program proceeds to a step S29, wherein the model parameters a1, a2 and b1 are set to respective initial values thereof, and then in the following step S30, the parameter initialization flag F_IDRSET is set to 0 so as to indicate that the parameters have been initialized.

Figure 10:
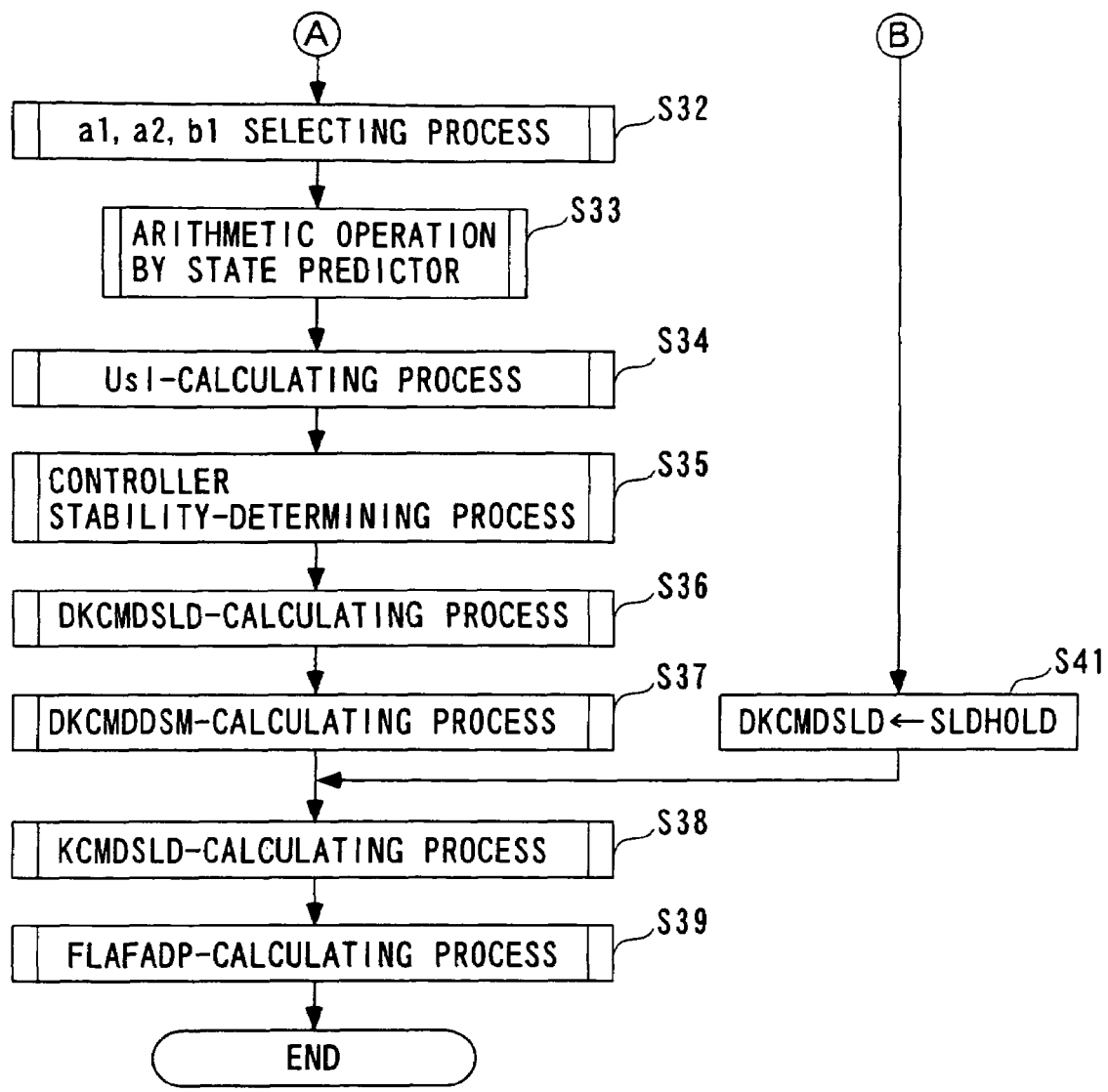
FIG. 10 is a continuation of the FIG. 9 flowchart.

In the step S31 following the step S30 or S28, arithmetic operation is carried out by the onboard identifier 23 to identify the model parameters a1, a2 and b1, and then the program proceeds to a step S32 in FIG. 10. The arithmetic operation by the onboard identifier 23 will be described in detail hereinafter.

On the other hand, if the answer to the question of the step S27 is negative (NO), i.e. if the engine 3 is not in the operating condition in which the parameter identification should be carried out, the above steps 28 to 31 are skipped over to a step S32 in FIG. 10. In the step S32 following the step S27 or S31, identified values or predetermined values are selected as the model parameters a1, a2 and b1. More specifically, although a program for carrying out the process is not shown, if the identification execution flag F_IDCAL set in the step S24 assumes 1, the model parameters a1, a2 and b1 are set to the values identified in the step S31, whereas if the flag F_IDCAL assumes 0, the model parameters a1, a2 and b1 are set to the predetermined values.

Then, the program proceeds to a step S33, wherein arithmetic operation is carried out by the state predictor 22 to calculate the predicted value PREVO2. Thereafter, the program proceeds to a step S34, wherein the control amount Usl is calculated as described hereinafter.

Then, the program proceeds to a step S35, wherein determination of stability of the SLD controller 25 is executed. More specifically, although a program for carrying out this process is not shown, it is determined, based on the value of the predictive switching function σPRE, whether or not the sliding mode control by the SLD controller 25 is in a stable state.

Then, in steps S36 and S37, the sliding mode control amount DKCMDSLD and a ΔΣ modulation control amount DKCMDDSM are calculated by the SLD controller 25 and the DSM controller 24, respectively, as described hereinafter.

Then, the program proceeds to a step S38, wherein the adaptive target air-fuel ratio KCMDSLD is calculated by using the sliding mode control amount DKCMDSLD calculated by the SLD controller 25 or the ΔΣ modulation control amount DKCMDDSM calculated by the DSM controller 24. Thereafter, the adaptive correction term FLAFADP is calculated in a step S39 as described in detail hereinafter, followed by terminating the program.

Figure 9:
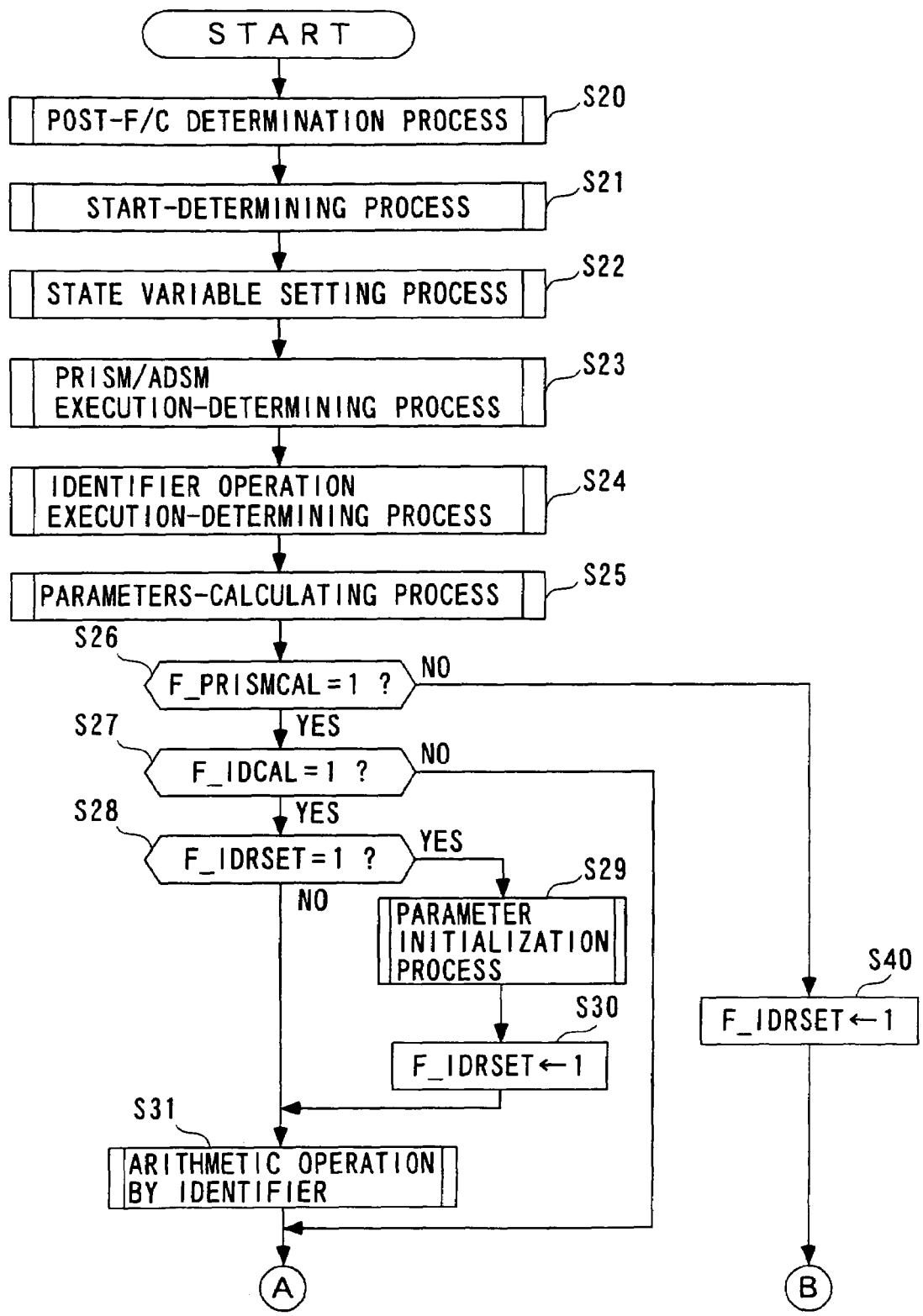
FIG. 9 is a flowchart of an adaptive air-fuel ratio control process.

On the other hand, if the answer to the question of the step S26 in FIG. 9 is negative (NO), i.e. if none of the conditions for executing the PRISM process and the ADSM process are satisfied, the program proceeds to a step S40, wherein the parameter initialization flag F_IDRSET is set to 1. Then, the program proceeds to a step S41 in FIG. 10, wherein the sliding mode control amount DKCMDSLD is set to the predetermined value SLDHOLD. Subsequently, the steps S38 and S39 are executed, followed by terminating the program.

Next, the step 25 process of calculating the parameters will be described with reference to FIG. 14. In this process, first in a step S80, the exhaust gas volume AB_SV (estimated value of space velocity) is calculated by using the following equation (44):

$$AB\_SV = (NE/1500) \cdot PBA \cdot X\_SVPRA \quad (44)$$

wherein X_SVPRA represents a predetermined coefficient determined based on the engine displacement.

Then, the program proceeds to a step S81, wherein dead time KACT_D (=d') in the aforementioned air-fuel operation system, dead time CAT_DELAY (=d) in the exhaust system and the predicted time dt are calculated. More specifically, the dead time KACT_D and the dead time CAT_DELAY are calculated by searching a table shown in FIG. 15 according to the exhaust gas volume AB_SV calculated in the step S80, and the sum (KACT_D+CAT_DELAY) of the two dead times is set to the predicted time dt. In other words, in the present control process, the phase delay time dd is set to a value of 0.

Figure 15:
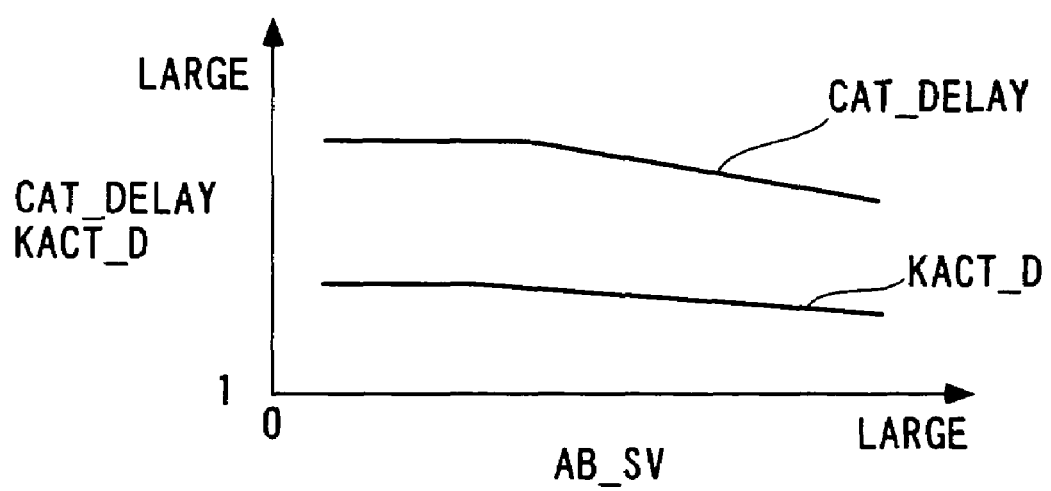
FIG. 15 shows an example of a table for use in calculating dead time CAT_DELAY and KACT_D.

In the FIG. 15 table, the dead times KACT_D and CAT_DELAY are each set to respective smaller values as the exhaust gas volume AB_SV is larger. This is because as the exhaust gas volume AB_SV is larger, the flow velocity of exhaust gases becomes higher, which reduces the dead times KACT_D and CAT_DELAY. Since the dead times KACT_D and CAT_DELAY and the predicted time dt are calculated according to the exhaust gas volume, it is possible to eliminate lag in control timing between the input and output of the controlled object by calculating the adaptive target air-fuel ratio KCMDSLD described in detail hereinafter, based on the predicted value PREVO2 of the output deviation VO2, calculated by using the dead times KACT_D and CAT_DELAY and the predicted time dt. Further, since the model parameters a1, a2 and b1 are identified by using the dead time CAT_DELAY, it is possible cause the dynamic characteristics of the controlled object model to be adapted to the actual dynamic characteristics of the controlled object, thereby eliminating lag in control timing between the input and output of the controlled object further effectively.

Then, the program proceeds to a step S82, wherein the values of the weight parameters λ1, λ2 of the identification algorithm are calculated. More specifically, the weight parameter λ2 is set to the value of 1, and then the weight parameter λ1 is calculated by searching a table shown in FIG. 16 according to the exhaust gas volume AB_SV.

Figure 16:
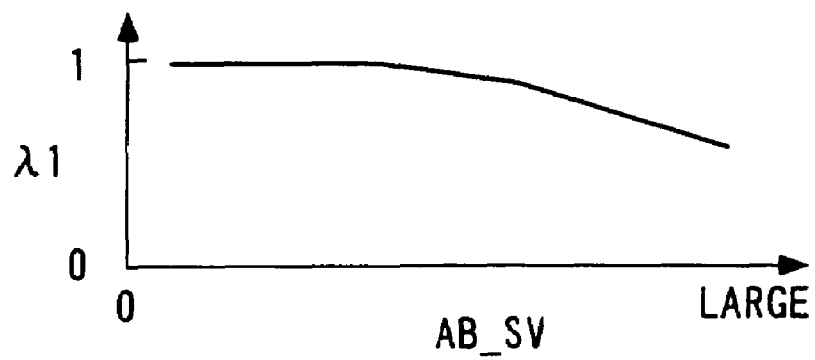
FIG. 16 shows an example of a table for use in calculating a weight parameter $\lambda 1$.

In the FIG. 16 table, as the exhaust gas volume AB_SV is larger, the weight parameter λ1 is set to a smaller value, or in other words, as the exhaust gas volume AB_SV is smaller, the weight parameter λ1 is set to a value larger and closer to a value of 1. The reason for this is that it is necessary to carry out identification of the model parameters more speedily as the exhaust gas volume AB_SV is larger, or in other words, the engine 3 is in a higher load operating condition, and hence it is necessary to set the weight parameter λ1 to a smaller value to thereby increase the speed at which the model parameters converge to respective optimal values. In addition, since the air-fuel ratio is more liable to change as the exhaust gas volume AB_SV is smaller, or namely, the engine 3 is in a lower load operating condition, it is necessary to maintain high accuracy in identification of the model parameters, and hence it is required to set the weight parameter λ1 to a value closer to a value of 1 (make the algorithm closer to the least-squares algorithm) to thereby enhance accuracy in identification of the model parameters.

Figure 17:
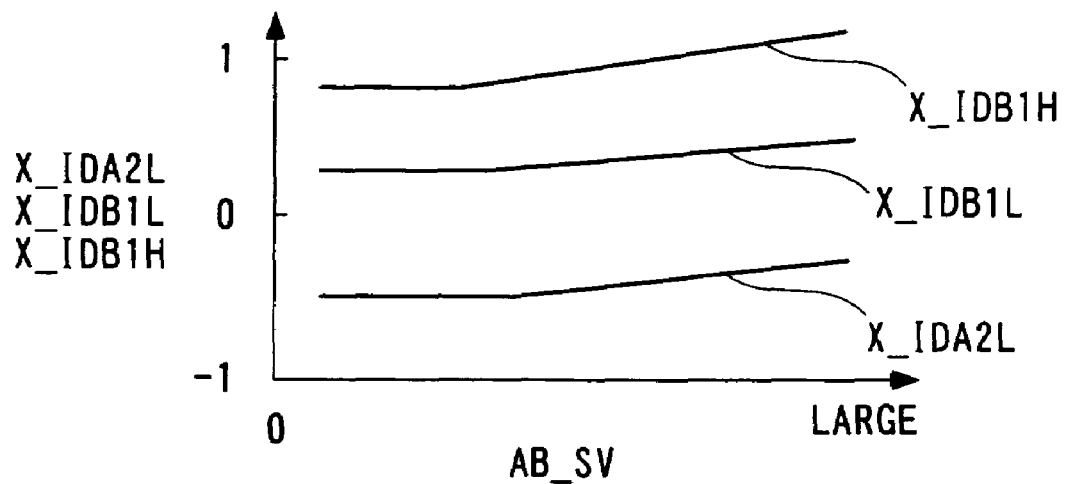
FIG. 17 shows an example of a table for use in calculating limit values X_IDA2L, X_IDB1L and X_IDB1H for limiting the respective values of model parameters a1, a2 and b1.

Then, the program proceeds to a step S83, wherein a lower limit value X_IDA2L for limiting the values of the model parameters a1, a2 and a lower limit value X_IDB1L and an upper limit value X_IDB1H for limiting the value of the model parameter b1 are calculated by searching a table shown in FIG. 17 according to the exhaust gas volume AB_SV.

In the FIG. 17 table, the lower limit value X_IDA2L is set to a larger value as the exhaust gas volume AB_SV is larger. This is because the combination of the model parameters a1, a2 for holding the control system in a stable state changes with a increase or decrease in dead time dependent on a change in the exhaust gas volume AB_SV, Further, the lower and upper limit values X_IDB1L and X_IDB1H are also set to respective larger values as the exhaust gas volume AB_SV is larger. This is because as the exhaust gas volume AB_SV is larger, the influence of an pre-catalyst air-fuel ratio (air-fuel ratio of exhaust gases upstream of the first catalytic device 8a) on the output Vout from the O2 sensor 15 increases, in other words, the gain of the controlled object further increases.

Figure 18:
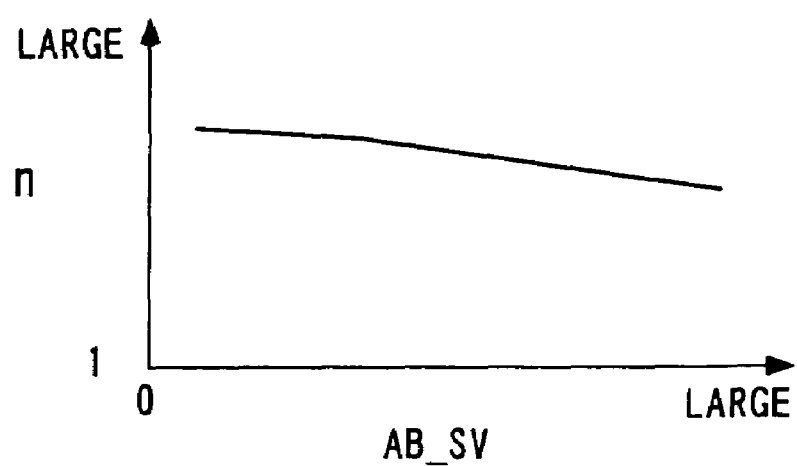
FIG. 18 shows an example of a table for use in calculating a filter order n.

Then, the program proceeds to a step S84, and the filter order n for use in the moving average filtering process is calculated, followed by terminating the program. In this process, the filter order n is calculated by searching a FIG. 18 table according to the exhaust gas volume AB_SV.

In this table, the filter order n is set to a smaller value as the exhaust gas volume AB_SV is larger. The reason for this is as follows: As described hereinabove, since a change in the exhaust gas volume AB_SV causes a change in the frequency characteristics of the controlled object, particularly in the gain characteristics thereof, it is required to properly correct frequency weighting characteristics of the weighted least-squares algorithm according to the exhaust gas volume AB_SV so as to adjust the gain characteristics of the controlled object model to the actual gain characteristics of the controlled object. Therefore, by setting the filter order n in the moving average filtering process according to the exhaust gas volume AB_SV as shown by the FIG. 18 table, it is possible to maintain a constant identification weight in the identification algorithm even if the exhaust gas volume AB_SV changes, and ensure conformity in the gain characteristics between the controlled object model and the controlled object, thereby enhancing identification accuracy.

Figure 19:
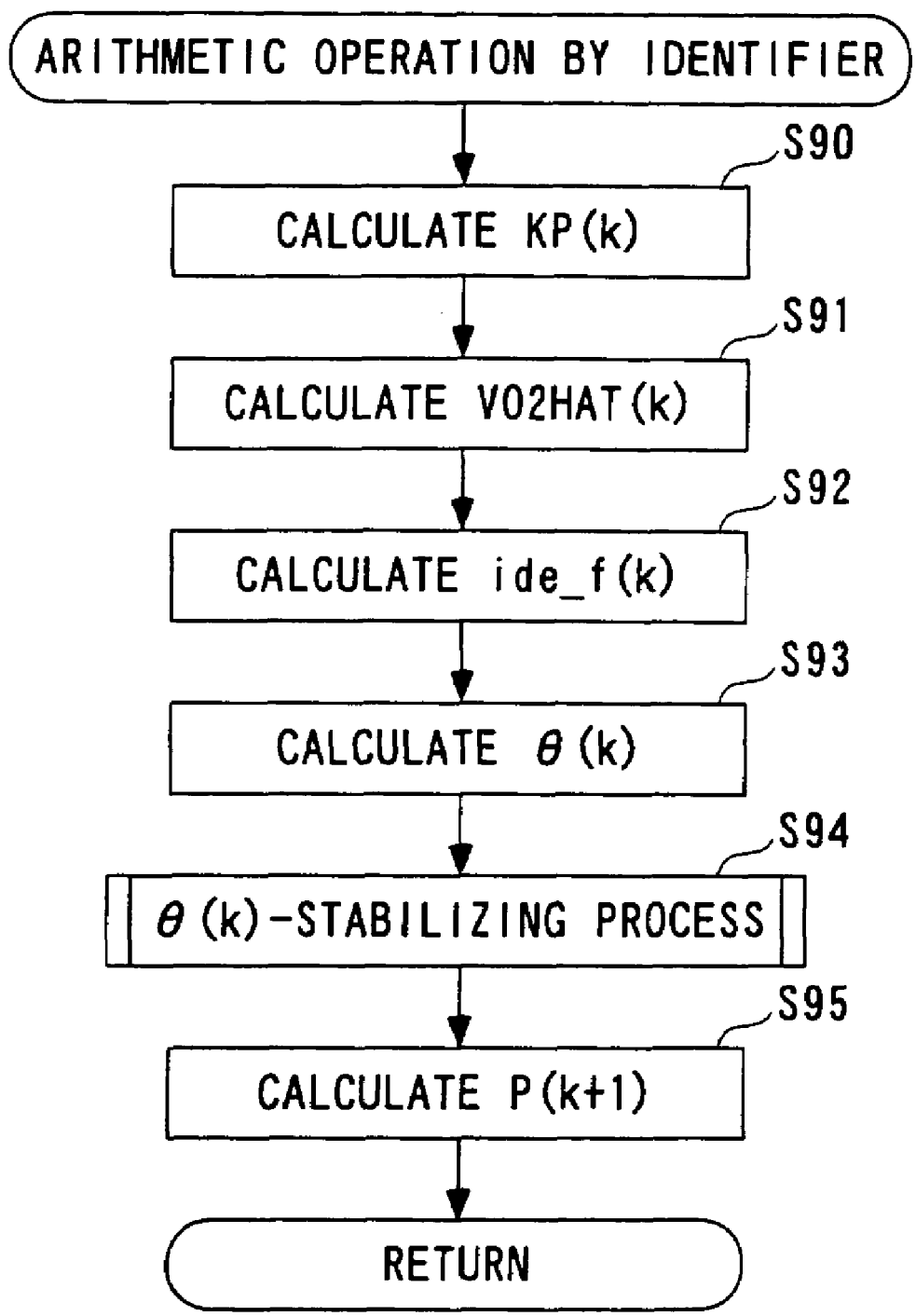
FIG. 19 is a flowchart of an arithmetic operation process carried out by the identifier in a step S31 in FIG. 9.

Next, the arithmetic operation carried out by the onboard identifier 23 in the step S31 will be described with reference to FIG. 19. As shown in the figure, in this process, first in a step S90, the gain coefficient KP(k) is calculated by using the equation (22). The program proceeds to a step S91, wherein the identified value VO2HAT(k) of the output deviation VO2 is calculated by using the equation (20).

Then, the program proceeds to a step S92, wherein the identification error filtered value ide_f(k) is calculated by using the equations (18) and (19). Then, in the following step S93, the vector θ(k) of the model parameters is calculated by using the equation (16), whereafter in a step S94, the vector θ(k) of the model parameters is stabilized. This stabilization process will be described in detail hereinbelow.

Then, the program proceeds to a step S95, wherein the immediately following value P(k+1) of a square matrix P(k) is calculated by using the equation (23). This value P(k+1) is used as the value of the square matrix P(k) in calculation in the immediately following loop.

Figure 20:
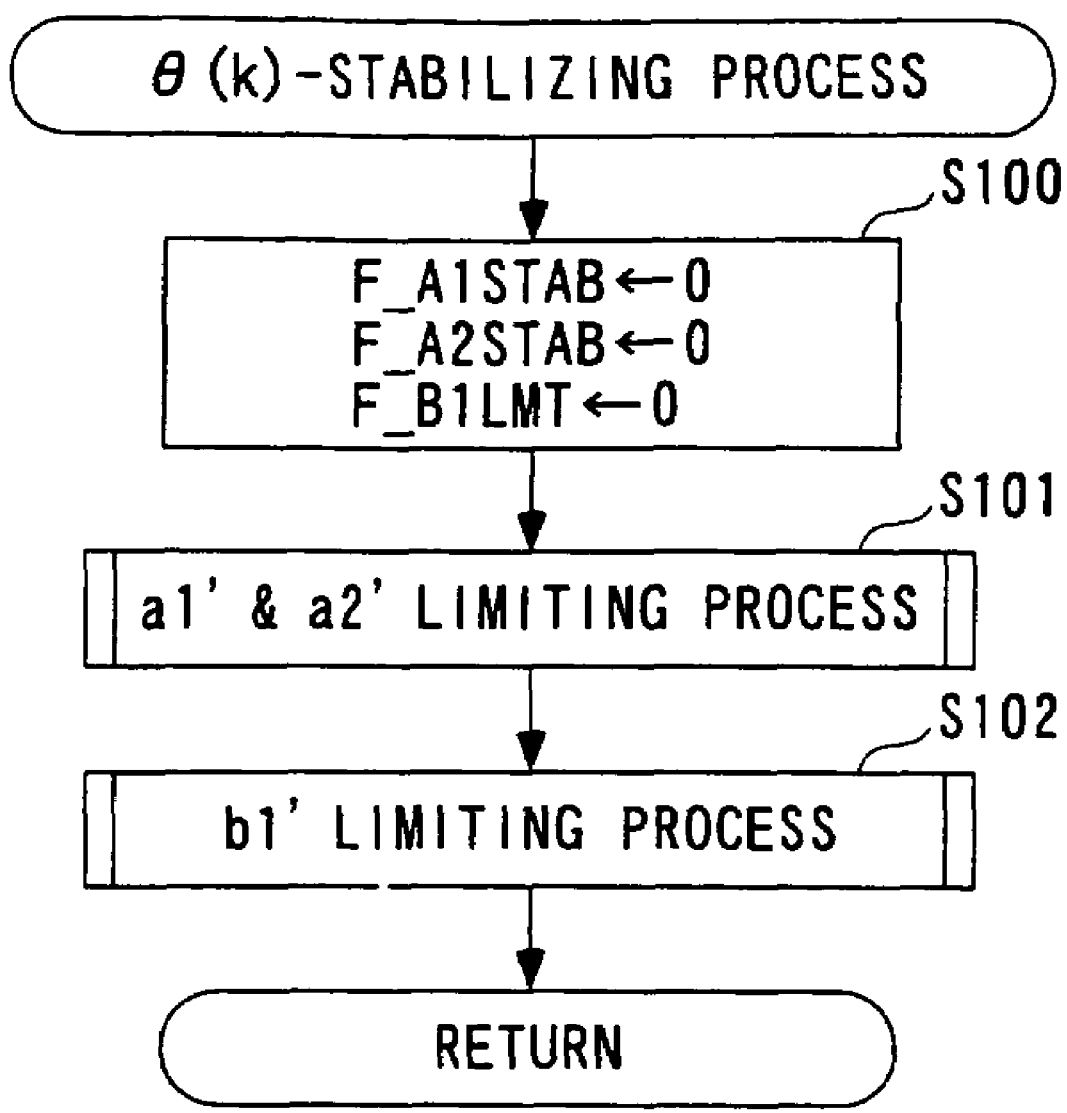
FIG. 20 is a flowchart of a $\theta(k)$ stabilization process executed in a step S94 in FIG. 19.

Next, the stabilization process for stabilizing the vector θ(k) of the model parameters will be described with reference to FIG. 20. As shown in the figure, first in a step S100, three flags F_A1STAB, F_A2STAB, and F_B1STAB are all set to 0.

Then, the program proceeds to a step S101, wherein an a1' & a2' limiting process is executed as described hereinbelow. Then, a b1' limiting process is executed in a step S102 as described hereinafter, followed by terminating the program.

In the following, the a1' & a2' limiting process executed in the step S101 will be described in detail with reference to FIG. 21. As shown in the figure, first, it is determined in a step S110 whether or not the identified value a2' of the model parameter calculated in the step S93 is equal to or larger than the lower limit value X_IDA2L calculated in the step S83 in FIG. 14. If the answer to the question is negative (NO), the program proceeds to a step S111, wherein the model parameter a2 is set to the lower limit value X_IDA2L so as to stabilize the control system, and the flag F_A2STAB is set to 1 so as to indicate that stabilization of the model parameter a2 has been executed. On the other hand, if the answer to the question is affirmative (YES), i.e. if a2'≧X_IDA2L holds, the program proceeds to a step S112, wherein the model parameter a2 is set to the identified value a2'.

In a step S113 following the step S111 or S112, it is determined whether or not the identified value a1' of the model parameter calculated in the step S93 is equal to or larger than a predetermined lower limit value X_IDA1L (e.g. a fixed value equal to or larger than a value of −2 and smaller than a value of 0). If the answer to the question is negative (NO), the program proceeds to a step S114, wherein the model parameter a1 is set to the lower limit value X_IDA1L so as to stabilize the control system, and the flag F_A1STAB is set to 1 so as to indicate that stabilization of the model parameter a1 has been executed.

On the other hand, if the answer to the question of the step S113 is affirmative (YES), the program proceeds to a step S115, wherein it is determined whether or not the identified value a1' is equal to or smaller than a predetermined upper limit value X_IDA1H (e.g. a value of 2). If the answer to the question is affirmative (YES), i.e. if X_IDA1L≦a1'≦X_IDA1H holds, the program proceeds to a step S116, wherein the model parameter a1 is set to the identified value a1', whereas if the answer to the question is negative (NO), i.e. if X_IDA1H<a1' holds, the program proceeds to a step S117, wherein the model parameter a1 is set to the upper limit value X_IDA1H, and the flag F_A1STAB is set to 1 so as to indicate that stabilization of the model parameter a1 has been executed.

In a step S118 following the step S114, S116 or S117, it is determined whether or not the sum (|a1|+a2) of the absolute value of the model parameter a1 calculated as above and the model parameter a2 is equal to or smaller than a predetermined reference value X_A2STAB (e.g. a value of 0.9). If the answer to the question is affirmative (YES), it is judged that the combination of the model parameters a1, a2 is within a range (limited range shown as a hatched area in FIG. 22) ensuring stability of the control system, and the program is immediately terminated.

On the other hand, if the answer to the question of the step S118 is negative (NO), the program proceeds to a step S119, wherein it is determined whether or not the model parameter a1 is equal to or smaller than a value (X_A2STAB−X_IDA2L) obtained by subtracting the lower limit value X_IDA2L from the reference value X_A2STAB. If the answer to the question of the step S118 is affirmative (YES), in the following step S120, the model parameter a2 is set to a value (X_A2STAB−|a1|) obtained by subtracting the absolute value of the model parameter a1 from the reference value X_A2STAB, and the flag F_A2STAB is set to 1 so as to indicate that stabilization of the model parameter a2 was executed, followed by terminating the program.

On the other hand, if the answer to the question of the step S119 is negative (NO), i.e. if a1>(X_A2STAB−X_IDA2L) holds, the program proceeds to a step S121, wherein the model parameter a1 is set to the value (X_A2STAB−X_IDA2L) obtained by subtracting the lower limit value X_IDA2L from the reference value X_A2STAB, and the model parameter a2 is set to the lower limit value X_IDA2L. At the same time, the flags F_A1STAB and F_A2STAB are both set to 1 so as to indicate that stabilization of the model parameters a1, a2 has been executed, followed by terminating the program.

As described hereinabove, according to the sequential identification algorithm, when the input/output of the controlled object comes into a steady state, a so-called drift phenomenon in which the absolute values of the identified model parameters increase due to insufficiency of conditions for self-excitement is liable to occur, which can make the control system unstable or place the same in an oscillating state. Further, the stability limit of the control system changes depending on the operating conditions of the engine 3. For instance, when the engine 3 is in a low load operating condition, the exhaust gas volume AB_SV becomes smaller, causing increased delay in response of exhaust gases to a supplied mixture and dead time. This tend to place the output Vout from the O2 sensor 15 in an oscillating state.

To overcome this problem, in the above a1' & a2' limiting process, the combination of the model parameters a1, a2 is set to be held within the limited range shown as the hatched area in FIG. 22, and the lower limit value X_IDA2L determining the limited range is set according to the exhaust gas volume AB_SV, so that the limited range can be set as a range of appropriate stability reflecting a change in the stability limit due to a change in the operating conditions of the engine 3, i.e. a change in the dynamic characteristics of the controlled object, and the drift phenomenon can be avoided by using the model parameters a1, a2 within the limited range ensuring the stability of the control system. In addition, by setting the combination of the model parameters a1, a2 as a value within the above limited range ensuring the stability of the control system, it is possible to avoid occurrence of an unstable state of the controlled object which might be caused when the model parameter a1 and the model parameter a2 are limited separately. Thus, the stability of the control system can be enhanced, which contributes to enhancement of the exhaust gas purification rate.

Next, the b1' limiting process executed in the step S102 will be described with reference to FIG. 23. As shown in the figure, in this process, it is determined in a step S130 whether or not the identified value b1' calculated in the step S93 is equal to or larger than the lower limit value X_IDB1L calculated in the step S83 in FIG. 14.

Figure 14:
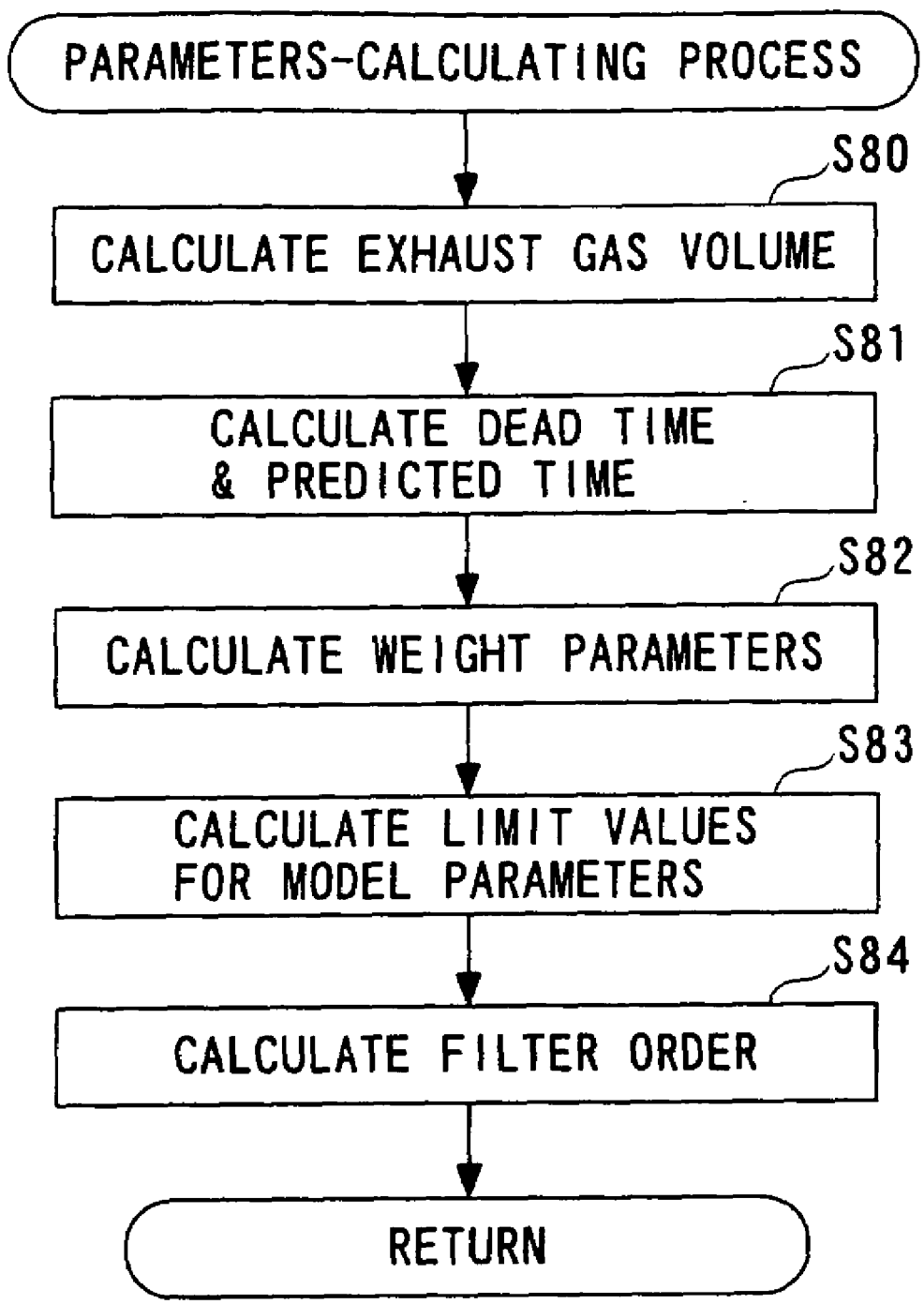
FIG. 14 is a flowchart of a calculation process executed in a step S25 in FIG. 9 so as to calculate various parameters.

If the answer to the question is affirmative (YES), i.e. if b1'≧X_IDB1L holds, the program proceeds to a step S131, wherein it is determined whether or not the identified value b1' is equal to or smaller than the upper limit value X_IDB1H calculated in the step S83 in FIG. 14. If the answer to the question is affirmative (YES), i.e. if X_IDB1L≦b1'≦X_IDB1H holds, the model parameter b1 is set to the identified value b1' in a step S132, followed by terminating the program.

On the other hand, if the answer to the question of the step S131 is negative (NO), i.e. b1'>X_IDB1H holds, the program proceeds to a step S133. In the step S133, the model parameter b1 is set to the upper limit value X_IDB1H, and then a flag F_B1LMT is set to 1 to indicate the fact, followed by terminating the program.

On the other hand, if the answer to the question of the step S130 is negative (NO), i.e. b1'>X_IDB1H holds, the program proceeds to a step S134. In the step S134, the model parameter b1 is set to the upper limit value X_IDB1H, and then a flag F_B1LMT is set to 1 to indicate the fact, followed by terminating the program.

Execution of the b1' limiting process makes it possible to limit the model parameter b1 to a value within the limited range defined between X_IDB1L and X_IDB1H, thereby preventing the drift phenomenon from being caused due to the use of the sequential identification algorithm. Further, since the upper and lower limit values X_IDB1H and X_IDB1L are set according to the exhaust gas volume AB_SV as described above, the limited range can be set as a range of appropriate stability reflecting a change in the stability limit due to a change in the operating conditions of the engine 3, i.e. a change in the dynamic characteristics of the controlled object, and the stability of the control system can be ensured by using the model parameter b1 limited within the limited range. Thus, the stability of the control system can be enhanced, which contributes to enhancement of the exhaust gas purification rate.

Next, the arithmetic operation carried out by the state predictor 22 in the step S33 will be described with reference to FIG. 24. In this process, first in a step S140, matrix elements $\alpha 1$, $\alpha 2$, $\beta i$, $\beta j$ of the equation (7) are calculated. Then, in the following step S141, the matrix elements $\alpha 1$, $\alpha 2$, $\beta i$, $\beta j$ obtained in the step S140, are applied to the equation (7) to calculate the predicted value PREVO2 of the output deviation VO2, followed by terminating the program.

Figure 25:
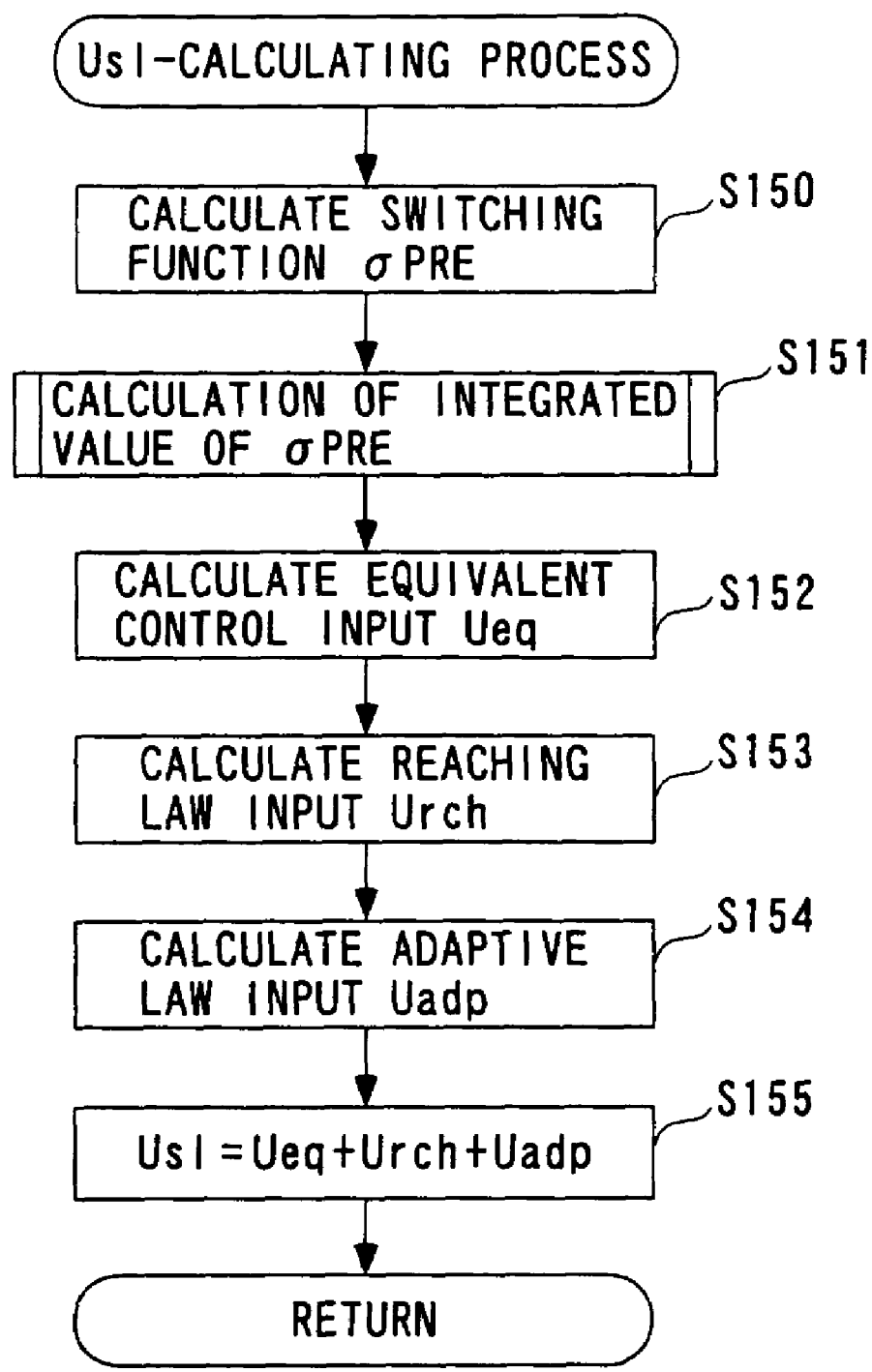
FIG. 25 is a flowchart of a Usl calculating process executed in a step S34 in FIG. 10 so as to calculate a control amount Usl.

Next, the process of calculating the control amount Usl, which was executed in the step S34, will be described in detail with reference to FIG. 25. In this process, first in a step S150, the predictive switching function σPRE is calculated by using the equation (38).

Then, the program proceeds to a step S151, wherein an integrated value SUMSIGMA of the predictive switching function σPRE is calculated. In this process, as shown in FIG. 26, first, it is determined in a step S160 whether or not at least one of the following conditions (L) to (M) is satisfied:

(L) The adaptive control flag F_PRISMON assumes 1.

(M) An integrated value holding flag F_SS_HOLD, referred to hereinafter, assumes 0.

(N) An ADMS termination flag F_KOPR, referred to hereinafter, assumes 0.

If the answer to the question of the step S160 is affirmative (YES), i.e. if at least one of the conditions for calculating the integrated value SUMSIGMA is satisfied, the program proceeds to a step S161, wherein the present value SUMSIGMA(k) of the integrated value SUMSIGMA is set to a value [SUMSIGMA(k−1)+ΔT·σPRE] obtained by adding a product of the control period ΔT and the predictive switching function σPRE to the immediately preceding value SUMSIGMA(k−1).

Then, the program proceeds to a step S162, wherein it is determined whether or not the present value SUMSIGMA(k) obtained in the step S161 is larger than a predetermined lower limit value SUMSL. If the answer to the question is affirmative (YES), the program proceeds to a step S163, wherein it is determined whether or not the present value SUMSIGMA(k) is smaller than a predetermined upper limit value SUMSH. If the answer to the question is affirmative (YES), i.e. if SUMSL<SUMSIGMA(k)<SUMSH holds, the program is immediately terminated.

On the other hand, if the answer to the question of the step S163 is negative (NO), i.e. if SUMSIGMA(k)≧SUMSH holds, the present value SUMSIGMA(k) is set to the upper limit value SUMSH in a step S164, followed by terminating the program. Further, if the answer to the question of the step S162 is negative (NO), i.e. if SUMSIGMA(k)≦SUMSH holds, the present value SUMSIGMA(k) is set to the lower limit value SUMSL in a step S165, followed by terminating the program.

If the answer to the question of the step S160 is negative (NO), i.e. if none of the three conditions (L) to (N) for calculating the integrated value SUMSIGMA are satisfied, the program proceeds to a step S166, wherein the present value SUMSIGMA(k) is set to the immediately preceding value SUMSIGMA(k−1). That is, the integrated value SUMSIGMA is held, and then the program is terminated.

Referring again to FIG. 25, in steps S152 to S154 following the step S151, the equivalent control input Ueq, the reaching law input Urch(k) and the adaptive law input Uadp(k) are calculated, respectively, by using the respective equations (40) to (42).

Then, the control amount Usl is set to the sum of the equivalent control input Ueq, the reaching law input Urch(k) and the adaptive law input Uadp(k) in a step S155, followed by terminating the program.

Figure 27:
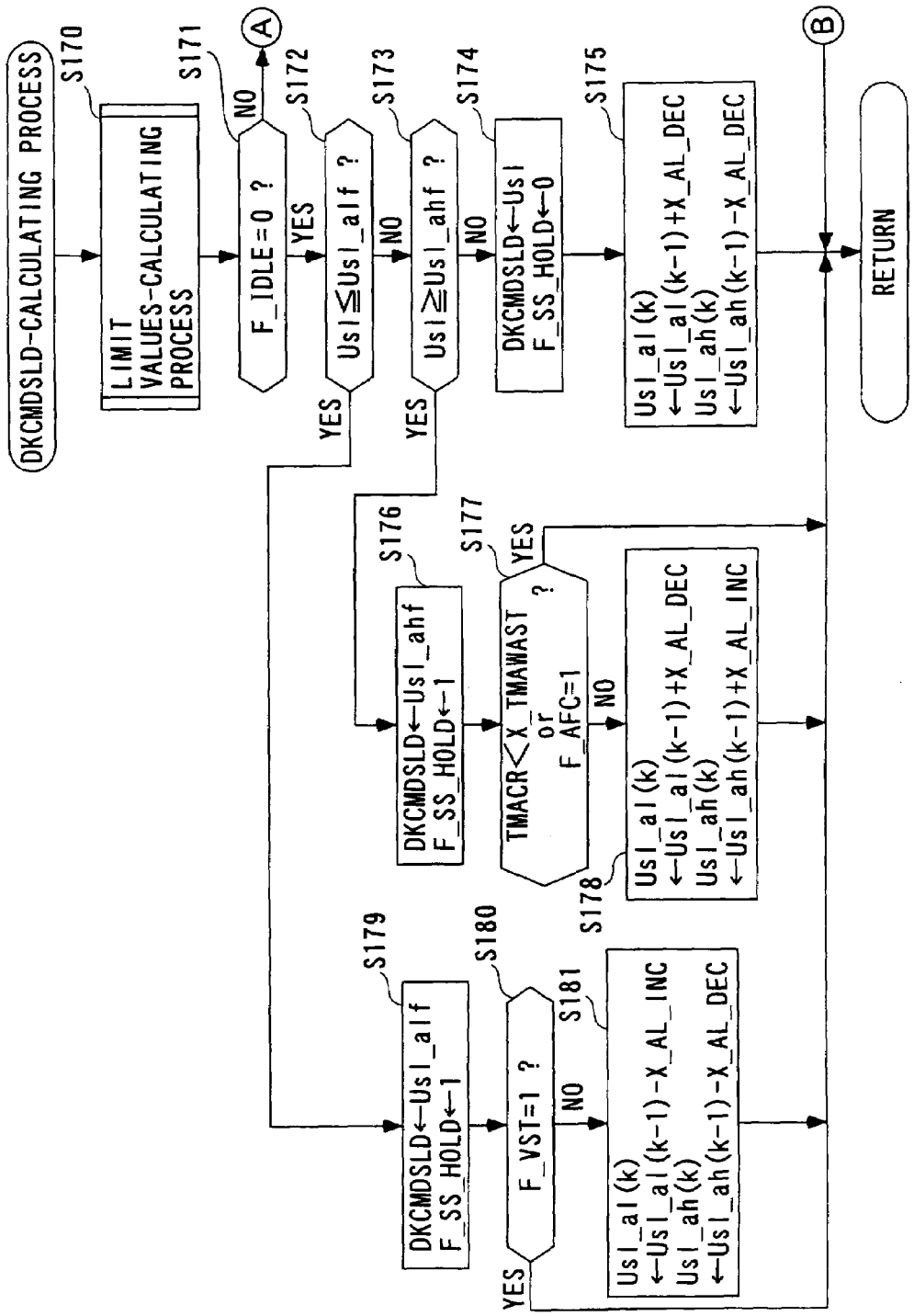
FIG. 27 is a flowchart of a DKCMDSLD calculating process executed in a step S36 in FIG. 10 so as to calculate a sliding mode control amount DKCMDSLD.

Next, the process of calculating the sliding mode control amount DKCMDSLD, which is executed in the step S36 in FIG. 10, will be described in detail with reference to FIGS. 27 and 28. In this process, first in a step S170, a process of calculating limit values of the control amount Usl is executed. In the limit value-calculating process, although detailed description is omitted, upper and lower limit values Usl_ahf, Usl_alf for non-idle operation and upper and lower limit values Usl_ahfi, Usl_alfi for idle operation are calculated based on determination by the controller stability-determining process executed in the step S35 and respective adaptive upper and lower limit values Usl_ah, Usl_al, described hereinbelow, of the control amount Usl.

Then, the program proceeds to a step S171, wherein it is determined whether or not the idle flag F_IDLE assumes 0. If the answer to the question is affirmative (YES), i.e. if the engine 3 is not performing idle operation, the program proceeds to a step S172, wherein it is determined whether or not the control amount Usl obtained by the FIG. 25 process is equal to or smaller than the lower limit value Usl_alf for non-idle operation.

If the answer to the question is negative (NO), i.e. if Usl>Usl_alf holds, the program proceeds to a step S173, wherein it is determined whether or not the control amount Usl is equal to or larger than the upper limit value Usl_ahf for non-idle operation. If the answer to the question is negative (NO), i.e. if Usl_alf<Usl<Usl_ahf holds, the program proceeds to a step S174, wherein the sliding mode control amount DKCMDSLD is set to the control amount Usl, and at the same time, the integrated value-holding flag F_SS_HOLD is set to 0.

In the following step S175, the present value Usl_al(k) of the adaptive lower limit value is set to a value [Usl_al(k−1)+ X_AL_DEC] obtained by adding a predetermined value X_AL_DEC on the decreasing side to the immediately preceding value Usl_al(k−1) of the adaptive lower limit value, and at the same time the present value Usl_ah(k) of the adaptive upper limit value is set to a value [Usl_ah(k−1)− X_AL_DEC] obtained by subtracting the predetermined value X_AL_DEC on the decreasing side from the immediately preceding value Usl_ah(k−1) of the adaptive lower limit value, followed by terminating the program.

On the other hand, if the answer to the question of the step S173 is affirmative (YES), i.e. if Usl≧Usl_ahf holds, the program proceeds to a step S176, wherein the sliding mode control amount DKCMDSLD is set to the adaptive upper limit value Usl_ahf for non-idle operation, and at the same time the integrated value-holding flag F_SS_HOLD is set to 1.

Then, the program proceeds to a step S177, wherein it is determined whether or not a timer count TMACR of a post-start timer is smaller than a predetermined time period X_TMAWAST, or the post-F/C determination flag F_AFC assumes 1. The post-start timer is an upcount timer for counting a time period elapsed after the start of the engine 3.

If the answer to the question is affirmative (YES), i.e. if the predetermined time period X_TMAWAST has not elapsed after the start of the engine, or the predetermined time period X_TM_AFC has not elapsed after termination of the fuel cut-off operation, the program is immediately terminated.

On the other hand, if the answer to the question of the step S177 is negative (NO), i.e. if the predetermined time period X_TMAWAST has elapsed after the start of the engine, and the predetermined time period X_TM_AFC has elapsed after termination of the fuel cut-off operation, in the following step S178, the present value Usl_al(k) of the adaptive lower limit value is set to the value [Usl_al(k−1)+X_AL_DEC] obtained by adding the predetermined value X_AL_DEC on the decreasing side to the immediately preceding value Usl_al (k−1) of the adaptive lower limit value, and at the same time the present value Usl_ah(k) of the adaptive upper limit value is set to a value [Usl_ah(k−1)+X_AL_INC] obtained by adding the predetermined value X_AL_INC on the increasing side to the immediately preceding value Usl_ah(k−1) of the adaptive lower limit value, followed by terminating the program.

If the answer to the question of the step S172 is affirmative (YES), i.e. if Usl≦Usl_alf holds, the program proceeds to a step S179, wherein the sliding mode control amount DKC-MDSLD is set to the adaptive lower limit value Usl_alf for non-idle operation, and at the same time the integrated value-holding flag F_SS_HOLD is set to 1.

Then, the program proceeds to a step S180, wherein it is determined whether or not the second start flag F_VST assumes 1. If the answer to the question is affirmative (YES), i.e. if the second predetermined time period TVST has not elapsed after the start of the vehicle, which means that the engine 3 is in the second start mode, the program is immediately terminated.

On the other hand, if the answer to the question of the step S180 is negative (NO), i.e. if the second predetermined time period TVST has elapsed after the start of the vehicle, which means termination of the second start mode, the program proceeds to a step S181. Then, in the step S181, the present value Usl_al(k) of the adaptive lower limit value is set to a value [Usl_ah(k−1)−X_AL_INC] obtained by subtracting the predetermined value X_AL_INC on the increasing side from the immediately preceding value Usl_ah(k−1) of the adaptive lower limit value, and at the same time the present value Usl_ah(k) of the adaptive upper limit value is set to a value [Usl_al(k−1)−X_AL_DEC] obtained by subtracting the predetermined value X_AL_DEC on the decreasing side from the immediately preceding value Usl_ah(k−1) of the adaptive upper limit value, followed by terminating the program.

Figure 28:
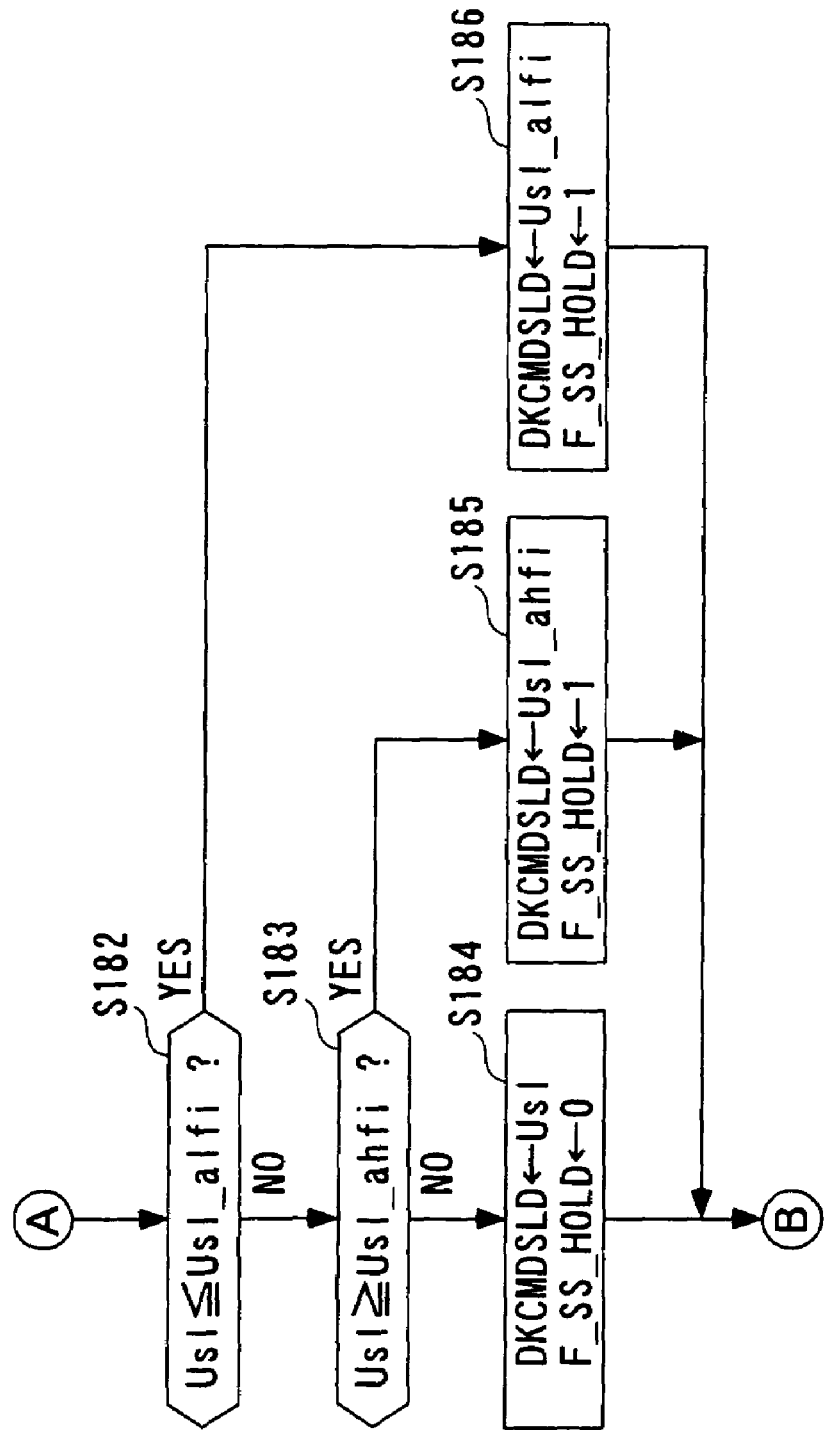
FIG. 28 is a continuation of the FIG. 27 flowchart.

On the other hand, if the answer to the question of the step S171 is negative (NO), i.e. if the engine 3 is performing idle operation, the program proceeds to a step S182 in FIG. 28, wherein it is determined whether or not the control amount Usl is equal to or smaller than the lower limit value Usl_alfi for idle operation. If the answer to the question is negative (NO), i.e. if Usl>Usl_alfi holds, the program proceeds to a step S183, wherein it is determined whether or not the control amount Usl is equal to or larger than the upper limit value Usl_ahfi for idle operation.

If the answer to the question is negative (NO), i.e. if Usl_alfi<Usl<Usl_ahfi holds, the program proceeds to a step S184. Then, the sliding mode control amount DKCMDSLD is set to the control amount Usl in the step S184, and at the same time the integrated value-holding flag F_SS_HOLD is set to 0, followed by terminating the program.

If the answer to the question of the step S183 is affirmative (YES), i.e. if Usl≧Usl_ahfi holds, the sliding mode control amount DKCMDSLD is set to the upper limit value Usl_ahfi for idle operation in a step S185, and at the same time the integrated value-holding flag F_SS_HOLD is set to 1, followed by terminating the program.

On the other hand, if the answer to the question of the step S182 is affirmative (YES), i.e. if Usl≦Usl_alfi holds, the sliding mode control amount DKCMDSLD is set to the lower limit value Usl_alfi for idle operation in a step S186, and at the same time the integrated value-holding flag F_SS_HOLD is set to 1, followed by terminating the program.

Figure 29:
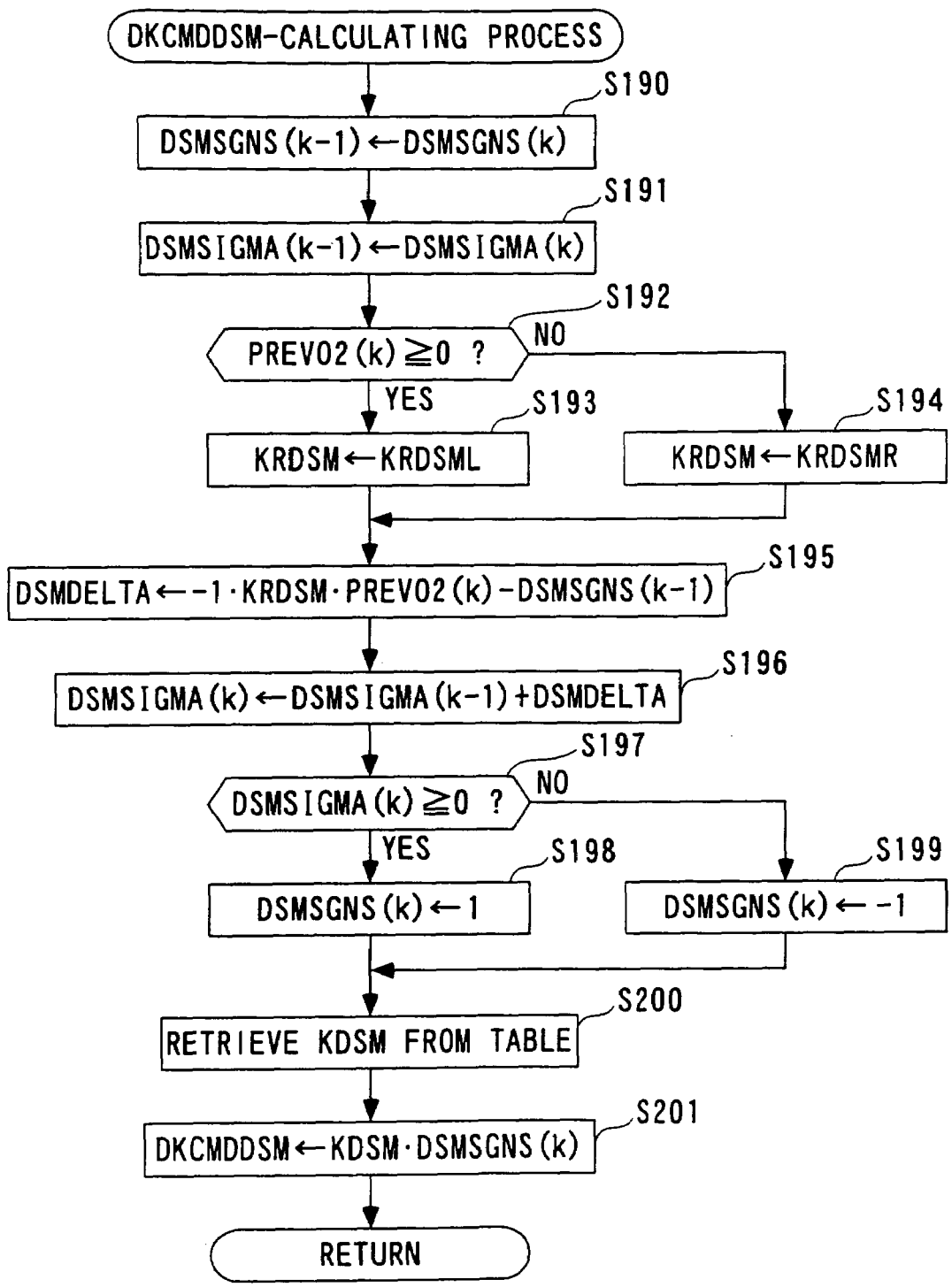
FIG. 29 is a flowchart of a DKCMDDSM calculating process executed in a step S37 in FIG. 10 so as to calculate a ΔΣ modulation control amount DKCMDDSM.

Next, the process of calculating the ΔΣ modulation control amount DKCMDSM, which was executed in the step S37 in FIG. 10, will be described in detail with reference to FIG. 29. As shown in the figure, in this process, first in a step S190, the present value DSMSGNS(k) [=u″(k)] of the DSM signal value calculated in the immediately preceding loop and stored in the RAM is set as the immediately preceding value DSMS-GNS(k−1) [=u″(k−1)].

Then, the program proceeds to a step S191, wherein the present value DSMSIGMA(k) [=$\sigma_d(k)$] of the deviation integral value calculated in the immediately preceding loop and stored in the RAM is set as the immediately preceding value DSMSIGMA(k−1) [=$\sigma_d(k-1)$].

Then, the program proceeds to a step S192, wherein it is determined whether or not the predicted value PREVO2(k) of the output deviation is equal to or larger than a value of 0. If the answer to the question is affirmative (YES), it is judged that the engine 3 is in an operating condition in which the air-fuel ratio of the mixture should be made leaner, and in a step S193, the gain KRDSM (=$G_d$) for the reference signal value is set to a leaning gain value KRDSML, followed by the program proceeding to a step S195, referred to hereinbelow.

On the other hand, if the answer to the question of the step S192 is negative (NO), it is judged that the engine 3 is in an operating condition in which the air-fuel ratio of the mixture should be made richer, and in a step S194, the gain KRDSM for the reference signal value is set to an enriching gain value KRDSMR which is larger than the leaning gain value KRDSML, followed by the program proceeding to the step S195.

The reason why the leaning gain value KRDSML and the enriching gain value KRDSMR are set to respective values different from each other is as follows. When it is required to make the air-fuel ratio of the mixture leaner, the leaning gain value KRDSML is set to a smaller value than the enriching gain value KRDSMR so as to achieve suppression of NOx emission by a lean bias to maintain the NOx purification rate of the first catalytic device 8a, whereby the air-fuel ratio is controlled such that the speed of convergence of the output Vout from the O2 sensor 15 to the target value Vop becomes slower than when the air-fuel ratio is being enriched. On the other hand, when it is required to make the air-fuel ratio of the mixture richer, the enriching gain value KRDSMR is set to a larger value than the leaning gain value KRDSML so as to sufficiently recover the NOx purification rates of the respective first and second catalytic devices 8a, 8b, whereby the air-fuel ratio is controlled such that the speed of convergence of the output Vout from the O2 sensor 15 to the target value Vop becomes faster than when the air-fuel ratio is being leaned. Thus, an excellent exhaust gas purification rate can be maintained in the process of making the air-fuel ratio of the mixture richer or leaner.

In the step S195 following the step S193 or S194, a value [$-1 \cdot$KRDSM$\cdot$PREVO2($k$)$-$DSMSGNS(k$-$1)] obtained by subtracting the immediately preceding value DSMSGNS(k$-$1) of the DSM signal value calculated in the step S190 from a value obtained by multiplying a value of $-1$, the gain KRDSM for the reference signal value, and the present value PREVO2($k$) of the predicted value by each other is set as a deviation signal value DSMDELTA [$=\delta(k)$]. This processing corresponds to the equations (27) and (28).

Then, the program proceeds to a step S196, wherein the present value DSMSIGMA(k) of the deviation integral value is set to a sum [DSMSIGMA(k$-$1)+DSMDELTA] of the immediately preceding value DSMSIGMA(k$-$1) calculated in the step S191 and the deviation signal value DSMDELTA. This processing corresponds to the equation (29).

Then, in steps S197 to S199, if the present value DSMSIGMA(k) of the deviation integral value is equal to or larger than 0, the present value DSMSGNS(k) of the DSM signal value is set to 1, whereas if the present value DSMSIGMA(k) of the deviation integral value is smaller than 0, the present value DSMSGNS(k) of the DSM signal value is set to $-1$. The processing in the steps S197 to S199 corresponds to the equation (30).

Then, in a step S200, the gain KDSM ($=F_d$) for the DSM signal value is calculated by searching a table shown in FIG. 30 according to the exhaust gas volume AB_SV. As shown in the figure, the gain KDSM is set to a larger value as the exhaust gas volume AB_SV is smaller. This is because as the exhaust gas volume AB_SV is smaller, i.e. as an operation load on the engine 3 is smaller, the responsivity of the output Vout from the O2 sensor 15 is lowered, and hence it is required to compensate for the lowered responsivity. By setting the gain KDSM as above, it is possible to calculate the $\Delta\Sigma$ modulation control amount DKCMDDSM properly according to the operating conditions of the engine 3, while avoiding an over-gain condition or the like, thereby enhancing the exhaust gas purification rate.

A table for use in calculation of the gain KDSM is not limited to the above table in which the gain KDSM is set according to the exhaust gas volume AB_SV, but any table in which the gain KDSM is preset according to a parameter (e.g. the basic fuel injection amount (time period) Tim) indicative of an operation load condition of the engine 3 may be employed. Further, when a deterioration-determining device for determining deterioration of the catalytic devices 8a, 8b is provided, the gain KDSM may be corrected to a smaller value as the degree of deterioration of the catalytic devices 8a, 8b determined by the deterioration-determining device is larger.

Then, in the following step S201, the $\Delta\Sigma$ modulation control amount DKCMDDSM is set to a value [KDSM$\cdot$DSMSGNS(k)] obtained by multiplying the gain KDSM for the DSM signal value by the present value DSMSGNS(k) of the DSM signal value, followed by terminating the program. This processing corresponds to the equation (31).

Figure 31:
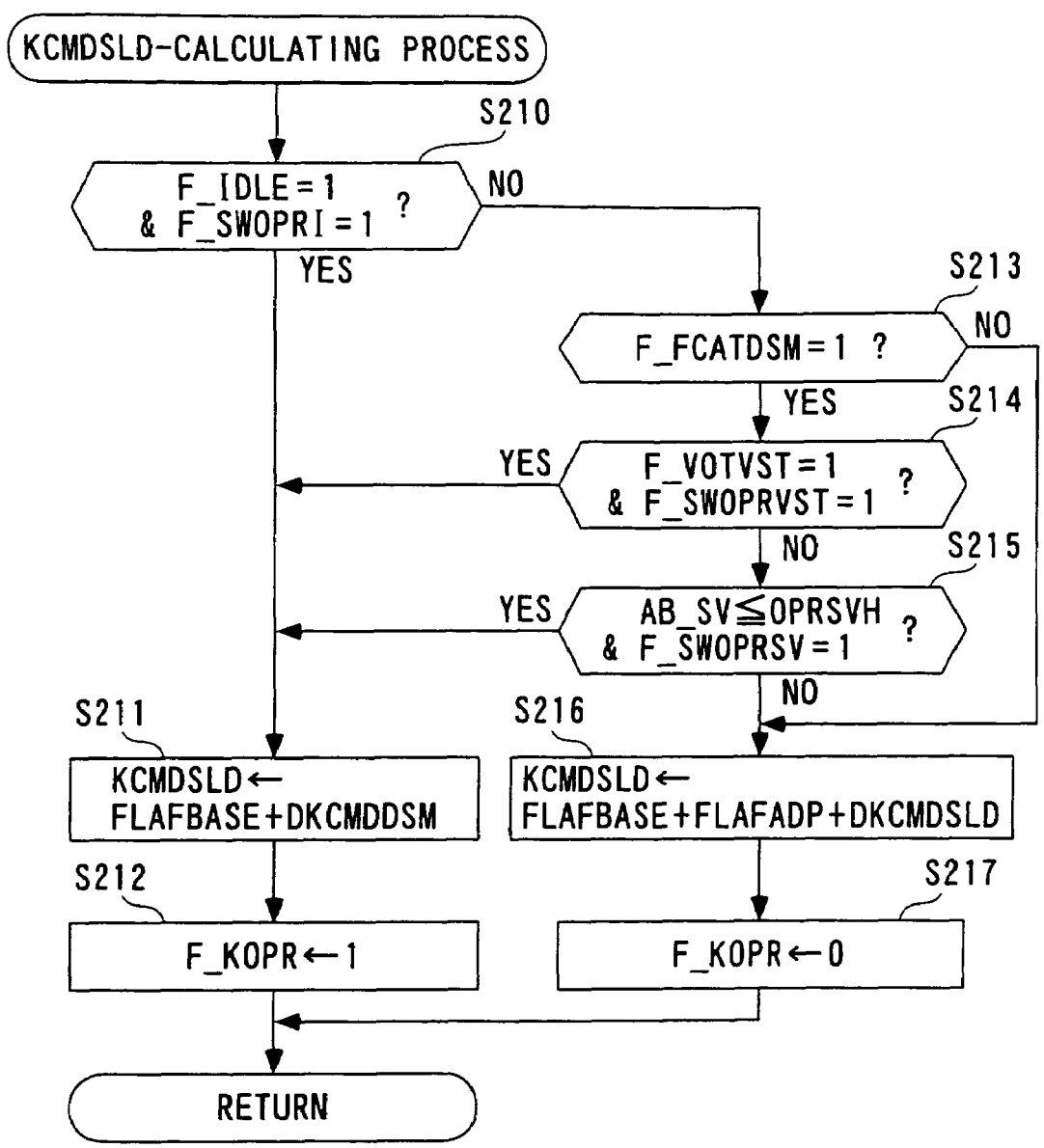
FIG. 31 is a flowchart of a KCMDSLD calculating process executed in a step S38 in FIG. 10 so as to calculate an adaptive target air-fuel ratio KCMDSLD.

Next, the process of calculating the adaptive target air-fuel ratio KCMDSLD, which is executed in the step S38 in FIG. 10, will be described in detail with reference to FIG. 31. As shown in the figure, in this process, first, it is determined in a step S210 whether or not the idle flag F_IDLE and an idle-time ADMS execution flag F_SWOPRI both assume 1. The idle-time ADMS execution flag F_SWOPRI is set to 1 when the engine 3 is in idle operation and in an operating condition in which the ADMS process should be executed, and set to 0 if these conditions are not satisfied.

If the answer to the question is affirmative (YES), i.e. if the engine 3 is in the idle operation and in the operating condition in which the adaptive target air-fuel ratio KCMDSLD should be calculated by the ADMS process, the program proceeds to a step S211, wherein the adaptive target air-fuel ratio KCMDSLD is set to a value [FLAFBASE+DKCMDDSM] obtained by adding the $\Delta\Sigma$ modulation control amount DKCMDDSM to the reference value FLAFBASE. This processing corresponds to the equation (32).

Then, in the following step S212, the ADSM termination flag F_KOPR is set to 1 so as to indicate that the ADSM process has been executed, followed by terminating the program.

On the other hand, if the answer to the question of the step S210 is negative (NO), the program proceeds to a step S213, wherein it is determined whether or not a catalyst/O2 sensor flag F_FCATDSM assumes 1. The catalyst/O2 sensor flag F_FCATDSM is set to 1 when at least one of the following four conditions (O) to (R) is satisfied, and set to 0 when none of the conditions are satisfied.

(O) The catalyst capacity of the first catalytic device 8a is equal to or larger than a predetermined value.

(P) The noble metal content of the first catalytic device 8a is equal to or larger than a predetermined value.

(Q) The LAF sensor 14 is not arranged in the exhaust pipe 7 of the engine 3.

(R) The O2 sensor 15 is arranged at a location downstream of the second catalytic device 8b.

If the answer to the question is affirmative (YES), the program proceeds to a step S214, wherein it is determined whether or not the first start flag F_VOTVST and a post-start ADSM execution flag F_SWOPRVST both assume 1. The post-start ADSM execution flag F_SWOPRVST is set to 1 after the start of the vehicle and when the engine 3 is in the operating condition in which the ADMS process should be executed, and set to 0 if these conditions are not satisfied.

If the answer to the question is affirmative (YES), i.e. if the first predetermined time period TVOTVST has elapsed after the start of the vehicle, and the engine 3 is in the operating condition in which the ADMS process should be executed, the steps S211, S212 are executed as described above, followed by terminating the program.

On the other hand, if the answer to the question of the step S214 is negative (NO), the program proceeds to a step S215, wherein it is determined whether or not the exhaust gas volume AB_SV is equal to or smaller than a predetermined value OPRSVH and whether or not a small gas volume-time ADSM execution flag F_SWOPRSV assumes 1 at the same time. The small gas volume-time ADSM execution flag F_SWOPRSV is set to 1 when the exhaust gas volume AB_SV of the engine 3 is small and the engine 3 is in the operating condition in which the ADMS process should be executed, and set to 0 if these conditions are not satisfied.

If the answer to the question is affirmative (YES), i.e. if the exhaust gas volume AB_SV is small and the engine 3 is in the operating condition in which the ADMS process should be executed, the steps S211, S212 are executed as described above, followed by terminating the program.

On the other hand, if the answer to the question of the step S215 is negative (NO), it is judged that the engine 3 is in the operating condition in which the PRISM process should be executed, and the program proceeds to a step S216, wherein the adaptive target air-fuel ratio KCMDSLD is set to a value [FLAFBASE+FLAFADP+DKCMDSLD] obtained by adding the adaptive correction term FLAFADP and the sliding mode control amount DKCMDSLD to the reference value FLAFBASE. Then, in the following step S217, the ADSM termination flag F_KOPR is set to 0 so as to indicate that the PRISM process has been executed, followed by terminating the program.

If the answer to the question of the step S213 is negative (NO), i.e. if none of the four conditions (O) to (R) are satisfied, the steps S214, S215 are skipped, and the steps S216, S217 are executed, followed by terminating the program. As described above, in the KCMDSLD-calculating process, switching between the ADSM process and the PRISM process is carried out depending on the operating conditions of the engine 3 so as to calculate the adaptive target air-fuel ratio KCMDSLD.

Figure 32:
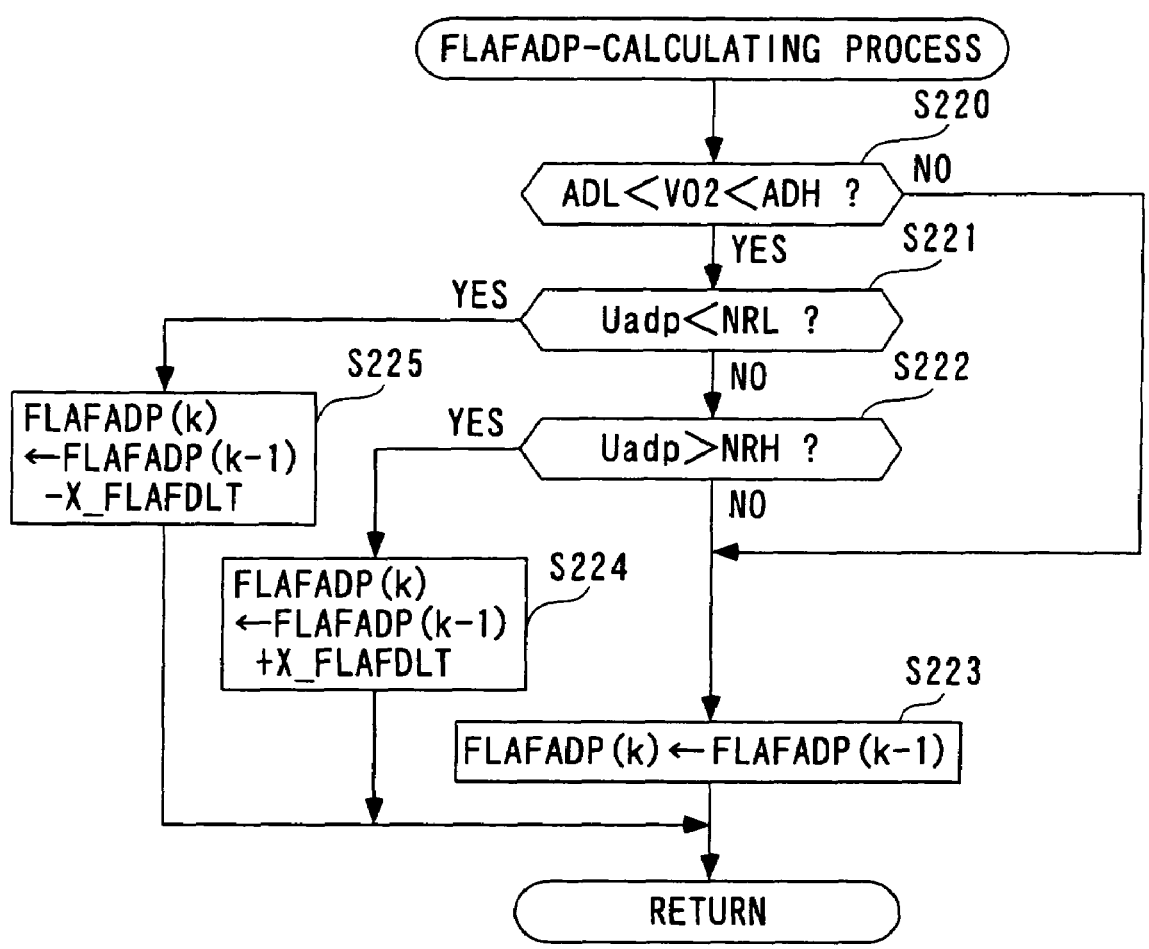
FIG. 32 is a flowchart of a FLAFADP calculating process executed in a step S39 in FIG. 10 so as to calculate an adaptive correction term FLAFADP.

Next, the process of calculating the adaptive correction term FLAFADP, which is executed in the step S39 in FIG. 10, will be described in detail with reference to FIG. 32. As shown in the figure, in this process, first, it is determined in a step S220 whether or not the output deviation VO2 assumes a value within a predetermined range (ADL<VO2<ADH). If the answer to the question is affirmative (YES), i.e. if the output deviation VO2 is small, and the output Vout from the O2 sensor is close to the target value Vop, the program proceeds to a step S221, wherein it is determined whether or not the adaptive law input Uadp is smaller than a predetermined lower limit value NRL.

If the answer to the question is negative (NO), i.e. if Uadp≧NRL holds, the program proceeds to a step S222, wherein it is determined whether or not the adaptive law input Uadp is larger than a predetermined upper limit value NRH. If the answer to the question is negative (NO), i.e. if NRL≦Uadp≦NRH holds, the program proceeds to a step S223, and the present value FLAFADP(k) of the adaptive correction term is set to the immediately preceding value FLAFADP(k−1), that is, the value of the adaptive correction term FLAFADP is held, followed by terminating the program.

On the other hand, if the answer to the question of the step S222 is affirmative (YES), i.e. if Uadp>NRH holds, the program proceeds to a step S224, wherein the present value FLAFADP(k) of the adaptive correction term is set to a value [FLAFADP(k−1)+X_FLAFDLT] obtained by adding a predetermined updating value X_FLAFDLT to the immediately preceding value FLAFADP(k−1), followed by terminating the program.

If the answer to the question of the step S221 is affirmative (YES), i.e. if Uadp<NRL holds, the program proceeds to a step S225, and the present value FLAFADP(k) of the adaptive correction term is set to a value [FLAFADP(k−1)−X_FLAFDLT] obtained by subtracting the predetermined updating value X_FLAFDLT from the immediately preceding value FLAFADP(k−1), followed by terminating the program.

As described above, according to the control device 1 according to the first embodiment, it is possible to eliminate lag in control timing between the output and input of the controlled object having dynamic characteristics with relatively large phase delay and dead time, with the target air-fuel ratio KCMD as the control input and the output Vout from the O2 sensor 15 as the output thereof, to thereby improve control stability and controllability of the controlled object, and enhance the exhaust gas purification rate.

In the following, description will be given of control devices according to second to tenth embodiments of the invention. In the following description of each embodiment, component parts and elements similar or equivalent to those of the first embodiment are designated by identical reference numerals, and detailed description thereof is omitted when deemed appropriate.

Figure 33:
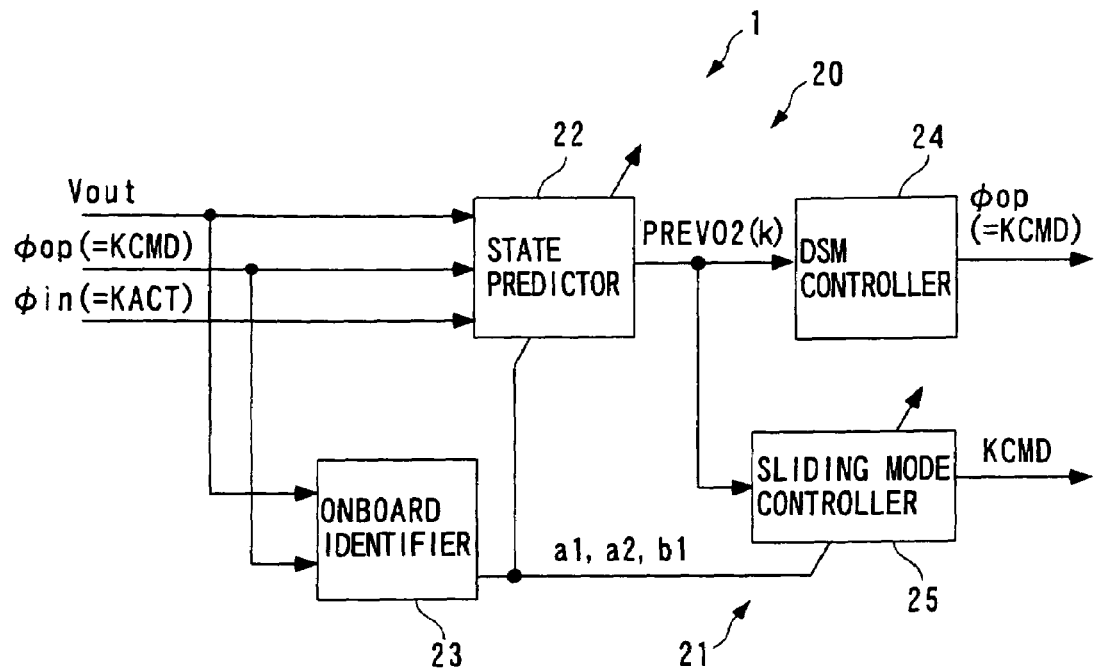
FIG. 33 is a block diagram schematically showing the arrangement of a control device according to a second embodiment of the invention

First, the control device of the second embodiment will be described with reference to FIG. 33. As shown in the figure, the control device 1 of the second embodiment is distinguished from the control device 1 of the first embodiment only in operation of an onboard identifier 23. More specifically, the onboard identifier 23 of the present embodiment is distinguished from that of the first embodiment, in which the model parameters a1, a2, b1 are calculated based on KACT and Vout, in that the model parameters a1, a2, b1 are calculated based on Vout and φop.

Figure 21:
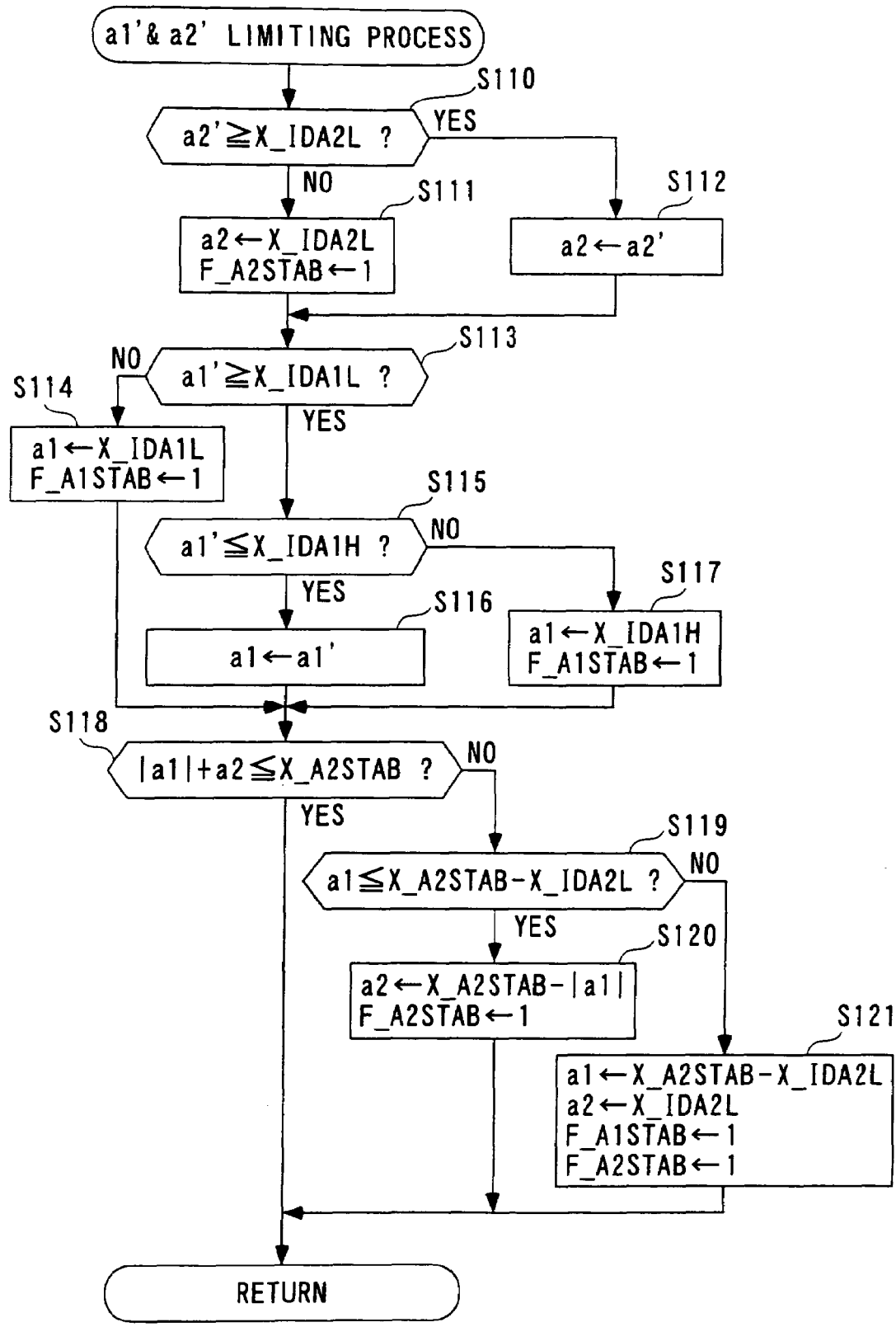
FIG. 21 is a flowchart of an a1' & a2' limiting process executed in a step S101 in FIG. 20.
Figure 23:
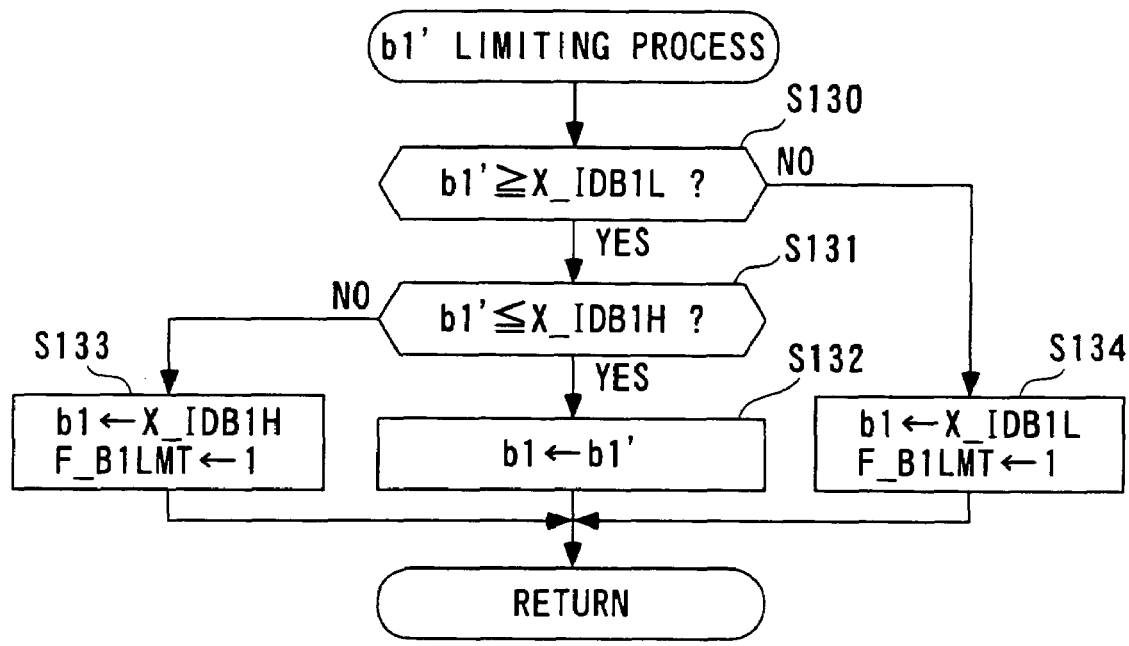
FIG. 23 is a flowchart of a b1' limiting process executed in a step S102 in FIG. 20.

Still more specifically, the onboard identifier 23 in the present embodiment uses the identification algorithm expressed by the equations (8) to (15) in place of the identification algorithm expressed by the equations (16) to (23) used in the first embodiment, to calculate the identified values a1', a2', b1' of the model parameters, and performs the respective limiting processes of FIGS. 21 and 23 on the identified values a1', a2', and b1' to thereby calculate the model parameters a1, a2, b1. A specific program, not shown, for carrying out the arithmetic operation by the present onboard identifier 23 is almost similar to that in the first embodiment. According to the above control device 1 of the present embodiment, the same advantageous effects as provided by the control device 1 of the first embodiment can be obtained.

Figure 34:
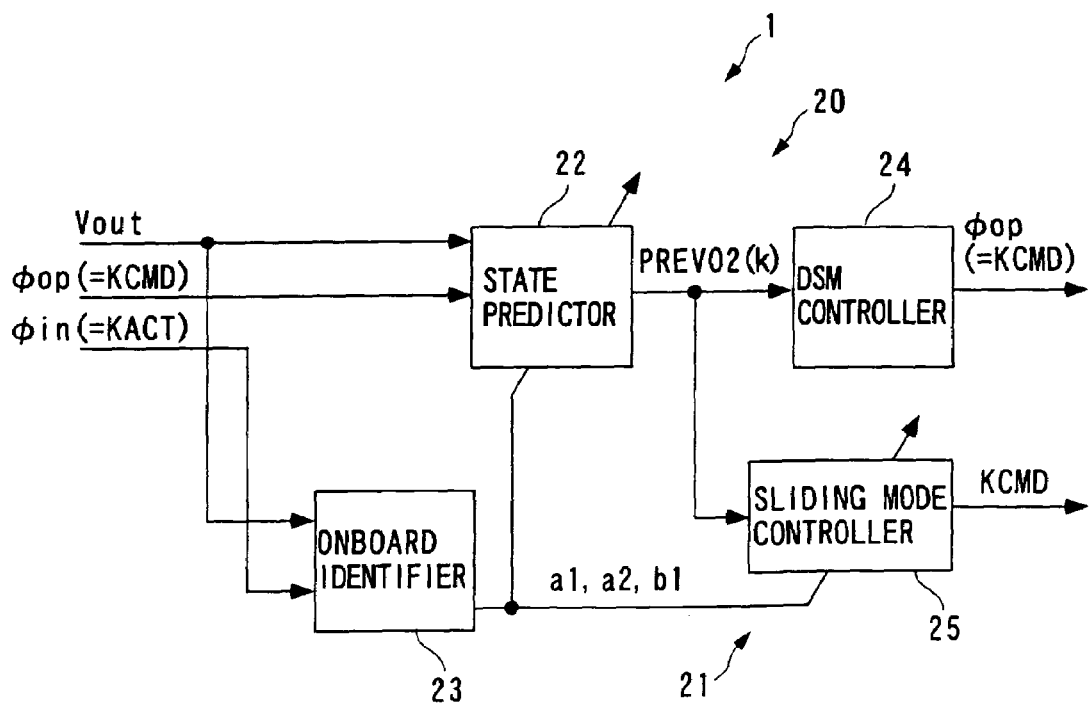
FIG. 34 is a block diagram schematically showing the arrangement of a control device according to a third embodiment of the invention.

Next, a control device according to a third embodiment will be described with reference to FIG. 34. As shown in the figure, the control device 1 of the third embodiment is distinguished from the control device 1 of the first embodiment only in operation of a state predictor 22. More specifically, the state predictor 22 of the present embodiment is distinguished from that of the first embodiment, in which the predicted value PREVO2 is calculated based on a1, a2, b1, KACT, Vout and φop (KCMD), in that the predicted value PREVO2 is calculated based on a1, a2, b1, Vout and φop.

Still more specifically, the state predictor 22 of the present embodiment uses the predictive algorithm expressed by the equation (6) in place of the predictive algorithm expressed by the equation (7) used in the first embodiment, to calculate the predicted value PREVO2 of the output deviation VO2. A specific program, not shown, for carrying out the arithmetic operation by the present state predictor 22 is substantially the same as that in the first embodiment. According to the above control device 1 of the present embodiment, the same advantageous effects as provided by the control device 1 of the first embodiment can be obtained.

Figure 35:
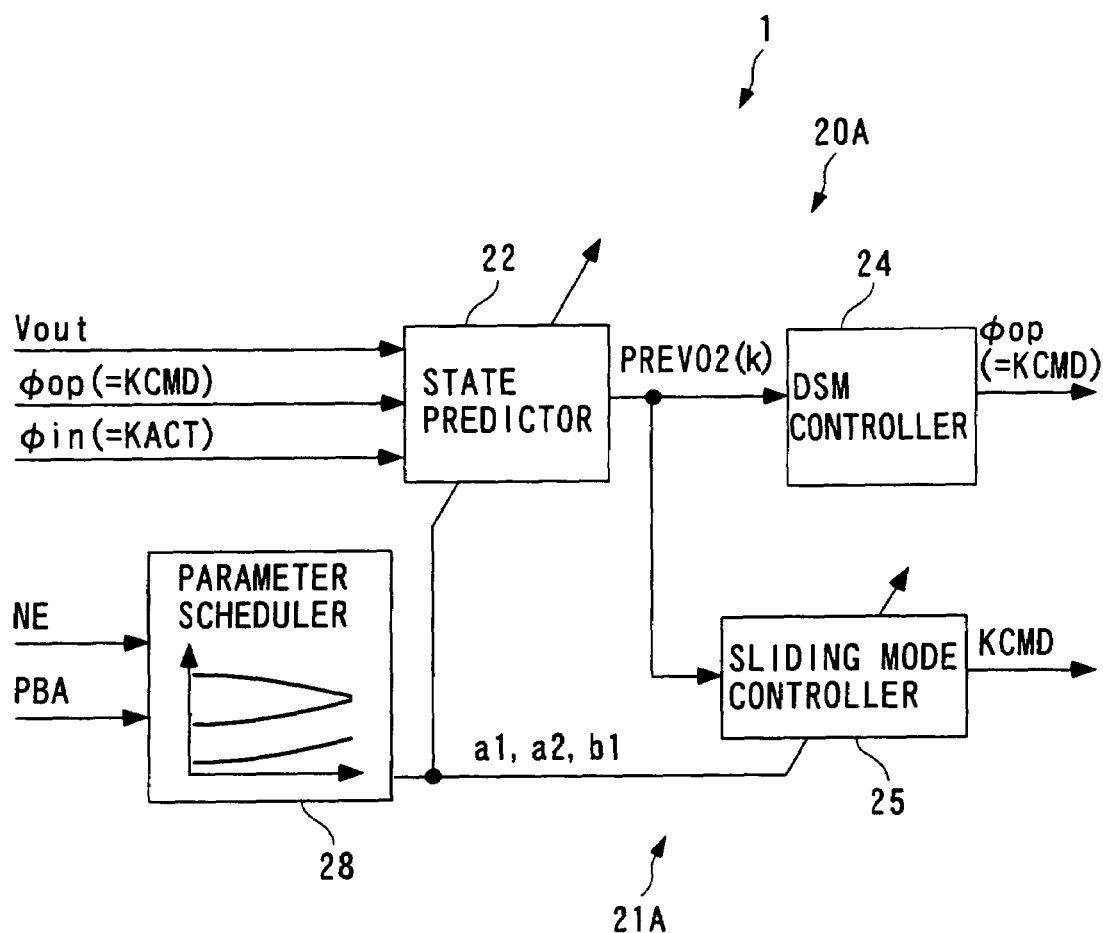
FIG. 35 is a block diagram schematically showing the arrangement of a control device according to a fourth embodiment of the invention.

Next, a control device according to a fourth embodiment will be described with reference to FIG. 35. As shown in the figure, the control device 1 of the fourth embodiment is distinguished from the control device 1 of the first embodiment only in that the model parameters a1, a2, b1 are calculated by using a scheduled DSM controller 20A, a scheduled state prediction sliding mode controller 21A, and a parameter scheduler 28 are used in place of the ADSM controller 20, the PRISM controller 21 and the onboard identifier 23.

Figure 36:
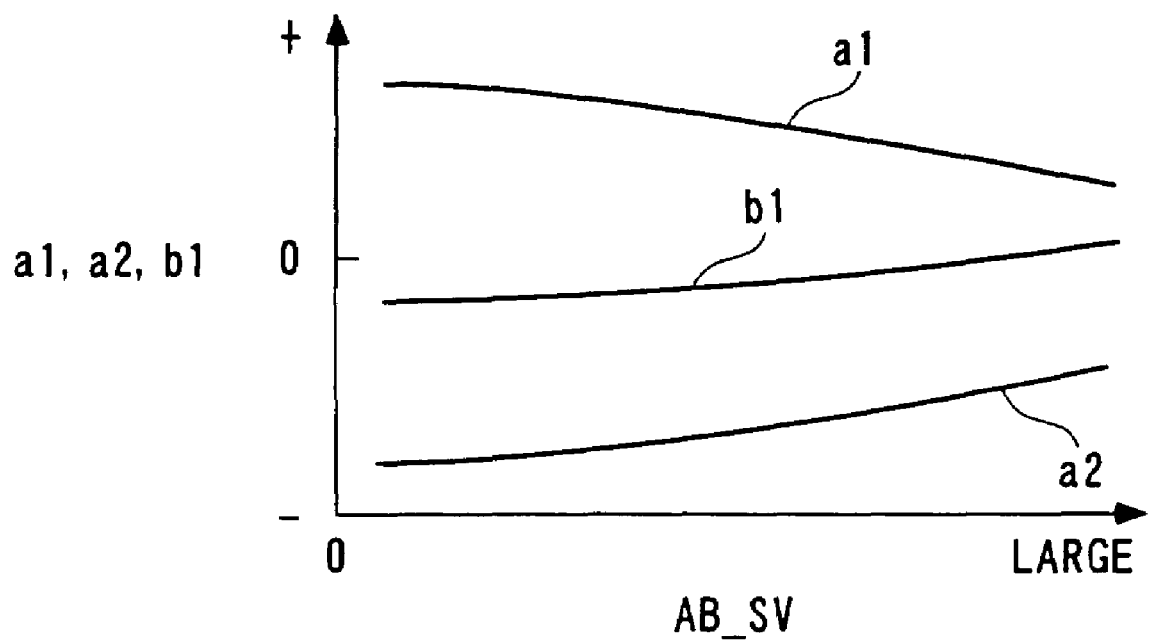
FIG. 36 shows an example of a table used in a parameter scheduler of the control device according to the fourth embodiment so as to calculate model parameters.

In the parameter scheduler 28, first, the exhaust gas volume AB_SV is calculated based on the engine rotational speed NE and the intake pipe absolute pressure PBA by using the equation (44). Then, the model parameters a1, a2, b1 are calculated by searching a table shown in FIG. 36 according to the exhaust gas volume AB_SV.

In this table, as the exhaust gas volume AB_SV is larger, the model parameter a1 is set to a smaller value, whereas the model parameters a2, b1 are each set to a larger value. This is because the output from the controlled object, i.e. the output Vout from the O2 sensor 15 becomes more stable with an increase in the exhaust gas volume AB_SV, while the output Vout from the O2 sensor 15 becomes more oscillating with a decrease in the exhaust gas volume AB_SV.

The scheduled DSM controller 20A calculates the target air-fuel ratio KCMD by a DSM controller 24 similar to that of the first embodiment, based on the model parameters a1, a2, b1, obtained as above. Similarly, the scheduled state prediction sliding mode controller 21A calculates the target air-fuel ratio KCMD by an SLD controller 25 similar to that in the first embodiment, based on the model parameters a1, a2, b1 obtained as above.

According to the above control device 1 of the present embodiment, the same advantageous effects as provided by the control device 1 of the first embodiment can be obtained. In addition, the use of the parameter scheduler 28 makes it possible to calculate the model parameters a1, a2, b1 more speedily than the use of the onboard identifier 23. Thus, it is possible to improve the control responsivity, thereby achieving an excellent exhaust gas purification rate more speedily.

Figure 37:
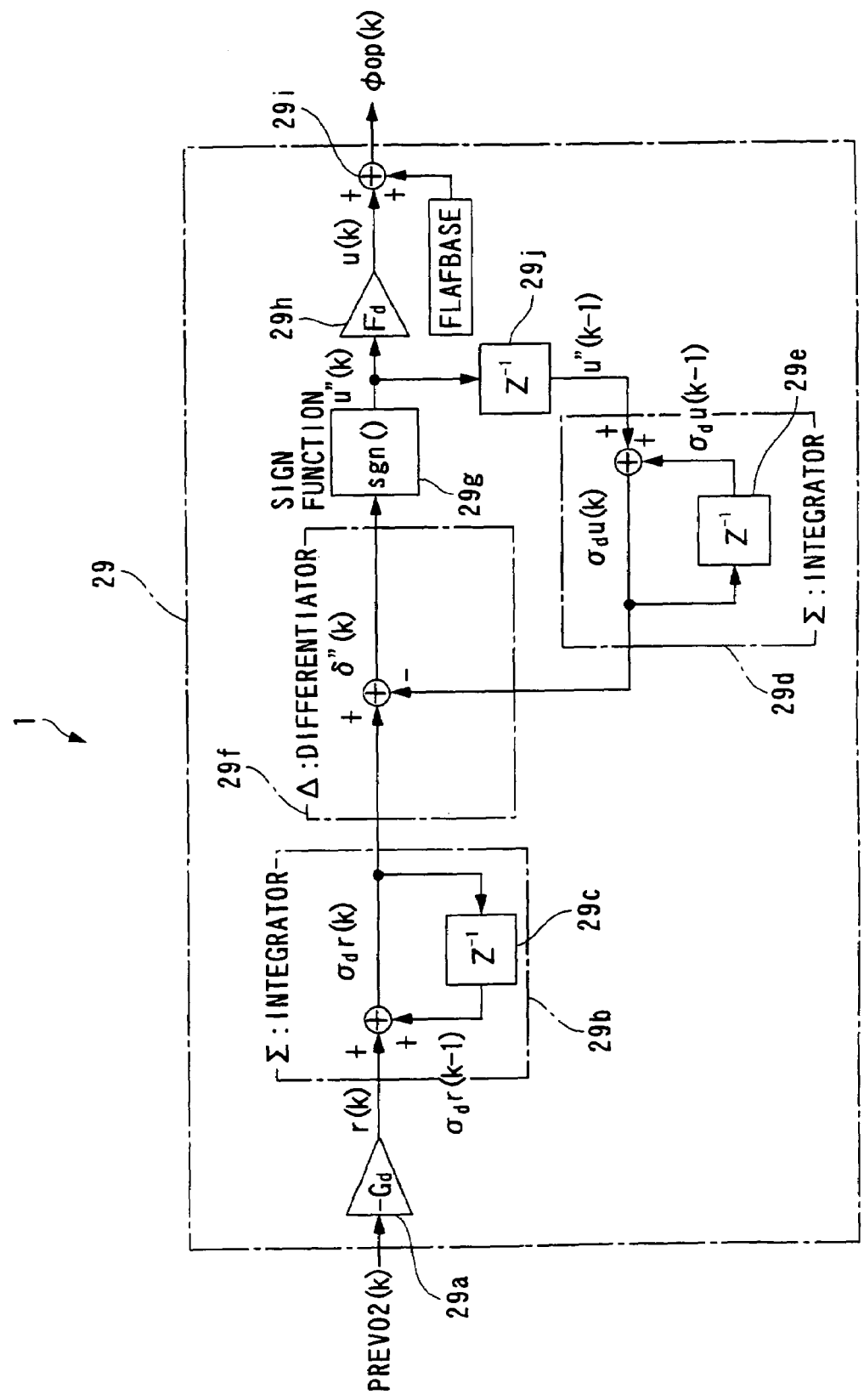
FIG. 37 is a block diagram schematically showing the arrangement of an SDM controller of a control device according to a fifth embodiment of the invention.

Next, a control device according to a fifth embodiment will be described with reference to FIG. 37. The control device 1 of the fifth embodiment is distinguished from the control device 1 of the first embodiment only in that an SDM controller 29 is used in place of the DSM controller 24. The SDM controller 29 calculates the control input $\phi op(k)$ based on the predicted value PREVO2($k$) by using a control algorithm to which is applied the $\Sigma\Delta$ modulation algorithm.

More specifically, as shown in the figure, in the SDM controller 29, an inverter amplifier 29a generates the reference signal r(k) as a signal obtained by multiplying a value of −1, the gain $G_d$ for the reference signal, and the predicted value PREVO2 by each other. Then, an integrator 29b generates a reference signal integral value $\sigma_d r(k)$ as the sum of a reference signal integral value $\sigma_d r(k-1)$ delayed by a delay element 29c and the reference signal r(k). On the other hand, an integrator 29d generates an SDM signal integral value $\sigma_d u(k)$ as the sum of an SDM signal integral value $\sigma_d u(k-1)$ delayed by a delay element 29e and an SDM signal u"(k−1) delayed by a delay element 29j. Then, a differentiator 29f generates a deviation signal δ"(k) indicative of a deviation between the reference signal integral value $\sigma_d r(k)$ and the SDM signal integral value $\sigma_d u(k)$.

Subsequently, a quantizer 29g (sign function) generates an SDM signal u"(k) as a value indicative of a sign determined based on the deviation signal δ"(k). Further, an amplifier 29h generates an amplified SDM signal u(k) as a value obtained by amplifying the SDM signal u"(k) by a predetermined gain $F_d$, and then an adder 29i generates the control input $\phi op(k)$ as a value obtained by adding the amplified SDM signal u(k) to the predetermined reference value FLAFBASE.

The control algorithm used by the SDM controller 29 can be expressed by the following equations (45) to (51):

$$r(k)=-1\cdot G_d\cdot PREVO2(k) \tag{45}$$

$$\sigma_d r(k)=\sigma_d r(k-1)+r(k) \tag{46}$$

$$\sigma_d u(k)=\sigma_d u(k-1)+u"(k-1) \tag{47}$$

$$\delta"(k)=\sigma_d r(k)-\sigma_d u(k) \tag{48}$$

$$u"(k)=sgn(\delta"(k)) \tag{49}$$

$$u(k)=F_d\cdot u"(k) \tag{50}$$

$$\phi op(k)=FLAFBASE+u(k) \tag{51}$$

wherein $G_d$ and $F_d$ represent gains. Further, the sign function sgn(δ"(k)) becomes equal to 1 when δ"(k)≧0 holds, whereas it becomes equal to −1 when δ"(k)<0 holds (sgn(δ"(k)) may be configured to become equal to 0 when δ"(k)=0 holds).

Similarly to the ΔΣ modulation algorithm, the ΣΔ modulation algorithm is characterized in that the SDM signal u(k) can be generated as a value which causes the reference signal r(k) to be reproduced in the output from the controlled object when the value is inputted to the controlled object. In short, the SDM controller 29 is capable of generating the control input $\phi op(k)$ similar to that generated by the aforementioned DSM controller 24. Therefore, according to the control device 1 of the present embodiment which uses the SDM controller 29, the same advantageous effects as provided by the control device 1 of the first embodiment can be obtained. It should be noted that a specific program, not shown, carried out by the SDM controller 29 is configured to be substantially the same as that carried out by the DSM controller 24.

Figure 38:
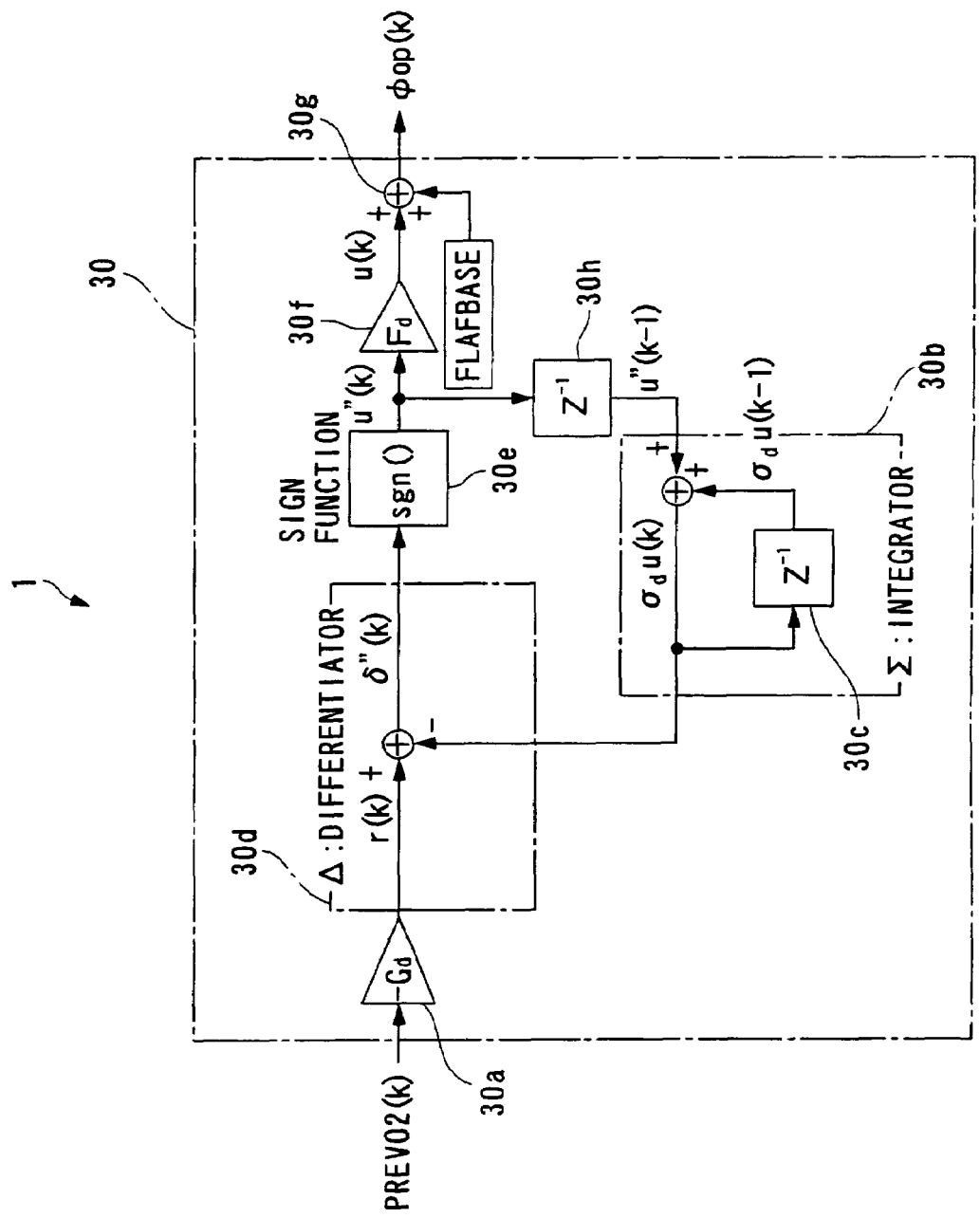
FIG. 38 is a block diagram schematically showing the arrangement of a DM controller of a control device according to a sixth embodiment of the invention.

Next, a control device according to a sixth embodiment will be described with reference to FIG. 38. The control device 1 of the sixth embodiment is distinguished from the control device 1 of the first embodiment only in that a DM controller 30 is used in place of the DSM controller 24. The DM controller 30 calculates the control input $\phi op(k)$ based on the predicted value PREVO2($k$) by using a control algorithm to which is applied a Δ modulation algorithm.

More specifically, as shown in the figure, in the DM controller 30, an inverter amplifier 30a generates the reference signal r(k) as a signal obtained by multiplying a value of −1, the gain $G_d$ for the reference signal, and the predicted value PREVO2 by each other. On the other hand, an integrator 30b generates a DM signal integral value $\sigma_d u(k)$ as the sum of a DM signal integral value $\sigma_d u(k-1)$ delayed by a delay element 30c and a DM signal u"(k−1) delayed by a delay element 30h. Then, a differentiator 30d generates a deviation signal δ"(k) indicative of a deviation between the reference signal r(k) and the DM signal integral value $\sigma_d u(k)$.

Subsequently, a quantizer 30e (sign function) generates a DM signal u"(k) as a signal indicative of a sign determined based on the deviation signal δ"(k). Further, an amplifier 30f generates an amplified DM signal u(k) as a value obtained by amplifying the DM signal u"(k) by a predetermined gain $F_d$, and then an adder 30g generates the control input $\phi op(k)$ as a value obtained by adding the amplified DM signal u(k) to the predetermined reference value FLAFBASE.

The control algorithm used by the DM controller 29 can be expressed by the following equations (52) to (57):

$$r(k)=-1\cdot G_d\cdot PREVO2(k) \tag{52}$$

$$\sigma_d u(k)=\sigma_d u(k-1)+u"(k-1) \tag{53}$$

$$\delta''(k)=r(k)=-\sigma_d u(k) \quad (54)$$

$$u''(k)=\text{sgn}(\delta''(k)) \quad (55)$$

$$u(k)=F_d \cdot u''(k) \quad (56)$$

$$\phi op(k)=\text{FLAFBASE}+u(k) \quad (57)$$

wherein Gd and Fd represent gains. Further, the sign function sgn($\delta''(k)$) becomes equal to 1 when $\delta''(k) \geq 0$ holds, whereas it becomes equal to −1 when $\delta''(k)<0$ holds (sgn($\delta''(k)$) may be configured to become equal to 0 when $\delta''(k)=0$ holds).

Similarly to the $\Delta\Sigma$ modulation algorithm and the $\Sigma\Delta$ modulation algorithm, the control algorithm used by the above DM controller 30, i.e. the $\Delta$ modulation algorithm has a characteristic that the DM signal u(k) can be generated as a value which causes the reference signal r(k) to be reproduced in the output from the controlled object when the value is inputted to the controlled object. In short, the DM controller 30 is capable of generating the control input $\phi op(k)$ similar to that generated by the DSM controller 24 or the SDM controller 29. Therefore, according to the control device 1 of the present embodiment which uses the DM controller 30, the same advantageous effects as provided by the control device 1 of the first embodiment can be obtained. It should be noted that a specific program, not shown, carried out by the DM controller 29 is configured to be substantially the same as that carried out by the DSM controller 24.

Figure 39:
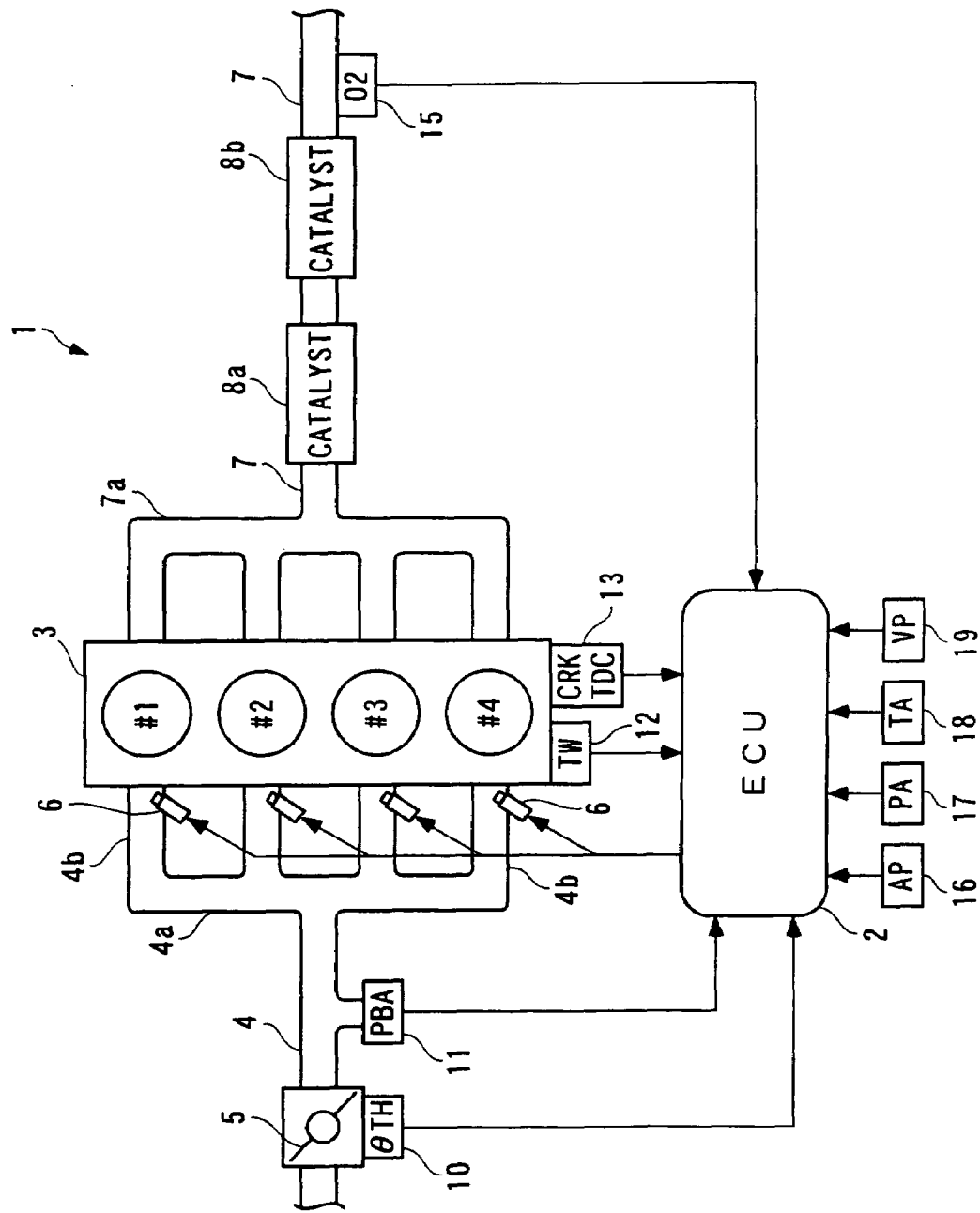
FIG. 39 is a block diagram schematically showing the arrangement of an internal combustion engine incorporating a control device according to a seventh embodiment of the invention.

Next, a control device according to a seventh embodiment will be described with reference to FIGS. 39 and 40. As shown in FIG. 39, the control device 1 of the seventh embodiment is distinguished from the control device 1 of the first embodiment only in that the engine 3 is not provided with the LAF sensor 14 and that the O2 sensor 15 is arranged at a location downstream of the second catalytic device 8b.

Figure 40:
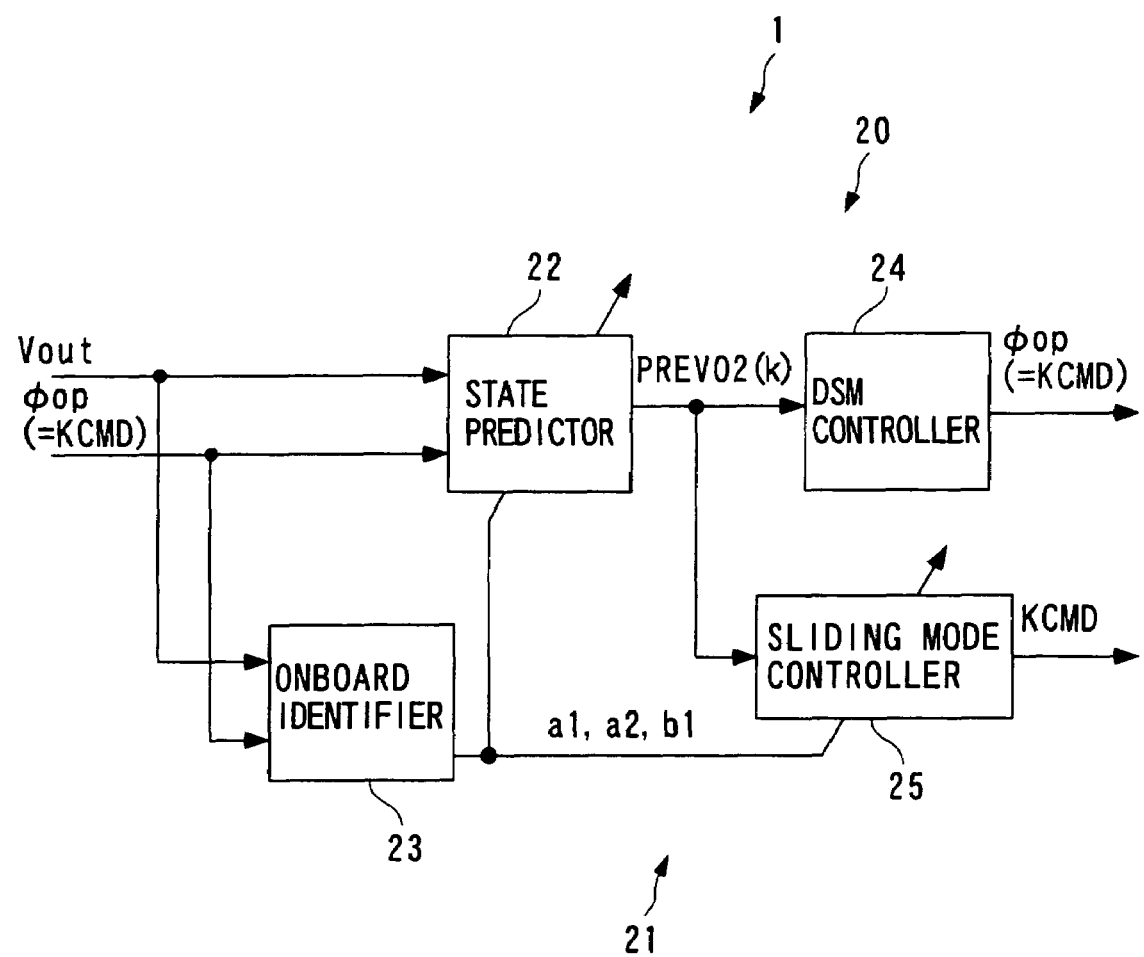
FIG. 40 is a block diagram schematically showing the arrangement of the control device according to the seventh embodiment.

Since the LAF sensor 14 is not provided, in the control device 1 of the present embodiment, as shown in FIG. 40, the model parameters a1, a2, b1 are calculated by the onboard identifier 23, based on the output Vout from the O2 sensor 15 and the control input $\phi op(k)$ (target air-fuel ratio KCMD). More specifically, the onboard identifier 23 calculates the identified values a1', a2', b1' of the model parameters by using the identification algorithm expressed by the equations (8) to (15), and then executes the aforementioned limiting process on the identified values a1', a2', b1' to thereby calculate the model parameters a1, a2, b1.

Further, the state predictor 22 calculates the predicted value PREVO2 of the output deviation VO2 based on the model parameters a1, a2, b1 and the control input $\phi op(k)$. In short, the state predictor 22 calculates the predicted value PREVO2 of the output deviation VO2 by using the predictive algorithm expressed by the equation (6). It should be noted that specific programs, not shown, for carrying out respective arithmetic operations by the state predictor 22 and the onboard identifier 23 are configured to be substantially the same as those in the first embodiment, and the other programs than these are also configured to be similar to those in the first embodiment.

According to the above control device 1 of the present embodiment, the same advantageous effects as provided by the control device 1 of the first embodiment can be obtained. Especially, by setting the gain KRDSM for the reference signal value to different values in respective cases of controlling exhaust gases to a leaner side and to a richer side in the steps S192 to S194 in FIG. 29 to thereby change the speed of converging the target air-fuel ratio to the target value Vop, it is possible to positively obtain an excellent exhaust gas purification rate when the air-fuel ratio of the mixture is made richer or leaner even in the case of using the O2 sensor 15 alone for control of the air-fuel ratio as in the present embodiment. Moreover, since the excellent exhaust gas purification rate can be positively ensured without using the LAF sensor 14, it is possible to reduce manufacturing costs.

Figure 41:
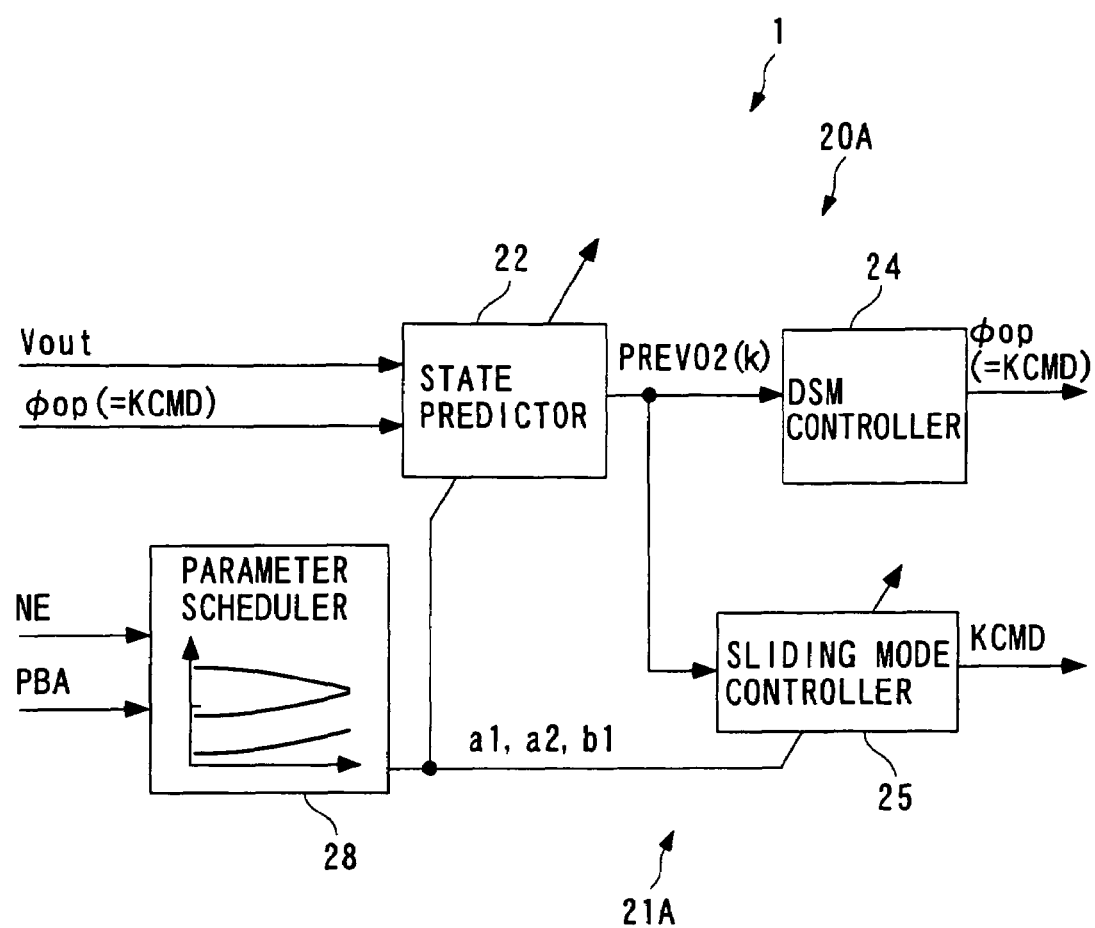
FIG. 41 is a block diagram schematically showing the arrangement of a control device according to an eighth embodiment of the invention.

Next, a control device according to an eighth embodiment will be described with reference to FIG. 41. As shown in the figure, in the control device 1 of the eighth embodiment, the ADSM controller 20, the PRISM controller 21, and the onboard identifier 23 in the control device 1 of the seventh embodiment are replaced by the scheduled DSM controller 20A, the scheduled state prediction sliding mode controller 21A, and the parameter scheduler 28 in the fourth embodiment. The controllers 20A, 21A and the parameter scheduler 28 in the present embodiment are arranged similarly to those in the fourth embodiment. According to the control device 1 of the present embodiment, the same advantageous effects as provided by the control device 1 of the seventh embodiment can be obtained. Moreover, the use of the parameter scheduler 28 makes it possible to calculate the model parameters a1, a2, b1 more speedily than in the case of using the onboard identifier 23. Thus, it is possible to enhance control responsivity, and thereby achieve an excellent exhaust gas purification rate more speedily.

Figure 42:
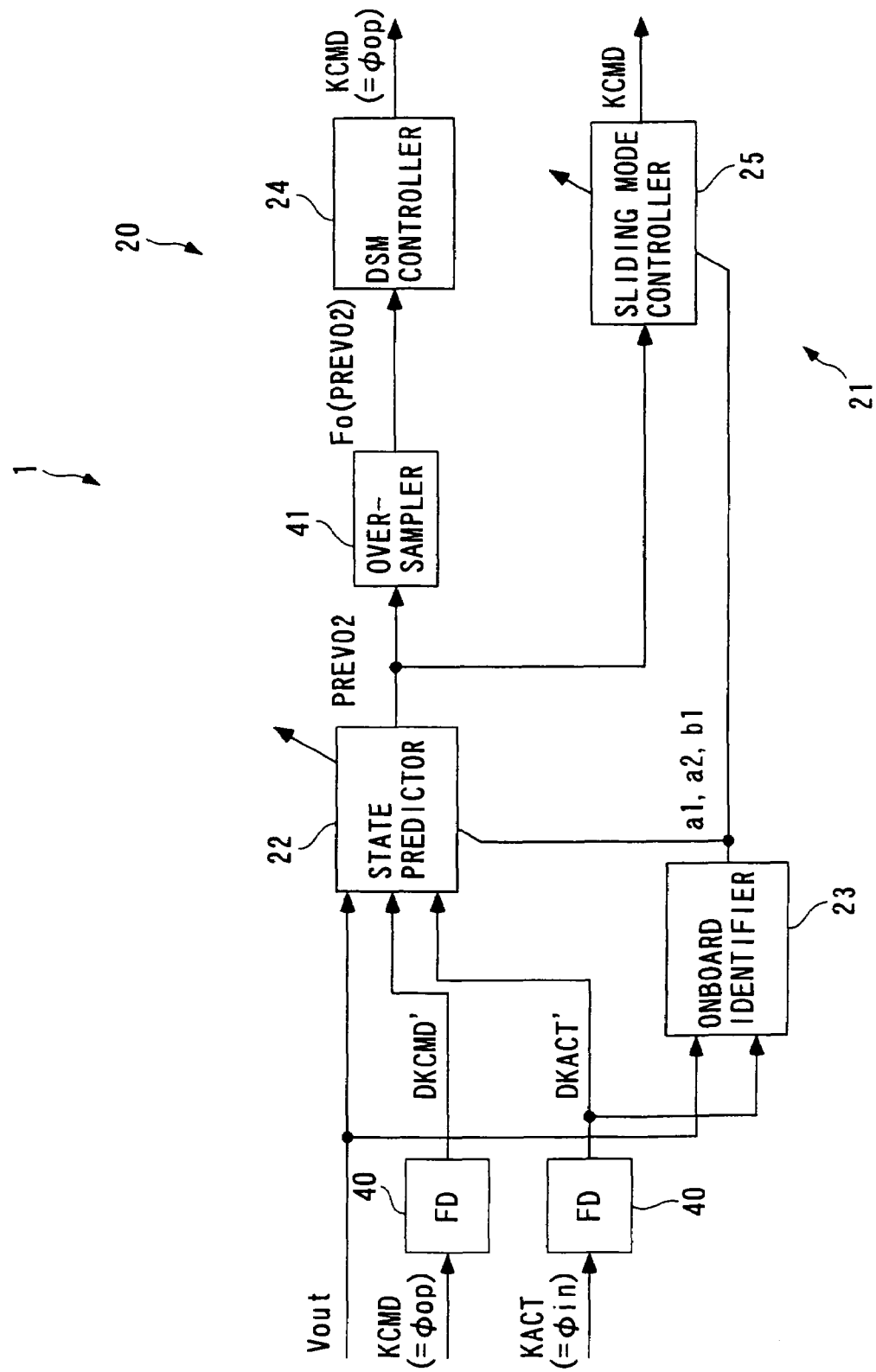
FIG. 42 is a block diagram schematically showing the arrangement of a control device according to a ninth embodiment of the invention.

Next, a control device according to a ninth embodiment will be described with reference to FIGS. 42, and 43. As shown in FIG. 42, the control device 1 of the ninth embodiment is formed by adding two decimation filters 40, 40 (input sampling means, sampling means) and an oversampler 41 to the control device 1 of the first embodiment. Accordingly, in the control device 1 of the ninth embodiment, as described hereinbelow, a calculation period (repetition period of calculation) $\Delta$Tm (control input calculation period, air-fuel ratio calculation period) for calculating the target air-fuel ratio KCMD by the DSM controller 24 and a calculation period $\Delta$Tk (deviation calculation period, predicted value calculation period) for calculating the predicted value PREVO2 and the model parameters a1, a2, b1 by the state predictor 22 and the onboard identifier 23 are set to respective values different from each other (see FIG. 43).

Figure 43:
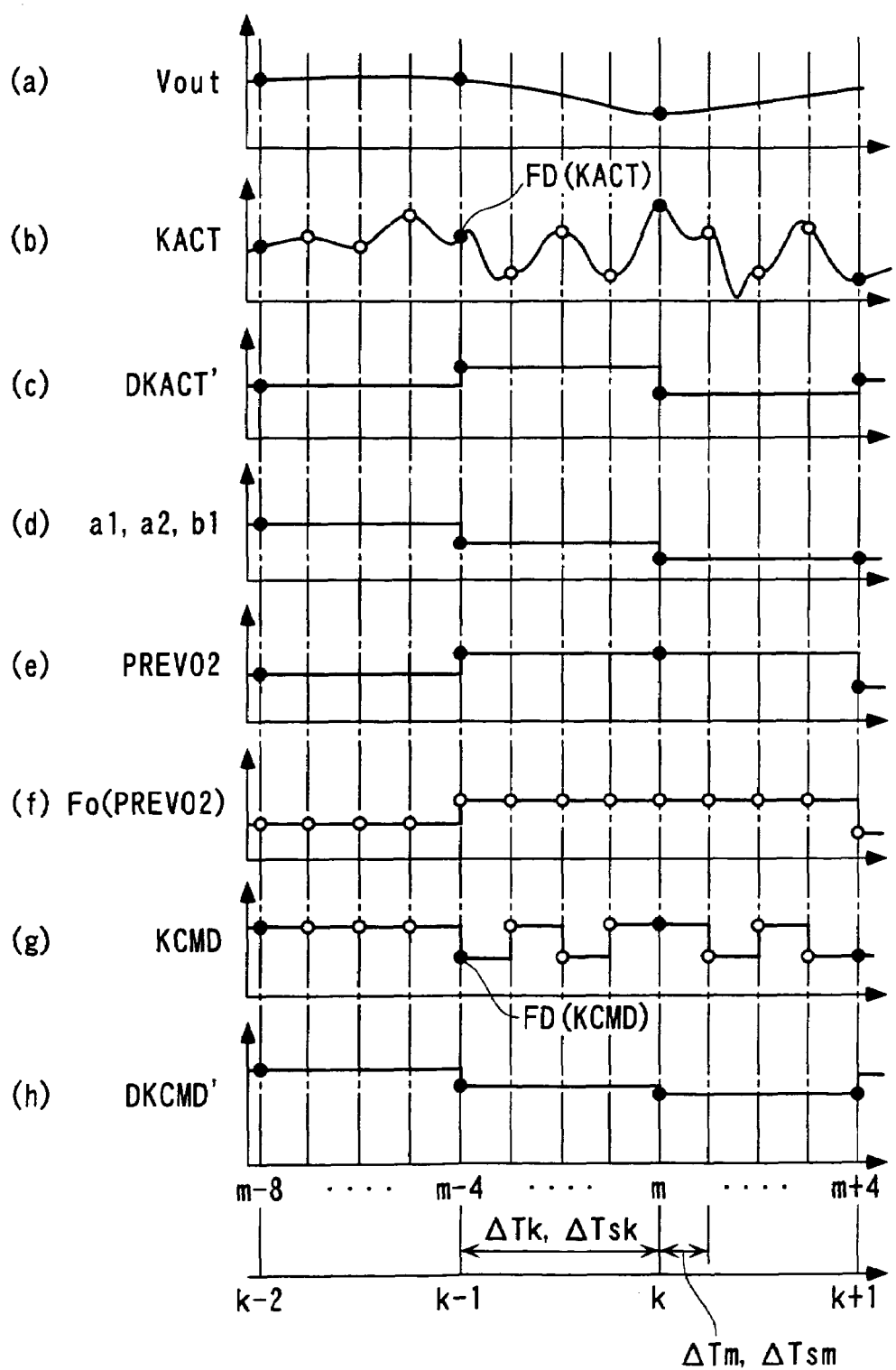
FIG. 43 is a timing chart showing timings of calculation and sampling of various values executed by the control device according to the ninth embodiment.

One of the decimation filters 40, 40 performs a decimation process on the target air-fuel ratio KCMD calculated by the DSM controller 24, and samples a decimation value DKCMD'(k) (indicated by a filled dot in (h) of FIG. 43) of the air-fuel ratio deviation, based on a decimation value FD (KCMD) of the target air-fuel ratio and the reference value FLAFBASE. More specifically, first, values of the target air-fuel ratio KCMD are each sampled at a predetermined sampling period of $\Delta$Tsm (10 milliseconds). Then, the sampled values (indicated by filled dots and hollow dots in (g) of FIG. 43) are low-pass filtered, and then down-sampled at a sampling period of $\Delta$Tsk (40 milliseconds) which is four times longer than $\Delta$Tsm, to thereby sample a decimation value FD (KCMD) (indicated by a filled dot in (g) of FIG. 43) of the target air-fuel ratio. Thereafter, a deviation between the decimation value FD (KCMD) and the reference value FLAFBASE is sampled as a decimation value DKCMD'(k) of the air-fuel ratio deviation.

The other decimation filter 40 performs a decimation process similar to the above on the output KACT from the LAF sensor 14, and samples a decimation value DKACT'(k) (indicated by a filled dot in (c) of FIG. 43) of the LAF output deviation, based on a decimation value FD (KACT) of the output KACT and the reference value FLAFBASE.

More specifically, values of the output KACT from the LAF sensor 14 are each sampled at a predetermined sampling period of ΔTsm (10 milliseconds), and then the sampled values (indicated by filled and hollow dots in (b) of FIG. 43) are low-pass filtered, followed by being down-sampled at a sampling period of ΔTsk (40 milliseconds) four times longer than ΔTsm to thereby sample a decimation value FD (KACT) (indicated by the filled dot in (b) of FIG. 43). Subsequently, a deviation between the decimation value FD (KACT) and the reference value FLAFBASE is sampled as a decimation value DKACT'(k) of the LAF output deviation. It should be noted that in each of the above decimation processes, the down-sampling process executed at the sampling period of ΔTsk and the low-pass filtering process may be carried out in the reverse order to the above.

Further, a sampled value Vout(k) (indicated by a filled dot in (a) of FIG. 43) of the output from the O2 sensor 15 is obtained by a sampler, not shown, at the sampling period of ΔTsk. The three kinds of sampled values DKCMD'(k), DKACT'(k) and Vout(k) are obtained in the same timing (see FIG. 43).

The onboard identifier 23 (identification means) calculates (identifies) the output deviation VO2 and the model parameters a1, a2, b1 based on the sampled value Vout(k) and decimation value DKACT'(k) in synchronism with the sampling timing of the three sampled values DKCMD'(k), DKACT'(k) and Vout(k) (see (d) of FIG. 43). In short, the calculation period ΔTk for calculating the model parameters a1, a2, b1 by the onboard identifier 23 is set to the same time period (40 milliseconds) as the sampling period ΔTsk.

Further, the state predictor 22 (predicted value-calculating means, deviation-calculating means) calculates the output deviation VO2 and the predicted value PREVO2 based on the identified values of the model parameters a1, a2, b1 and the three sampled values DKCMD'(k), DKACT'(k), Vout(k) in synchronism with the above sampling timing (see FIG. 43E). In short, the predicted values PREVO2 are also calculated at the calculation periods of ΔTk.

Then, the oversampler 41 obtains oversampled values Fo (PREVO2) of the predicted value PREVO2. More specifically, the predicted value PREVO2 is oversampled at the sampling period of ΔTsm, whereby the oversampled values Fo (PREVO2) (each indicated by a hollow dot in (f) of FIG. 43) are obtained.

Then, the DSM controller 24 (control input-calculating means, air-fuel ratio-calculating means) calculates the target air-fuel ratio KCMD based on the oversampled values Fo (PREVO2) in synchronism with the sampling timing at the calculation period of ΔTm which is the same time period (10 milliseconds) as the sampling period ΔTsm.

Next, description will be given of a predictive algorithm used by the state predictor 22 in the control device 1 of the present embodiment. As described hereinabove, the decimation value DKCMD'(k) of the air-fuel ratio deviation and the decimation value DKACT'(k) of the LAF output deviation are defined, respectively, by the following equations (58) and (59):

$$DKCMD'(k) = Fd(\phi\ op(m)) - FLAFBASE \quad (58)$$
$$= Fd(KCMD(m)) - FLAFBASE$$

$$DKACT'(k) = Fd(\phi\ in(m)) - FLAFBASE \quad (59)$$
$$= Fd(KACT(m)) - FLAFBASE$$

wherein the symbol m represents a time period discretized by sampling at the sampling period of ΔTsm, and the symbol k represents a time period discretized by sampling at the sampling period of ΔTsk. Further, KCMD(m) and KACT(m) represent discrete data of the target air-fuel ratio KCMD and discrete data of the output KACT from the LAF sensor 14, respectively.

Further, a controlled object model is defined by the following equation (60):

$$VO2(k) = a1 \cdot VO2(k-1) + a2 \cdot VO2(k-2) + b1 \cdot DKCMD' \quad (60)$$
$$(k - dt)$$

It should be noted that if the relationship of DAKT'(k)=DKCMD'(k−d') is applied to this equation (60), it is also possible to express the controlled object model by the relationship between VO2 and DAKT'(k).

Furthermore, if the same technique as employed in the first embodiment is used based on the controlled object model expressed by the above equation (60), a formula for calculating the predicted value PREVO2 is defined by the following equation (61):

$$PREVO2(k) = \alpha 1 \cdot VO2(k) + \alpha 2 \cdot VO2(k-1) + \quad (61)$$
$$\sum_{i=1}^{d'-1} \beta i \cdot DKCMD'(k-i) +$$
$$\sum_{j=d'}^{dt} \beta j \cdot DKACT'(k-j)$$

On the other hand, an identification algorithm used by the onboard identifier 23 is defined by the following equations (62) to (69):

$$\theta(k) = \theta(k-1) + KP(k) \cdot \text{ide\_f}(k) \quad (62)$$

$$\theta(k)^T = [a1'(k), a2'(k), b1'(k)] \quad (63)$$

$$\text{ide\_f}(k) = \frac{1}{n}\sum_{i=1}^{n} ide(i) \quad (64)$$

$$ide(k) = VO2(k) - VO2HAT(k) \quad (65)$$

$$VO2HAT(k) = \theta(k-1)^T \zeta(k) \quad (66)$$

$$\zeta(k)^T = [VO2(k-1), VO2(k-2), DKACT'(k-d-dd)] \quad (67)$$

$$KP(k) = \frac{P(k)\zeta(k)}{1 + \zeta(k)^T P(k)\zeta(k)} \quad (68)$$

$$P(k+1) = \frac{1}{\lambda_1}\left(I - \frac{\lambda_2 P(k)\zeta(k)\zeta(k)^T}{\lambda_1 + \lambda_2 \zeta(k)^T P(k)\zeta(k)}\right)P(k) \quad (69)$$

Further, a control algorithm used by the DSM controller 24 is expressed by the following equations (70) to (75):

$$r(m) = -1 \cdot G_d \cdot PREVO2(m) \quad (70)$$

$$\delta(m) = r(m) - u''(m-1) \quad (71)$$

$$\sigma_d(m) = \sigma_d(m-1) + \delta(m) \quad (72)$$

$$u''(m) = \text{sgn}(\sigma_d(m)) \quad (73)$$

$$u(m) = F_d \cdot u''(m) \quad (74)$$

$$\phi op(m) = KCMD(m) = FLAFBASE + u(m) \quad (75)$$

wherein the sign function $sgn(\sigma_d(m))$ becomes equal to 1 when $\sigma_d(m) \geqq 0$ holds, whereas it becomes equal to −1 when $\sigma_d(m) < 0$ holds ($sgn(\sigma_d(m))$) may be configured to become equal to 0 when $\sigma_d(m)$ is equal to 0).

As described above, according to the control device 1 of the present embodiment, the predicted value PREVO2 and the model parameters a1, a2, b1 are each calculated at the same predetermined calculation period of $\Delta$Tk (40 milliseconds), based on the values DKCMD', DKACT', Vout(k) each sampled at the same predetermined sampling period of $\Delta$Tsk (40 milliseconds). Further, the target air-fuel ratio KCMD is calculated by the DSM controller 24 at the calculation period of $\Delta$Tm (10 milliseconds) which is a quarter of the calculation period $\Delta$Tk. The reason for this is as follows:

In the DSM controller 24, as the calculation period $\Delta$Tm is shorter, accuracy in the calculation of the target air-fuel ratio KCMD is further improved. On the other hand, the power spectrum of the output Vout from the O2 sensor 15 generally exists in a frequency range of 0 to 5 Hz, and hence if the sampling period $\Delta$Tsk and the calculation period $\Delta$Tk are shorter than 20 milliseconds, the frequency characteristics of the controlled object cannot be reflected properly in identified values of the model parameters a1, a2, b1 and the controlled object model, and sometimes in a calculated value of the predicted value PREVO2, either, thereby causing lowered accuracy in the calculation of the model parameters a1, a2, b1 and the predicted value PREVO2. To overcome this problem, according to the control device 1 of the present embodiment, the sampling period $\Delta$Tsk and the calculation period $\Delta$Tk are set to the above value, whereby the frequency characteristics of the controlled object can be reflected properly in the controlled object model, and hence in calculated values of the model parameters a1, a2, b1 and the predicted value PREVO2. As a result, the accuracy in the calculation of the model parameters a1, a2, b1 and the predicted value PREVO2 is further improved, than in the first embodiment, and at the same time since the calculation period $\Delta$Tm is configured to be shorter than the calculation period $\Delta$Tk, it is also possible to ensure high accuracy in the calculation of the target air-fuel ratio KCMD. Further, according to the control device 1 of the present embodiment, the same advantageous effects as provided by the control device 1 of the first embodiment can also be obtained.

It should be noted that the decimation filters 40 for sampling the target air-fuel ratio KCMD and the output KACT from the LAF sensor 14 at the sampling periods of $\Delta$Tsk may be replaced by samplers capable of sampling these at the sampling period of $\Delta$Tsk. Further, the aforementioned SDM controller 29 or DM controller 30 may be used in place of the DSM controller 24. Moreover, the calculation periods $\Delta$Tm, $\Delta$Tk, and the sampling periods $\Delta$Tsm, $\Delta$Tsk are not limited to the above-mentioned values, but each of them can be set to an appropriate value. For instance, the calculation period $\Delta$Tm and the sampling period $\Delta$Tsm may be set to a smaller value than the above-mentioned value (10 milliseconds), and the calculation period $\Delta$Tk and the sampling period $\Delta$Tsk may be set to a larger value than the above-mentioned value (40 milliseconds).

Figure 44:
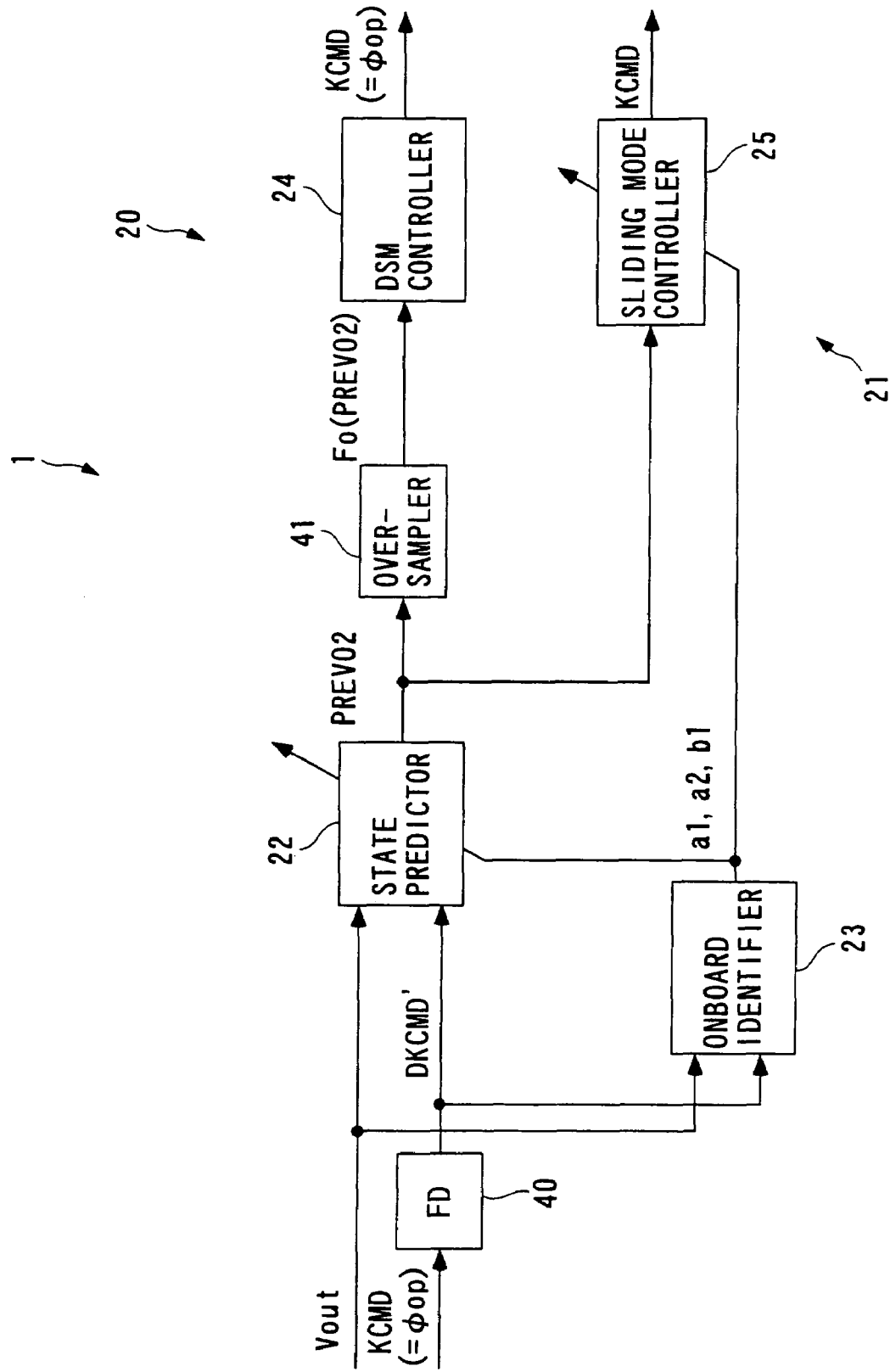
FIG. 44 is a block diagram schematically showing the arrangement of a control device according to a tenth embodiment of the invention.

Next, description will be given of a control device according to a tenth embodiment. Similarly to the FIG. 39 example, the present control device 1 is applied to an engine 3 provided with no LAF sensor 14, and having an O2 sensor 15 arranged at a location downstream of a second catalytic device 8b. Therefore, as shown in FIG. 44, in this control device 1, a sampled value of the output Vout from the O2 sensor 15 and a decimation value DKCMD' of the target air-fuel ratio are used for calculation of the predicted value PREVO2 by a state predictor 22 and identification of the model parameters a1, a2, b1 by an onboard identifier 23.

Further, in a predictive algorithm used by the state predictor 22, a formula for calculating the predicted value PREVO2 is defined by an equation (76) shown below, based on the controlled object model expressed by the equation (60). On the other hand, an identification algorithm used by the onboard identifier 23 is expressed by equations (77) to (84) shown below. A control algorithm used by the DSM controller 24 is expressed by the equations (70) to (75):

$$PREVO2(k) = \alpha 1 \cdot VO2(k) + \alpha 2 \cdot VO2(k-1) + \sum_{i=1}^{dt} \beta i \cdot DKCMD'(k-1) \quad (76)$$

$$\theta(k) = \theta(k-1) + KP(k) \cdot ide\_f(k) \quad (77)$$

$$\theta(k)^T = [a1'(k), a2'(k), b1'(k)] \quad (78)$$

$$ide\_f(k) = \frac{1}{n}\sum_{i=1}^{n} ide(i) \quad (79)$$

$$ide(k) = VO2(k) - VO2HAT(k) \quad (80)$$

$$VO2HAT(k) = \theta(k-1)^T \zeta(k) \quad (81)$$

$$\zeta(k)^T = [VO2(k-1), VO2(k-2), DKCMD'(k-dt)] \quad (82)$$

$$KP(k) = \frac{P(k)\zeta(k)}{1 + \zeta(k)^T P(k)\zeta(k)} \quad (83)$$

$$P(k+1) = \frac{1}{\lambda_1}\left(I - \frac{\lambda_2 P(k)\zeta(k)\zeta(k)^T}{\lambda_1 + \lambda_2 \zeta(k)^T P(k)\zeta(k)}\right)P(k) \quad (84)$$

According to the above control device 1, the same advantageous effects as provided by the control device 1 of the ninth embodiment can be obtained. In addition, since the control system 1 of the present embodiment requires no LAF sensor 14, it is possible to reduce manufacturing costs.

Further, in the control system 1 of the tenth embodiment, similarly to the control device 1 of the ninth embodiment, the decimation filters 40 may be replaced e.g. by samplers capable of sampling the target air-fuel ratio KCMD at the sampling period of $\Delta$Tsk, and the SDM controller 29 or the DM controller 30 may be used in place of the DSM controller 24.

Although in each of the above embodiments, the control device of the invention is used to control the air-fuel ratio in the internal combustion engine 3, this is not limitative, but the invention can be widely applied to control devices for controlling other controlled objects. Further, the ADSM controller 20 and the PRISM controller 21 may be implemented by respective electric circuits in place of the programs used in the embodiments.

It is further understood by those skilled in the art that the foregoing is a preferred embodiment of the invention, and that various changes and modifications may be made without departing from the spirit and scope thereof.

What is claimed is:

1. A control device for an internal combustion engine having a catalyst arranged in an exhaust passage thereof, the control device comprising:
    a downstream air-fuel ratio sensor for outputting a detection signal indicative of an air-fuel ratio of exhaust gases on a downstream side of the catalyst arranged in the exhaust passage;

deviation-calculating means for calculating a deviation between an output from said downstream air-fuel ratio sensor and a predetermined target value at a predetermined deviation calculation period;

air-fuel ratio-calculating means for calculating a target air-fuel ratio of a mixture to be supplied to the engine so as to converge the output from said downstream air-fuel ratio sensor to the predetermined target value, according to the calculated deviation, based on any one of a $\Delta$ modulation algorithm, a $\Delta\Sigma$ modulation algorithm, and a $\Sigma\Delta$ modulation algorithm, at a predetermined air-fuel ratio calculation period shorter than the predetermined deviation calculation period; and air-fuel ratio control means for controlling an air-fuel ratio of the mixture to be supplied to the engine, according to the calculated target air-fuel ratio.

2. A control device according to claim 1, wherein said air-fuel ratio-calculating means calculates a first intermediate value according to the deviation, based on the one of the modulation algorithms, and calculates the target air-fuel ratio based on a value obtained by multiplying the calculated first intermediate value by a predetermined gain.

3. A control device according to claim 1, wherein said air-fuel ratio-calculating means calculates a second intermediate value according to the deviation, based on the one of the modulation algorithms, and calculates the target air-fuel ratio by adding a predetermined value to the calculated second intermediate value.

4. A control device for an internal combustion engine having a catalyst arranged in an exhaust passage thereof, the control device comprising:

a downstream air-fuel ratio sensor for outputting a detection signal indicative of an air-fuel ratio of exhaust gases on a downstream side of the catalyst arranged in the exhaust passage;

predicted value-calculating means for calculating a predicted value of a value indicative of an output from said downstream air-fuel ratio sensor, based on a predictive algorithm at a predetermined predicted value calculation period;

air-fuel ratio-calculating means for calculating a target air-fuel ratio of a mixture to be supplied to the engine, for controlling the output from said downstream air-fuel ratio sensor according to the calculated predicted value, based on any one of a $\Delta$ modulation algorithm, a $\Delta\Sigma$ modulation algorithm, and a $\Sigma\Delta$ modulation algorithm, at a predetermined air-fuel ratio calculation period shorter than the predetermined predicted value calculation period; and air-fuel ratio control means for controlling an air-fuel ratio of the mixture to be supplied to the engine, according to the calculated target air-fuel ratio.

5. A control device according to claim 4, wherein said air-fuel ratio-calculating means calculates a first intermediate value according to the predicted value, based on the one of the modulation algorithms, and calculates the target air-fuel ratio based on a value obtained by multiplying the calculated first intermediate value by a predetermined gain.

6. A control device according to claim 4, wherein said air-fuel ratio-calculating means calculates a second intermediate value according to the predicted value, based on the one of the modulation algorithms, and calculates the target air-fuel ratio by adding a predetermined value to the calculated second intermediate value.

7. A control device according to claim 4, further comprising output sampling means for sampling the value indicative of the output from said downstream air-fuel ratio sensor as discrete data at a predetermined output sampling period longer than the predetermined air-fuel ratio calculation period, and wherein the predictive algorithm is an algorithm for calculating the predicted value according to the sampled discrete data of the value indicative of the output from said downstream air-fuel ratio sensor.

8. A control device according to claim 7, further comprising air-fuel ratio sampling means for sampling a value indicative of the target air-fuel ratio as discrete data at a first predetermined air-fuel ratio sampling period longer than the predetermined air-fuel ratio calculation period, and wherein the predictive algorithm is an algorithm for calculating the predicted value further according to the sampled discrete data of the value indicative of the target air-fuel ratio.

9. A control device according to claim 8, wherein said air-fuel ratio sampling means samples the discrete data of the value indicative of the target air-fuel ratio at the first predetermined air-fuel ratio sampling period by performing decimation on values thereof sampled at a second predetermined air-fuel ratio sampling period shorter than the first predetermined air-fuel ratio sampling period.

10. A control device according to claim 4, wherein the predictive algorithm is an algorithm for calculating the predicted value based on a controlled object model using the value indicative of the target air-fuel ratio and the value indicative of the output from said downstream air-fuel ratio sensor as variables.

11. A control device according to claim 10, further comprising sampling means for sampling the value indicative of the target air-fuel ratio and the value indicative of the output from said downstream air-fuel ratio sensor as discrete data at a first predetermined sampling period longer than the predetermined air-fuel ratio calculation period, and wherein the controlled object model is a discrete-time system model using the sampled discrete data of the value indicative of the target air-fuel ratio and the sampled discrete data of the value indicative of the output from said downstream air-fuel ratio sensor as variables.

12. A control device according to claim 11, wherein said sampling means samples the discrete data of the value indicative of the target air-fuel ratio at the first predetermined sampling period by performing decimation on values thereof sampled at a second predetermined sampling period shorter than the first predetermined sampling period.

13. A control device according to claim 11, further comprising identification means for identifying model parameters of the discrete-time system model according to the discrete data of the value indicative of the output from said downstream air-fuel ratio sensor.

14. A control device according to claim 13, wherein said identification means identifies the model parameters further according to the discrete data of the value indicative of the target air-fuel ratio.

15. A control device according to claim 13, wherein an identification period at which the model parameters are identified by said identification means is set to a longer time period than the predetermined air-fuel ratio calculation period.

16. A control device according to claim 7, further comprising:

an upstream air-fuel ratio sensor for outputting a detection signal indicative of an air-fuel ratio of exhaust gases on an upstream side of the catalyst arranged in the exhaust passage of the engine, and air-fuel ratio sampling means for sampling at least one of the value indicative of the target air-fuel ratio and a value indicative of an output from said upstream air-fuel ratio sensor as discrete data at a first predetermined air-fuel ratio sampling period longer than the predetermined air-fuel ratio calculation period, and wherein the predictive algorithm is an algorithm for calculating the predicted value further according to the at least one of the sampled discrete data of the value indicative of the target air-fuel ratio and the sampled discrete data of the value indicative of the output from said upstream air-fuel ratio sensor.

17. A control device according to claim 16, wherein said air-fuel ratio sampling means samples the at least one of the discrete data of the value indicative of the target air-fuel ratio and the discrete data of the value indicative of the output from said upstream air-fuel ratio sensor at the first predetermined air-fuel ratio sampling period by performing decimation on values thereof sampled at a second predetermined air-fuel ratio sampling period shorter than the first predetermined air-fuel ratio sampling period.

18. A control device according to claim 4, further comprising an upstream air-fuel ratio sensor for outputting a detection signal indicative of an air-fuel ratio of exhaust gases on an upstream side of the catalyst arranged in the exhaust passage of the engine, and wherein the predictive algorithm is an algorithm for calculating the predicted value based on a controlled object model using one of the value indicative of the target air-fuel ratio and the value indicative of the output from said upstream air-fuel ratio sensor and the value indicative of the output from said downstream air-fuel ratio sensor as variables.

19. A control device according to claim 18, further comprising sampling means for sampling at least one of the value indicative of the target air-fuel ratio and the value indicative of the output from said upstream air-fuel ratio sensor and the value indicative of the output from said downstream air-fuel ratio sensor as discrete data at a first predetermined sampling period longer than the predetermined air-fuel ratio calculation period, and wherein the controlled object model is a discrete-time system model using one of the sampled discrete data of the value indicative of the target air-fuel ratio and the sampled discrete data of the value indicative of the output from said upstream air-fuel ratio sensor and the sampled discrete data of the value indicative of the output from said downstream air-fuel ratio sensor as variables.

20. A control device according to claim 19, wherein said sampling means samples at least one of the discrete data of the value indicative of the target air-fuel ratio and the discrete data of the value indicative of the output from said upstream air-fuel ratio sensor at the first predetermined sampling period by performing decimation on values thereof sampled at a second predetermined sampling period shorter than the first predetermined sampling period.

21. A control device according to claim 19, further comprising identification means for identifying model parameters of the discrete-time system model according to the discrete data of the value indicative of the output from said downstream air-fuel ratio sensor.

22. A control device according to claim 21, wherein said identification means identifies the model parameters further according to the one of the discrete data of the value indicative of the target air-fuel ratio and the discrete data of the value indicative of the output from said upstream air-fuel ratio sensor.

23. A control device according to claim 21, wherein an identification period at which the model parameters are identified by said identification means is set to a longer time period than the predetermined air-fuel ratio calculation period.

24. A control method for an internal combustion engine including a catalyst arranged in an exhaust passage thereof, the control method comprising the steps of:
   detecting a parameter indicative of an air-fuel ratio of exhaust gases on a downstream side of the catalyst arranged in the exhaust passage;
   calculating a deviation between the parameter and a predetermined target value at a predetermined deviation calculation period;
   calculating a target air-fuel ratio of a mixture to be supplied to the engine so as to converge the parameter to the predetermined target value, according to the calculated deviation, based on any one of a $\Delta$ modulation algorithm, a $\Delta\Sigma$ modulation algorithm, and a $\Sigma\Delta$ modulation algorithm, at a predetermined air-fuel ratio calculation period shorter than the predetermined deviation calculation period; and
   controlling an air-fuel ratio of the mixture to be supplied to the engine, according to the calculated target air-fuel ratio.

25. A control method according to claim 24, wherein the target air-fuel ratio-calculating step includes calculating a first intermediate value according to the deviation, based on the one of the modulation algorithms, and calculating the target air-fuel ratio based on a value obtained by multiplying the calculated first intermediate value by a predetermined gain.

26. A control method according to claim 24, wherein the target air-fuel ratio-calculating step includes calculating a second intermediate value according to the deviation, based on the one of the modulation algorithms, and calculating the target air-fuel ratio by adding a predetermined value to the calculated second intermediate value.

27. A control method for an internal combustion engine including a catalyst arranged in an exhaust passage thereof, the control method comprising the steps of:
   detecting a parameter indicative of an air-fuel ratio of exhaust gases on a downstream side of the catalyst arranged in the exhaust passage;
   calculating a predicted value of a value indicative of the parameter, based on a predictive algorithm at a predetermined predicted value calculation period;
   calculating a target air-fuel ratio of a mixture to be supplied to the engine, for controlling the parameter according to the calculated predicted value, based on any one of a $\Delta$ modulation algorithm, a $\Delta\Sigma$ modulation algorithm, and a $\Sigma\Delta$ modulation algorithm, at a predetermined air-fuel ratio calculation period shorter than the predetermined predicted value calculation period; and
   controlling an air-fuel ratio of the mixture to be supplied to the engine, according to the calculated target air-fuel ratio.

28. A control method according to claim 27, wherein the target air-fuel ratio-calculating step includes calculating a first intermediate value according to the predicted value, based on the one of the modulation algorithms, calculating the target air-fuel ratio based on a value obtained by multiplying the calculated first intermediate value by a predetermined gain.

29. A control method according to claim 27, wherein the target air-fuel ratio-calculating step includes calculating a second intermediate value according to the predicted value, based on the one of the modulation algorithms, and calculating the target air-fuel ratio by adding a predetermined value to the calculated second intermediate value.

30. A control method according to claim 27, further comprising the step of sampling the value indicative of the parameter as discrete data at a predetermined output sampling period longer than the predetermined air-fuel ratio calculation period, and
wherein the predictive algorithm is an algorithm for calculating the predicted value according to the sampled discrete data of the value indicative of the parameter.

31. A control method according to claim 30, further comprising the step of sampling a value indicative of the target air-fuel ratio as discrete data at a first predetermined air-fuel ratio sampling period longer than the predetermined air-fuel ratio calculation period, and
wherein the predictive algorithm is an algorithm for calculating the predicted value further according to the sampled discrete data of the value indicative of the target air-fuel ratio.

32. A control method according to claim 31, wherein the step of sampling a value indicative of the target air-fuel ratio includes sampling the discrete data of the value indicative of the target air-fuel ratio at the first predetermined air-fuel ratio sampling period by performing decimation on values thereof sampled at a second predetermined air-fuel ratio sampling period shorter than the first predetermined air-fuel ratio sampling period.

33. A control method according to claim 27, wherein the predictive algorithm is an algorithm for calculating the predicted value based on a controlled object model using the value indicative of the target air-fuel ratio and the value indicative of the parameter as variables.

34. A control method according to claim 33, further comprising the step of sampling the value indicative of the target air-fuel ratio and the value indicative of the parameter as discrete data at a first predetermined sampling period longer than the predetermined air-fuel ratio calculation period, and
wherein the controlled object model is a discrete-time system model using the sampled discrete data of the value indicative of the target air-fuel ratio and the sampled discrete data of the value indicative of the parameter as variables.

35. A control method according to claim 34, wherein the step of sampling the value indicative of the target air-fuel ratio and the value indicative of the parameter includes sampling the discrete data of the value indicative of the target air-fuel ratio at the first predetermined sampling period by performing decimation on values thereof sampled at a second predetermined sampling period shorter than the first predetermined sampling period.

36. A control method according to claim 34, further comprising the step of identifying model parameters of the discrete-time system model according to the discrete data of the value indicative of the parameter.

37. A control method according to claim 36, wherein the identifying step includes identifying the model parameters further according to the discrete data of the value indicative of the target air-fuel ratio.

38. A control method according to claim 36, wherein an identification period at which the model parameters are identified in the identifying step is set to a longer time period than the predetermined air-fuel ratio calculation period.

39. A control method according to claim 30, further comprising the steps of:
detecting an upstream parameter indicative of an air-fuel ratio of exhaust gases on an upstream side of the catalyst arranged in the exhaust passage of the engine, and
sampling at least one of the value indicative of the target air-fuel ratio and a value indicative of the upstream parameter as discrete data at a first predetermined air-fuel ratio sampling period longer than the predetermined air-fuel ratio calculation period, and
wherein the predictive algorithm is an algorithm for calculating the predicted value further according to the at least one of the sampled discrete data of the value indicative of the target air-fuel ratio and the sampled discrete data of the value indicative of the upstream parameter.

40. A control method according to claim 39, wherein the step of sampling at least one of the value indicative of the target air-fuel ratio and a value indicative of the upstream parameter includes sampling the at least one of the discrete data of the value indicative of the target air-fuel ratio and the discrete data of the value indicative of the upstream parameter at the first predetermined air-fuel ratio sampling period by performing decimation on values thereof sampled at a second predetermined air-fuel ratio sampling period shorter than the first predetermined air-fuel ratio sampling period.

41. A control method according to claim 27, further comprising:
the step of detecting an upstream parameter indicative of an air-fuel ratio of exhaust gases on an upstream side of the catalyst arranged in the exhaust passage of the engine, and
wherein the predictive algorithm is an algorithm for calculating the predicted value based on a controlled object model using one of the value indicative of the target air-fuel ratio and the value indicative of the upstream parameter and the value indicative of the parameter as variables.

42. A control method according to claim 41, further comprising the step of sampling at least one of the value indicative of the target air-fuel ratio and the value indicative of the upstream parameter and the value indicative of the parameter as discrete data at a first predetermined sampling period longer than the predetermined air-fuel ratio calculation period, and
wherein the controlled object model is a discrete-time system model using one of the sampled discrete data of the value indicative of the target air-fuel ratio and the sampled discrete data of the value indicative of the upstream parameter and the sampled discrete data of the value indicative of the parameter as variables.

43. A control method according to claim 42, wherein the step of sampling at least one of the value indicative of the target air-fuel ratio and the value indicative of the upstream parameter and the value indicative of the parameter includes sampling at least one of the discrete data of the value indicative of the target air-fuel ratio and the discrete data of the value indicative of the upstream parameter at the first predetermined sampling period by performing decimation on values thereof sampled at a second predetermined sampling period shorter than the first predetermined sampling period.

44. A control method according to claim 42, further comprising the step of identifying model parameters of the discrete-time system model according to the discrete data of the value indicative of the parameter.

45. A control method according to claim 44, wherein the identifying step includes identifying the model parameters further according to the one of the discrete data of the value indicative of the target air-fuel ratio and the discrete data of the value indicative of the upstream parameter.

46. A control method according to claim 44, wherein an identification period at which the model parameters are identified in the identifying step is set to a longer time period than the predetermined air-fuel ratio calculation period.

47. An engine control unit including a control program for causing a computer to control an internal combustion engine including a catalyst arranged in an exhaust passage thereof
wherein the control program causes the computer to detect a parameter indicative of an air-fuel ratio of exhaust gases on a downstream side of the catalyst arranged in the exhaust passage, calculate a deviation between the parameter and a predetermined target value at a predetermined deviation calculation period, calculate a target air-fuel ratio of a mixture to be supplied to the engine so as to converge the parameter to the predetermined target value, according to the calculated deviation, based on any one of a $\Delta$ modulation algorithm, a $\Delta\Sigma$ modulation algorithm, and a $\Sigma\Delta$ modulation algorithm, at a predetermined air-fuel ratio calculation period shorter than the predetermined deviation calculation period, and control an air-fuel ratio of the mixture to be supplied to the engine, according to the calculated target air-fuel ratio.

48. An engine control unit according to claim 47, wherein the control program causes the computer to calculate a first intermediate value according to the deviation, based on the one of the modulation algorithms, and calculate the target air-fuel ratio based on a value obtained by multiplying the calculated first intermediate value by a predetermined gain.

49. An engine control unit according to claim 47, wherein the control program causes the computer to calculate a second intermediate value according to the deviation, based on the one of the modulation algorithms, and calculating the target air-fuel ratio by adding a predetermined value to the calculated second intermediate value.

50. An engine control unit including a control program for causing a computer to control an internal combustion engine including a catalyst arranged in an exhaust passage thereof,
wherein the control program causes the computer to detect a parameter indicative of an air-fuel ratio of exhaust gases on a downstream side of the catalyst arranged in the exhaust passage, calculate a predicted value of a value indicative of the parameter, based on a predictive algorithm at a predetermined predicted value calculation period, calculate a target air-fuel ratio of a mixture to be supplied to the engine, for controlling the parameter according to the calculated predicted value, based on any one of a $\Delta$ modulation algorithm, a $\Delta\Sigma$ modulation algorithm, and a $\Sigma\Delta$ modulation algorithm, at a predetermined air-fuel ratio calculation period shorter than the predetermined predicted value calculation period, and control an air-fuel ratio of the mixture to be supplied to the engine, according to the calculated target air-fuel ratio.

51. An engine control unit according to claim 50, wherein the control program causes the computer to calculate a first intermediate value according to the predicted value, based on the one of the modulation algorithms, and calculate the target air-fuel ratio based on a value obtained by multiplying the calculated first intermediate value by a predetermined gain.

52. An engine control unit according to claim 50, wherein the control program causes the computer to calculate a second intermediate value according to the predicted value, based on the one of the modulation algorithms, and calculate the target air-fuel ratio by adding a predetermined value to the calculated second intermediate value.

53. An engine control unit according to claim 50, wherein the control program causes the computer to further sample the value indicative of the parameter as discrete data at a predetermined output sampling period longer than the predetermined air-fuel ratio calculation period, and
wherein the predictive algorithm is an algorithm for calculating the predicted value according to the sampled discrete data of the value indicative of the parameter.

54. An engine control unit according to claim 53, wherein the control program causes the computer to further sample a value indicative of the target air-fuel ratio as discrete data at a first predetermined air-fuel ratio sampling period longer than the predetermined air-fuel ratio calculation period, and
wherein the predictive algorithm is an algorithm for calculating the predicted value further according to the sampled discrete data of the value indicative of the target air-fuel ratio.

55. An engine control unit according to claim 54, wherein the control program causes the computer to further sample the discrete data of the value indicative of the target air-fuel ratio at the first predetermined air-fuel ratio sampling period by performing decimation on values thereof sampled at a second predetermined air-fuel ratio sampling period shorter than the first predetermined air-fuel ratio sampling period.

56. An engine control unit according to claim 50, wherein the predictive algorithm is an algorithm for calculating the predicted value based on a controlled object model using the value indicative of the target air-fuel ratio and the value indicative of the parameter as variables.

57. An engine control unit according to claim 56, wherein the control program causes the computer to sample the value indicative of the target air-fuel ratio and the value indicative of the parameter as discrete data at a first predetermined sampling period longer than the predetermined air-fuel ratio calculation period, and
wherein the controlled object model is a discrete-time system model using the sampled discrete data of the value indicative of the target air-fuel ratio and the sampled discrete data of the value indicative of the parameter as variables.

58. An engine control unit according to claim 57, wherein when the control program causes the computer to sample the value indicative of the target air-fuel ratio and the value indicative of the parameter, the control program causes the computer to sample the discrete data of the value indicative of the target air-fuel ratio at the first predetermined sampling period by performing decimation on values thereof sampled at a second predetermined sampling period shorter than the first predetermined sampling period.

59. An engine control unit according to claim 57, wherein the control program causes the computer to further identify model parameters of the discrete-time system model according to the discrete data of the value indicative of the parameter.

60. An engine control unit according to claim 59, wherein the control program causes the computer to further identify the model parameters further according to the discrete data of the value indicative of the target air-fuel ratio.

61. An engine control unit according to claim 59, wherein an identification period at which the model parameters are identified is set to a longer time period than the predetermined air-fuel ratio calculation period.

62. An engine control unit according to claim 53, wherein the control program causes the computer to detect an upstream parameter indicative of an air-fuel ratio of exhaust gases on an upstream side of the catalyst arranged in the exhaust passage of the engine, and sample at least one of the value indicative of the target air-fuel ratio and a value indicative of the upstream parameter as discrete data at a first predetermined air-fuel ratio sampling period longer than the predetermined air-fuel ratio calculation period, and wherein the predictive algorithm is an algorithm for calculating the predicted value further according to the at least one of the sampled discrete data of the value indicative of the target air-fuel ratio and the sampled discrete data of the value indicative of the upstream parameter.

63. An engine control unit according to claim 62, wherein when the control program causes the computer to sample at least one of the value indicative of the target air-fuel ratio and a value indicative of the upstream parameter, the control program causes the computer to sample the at least one of the discrete data of the value indicative of the target air-fuel ratio and the discrete data of the value indicative of the upstream parameter at the first predetermined air-fuel ratio sampling period by performing decimation on values thereof sampled at a second predetermined air-fuel ratio sampling period shorter than the first predetermined air-fuel ratio sampling period.

64. An engine control unit according to claim 50, wherein the control program causes the computer to detect an upstream parameter indicative of an air-fuel ratio of exhaust gases on an upstream side of the catalyst arranged in the exhaust passage of the engine, and wherein the predictive algorithm is an algorithm for calculating the predicted value based on a controlled object model using one of the value indicative of the target air-fuel ratio and the value indicative of the upstream parameter and the value indicative of the parameter as variables.

65. An engine control unit according to claim 64, wherein the control program causes the computer to further sample at least one of the value indicative of the target air-fuel ratio and the value indicative of the upstream parameter and the value indicative of the parameter as discrete data at a first predetermined sampling period longer than the predetermined air-fuel ratio calculation period, and wherein the controlled object model is a discrete-time system model using one of the sampled discrete data of the value indicative of the target air-fuel ratio and the sampled discrete data of the value indicative of the upstream parameter and the sampled discrete data of the value indicative of the parameter as variables.

66. An engine control unit according to claim 65, wherein when the control program causes the computer to sample at least one of the value indicative of the target air-fuel ratio and the value indicative of the upstream parameter and the value indicative of the parameter, the control program causes the computer to sample at least one of the discrete data of the value indicative of the target air-fuel ratio and the discrete data of the value indicative of the upstream parameter at the first predetermined sampling period by performing decimation on values thereof sampled at a second predetermined sampling period shorter than the first predetermined sampling period.

67. An engine control unit according to claim 65, wherein the control program causes the computer to further identify model parameters of the discrete-time system model according to the discrete data of the value indicative of the parameter.

68. An engine control unit according to claim 67, wherein the control program causes the computer to identify the model parameters further according to the one of the discrete data of the value indicative of the target air-fuel ratio and the discrete data of the value indicative of the upstream parameter.

69. An engine control unit according to claim 67, wherein an identification period at which the model parameters are identified is set to a longer time period than the predetermined air-fuel ratio calculation period.

\* \* \* \* \*